United States Patent
Missig et al.

(10) Patent No.: US 10,254,927 B2
(45) Date of Patent: Apr. 9, 2019

(54) DEVICE, METHOD, AND GRAPHICAL USER INTERFACE FOR MANIPULATING WORKSPACE VIEWS

(71) Applicant: Apple Inc., Cupertino, CA (US)

(72) Inventors: Julian Missig, Redwood City, CA (US); Jonathan Koch, Saratoga, CA (US); Avi E. Cieplinski, San Francisco, CA (US); B. Michael Victor, Castro Valley, CA (US); Jeffrey Traer Bernstein, San Francisco, CA (US); Duncan R. Kerr, San Francisco, CA (US); Myra M. Haggerty, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 129 days.

(21) Appl. No.: 14/455,303

(22) Filed: Aug. 8, 2014

(65) Prior Publication Data
US 2014/0351707 A1  Nov. 27, 2014

Related U.S. Application Data

(63) Continuation of application No. 12/567,206, filed on Sep. 25, 2009, now Pat. No. 8,832,585.

(51) Int. Cl.
*G06F 3/0488* (2013.01)
*G09G 5/14* (2006.01)
(Continued)

(52) U.S. Cl.
CPC .......... *G06F 3/0484* (2013.01); *G06F 3/0488* (2013.01); *G06F 3/04817* (2013.01);
(Continued)

(58) Field of Classification Search
CPC ............... G06F 3/0488; G06F 3/04883; G06F 2203/04806; G06F 2203/04808; G09G 5/14
See application file for complete search history.

(56) References Cited

U.S. PATENT DOCUMENTS 4,885,786 A  12/1989  Anderson et al.
5,283,561 A   2/1994  Lumelsky et al.
(Continued)

FOREIGN PATENT DOCUMENTS

CN  101063925 A  10/2007
CN  101446884 A   6/2009
(Continued)

OTHER PUBLICATIONS

Sears et al., "High Precision Touchscreens: Design Strategies and Comparisons with a Mouse," Jan. 23, 1989, https://www.cs.umd.edu/users/ben/papers/Sears1991High.pdf.*
(Continued)

*Primary Examiner* — Ryan Barrett
(74) *Attorney, Agent, or Firm* — Dentons US LLP

(57) ABSTRACT

In some embodiments, a multifunction device with a display and a touch-sensitive surface creates a plurality of workspace views. A respective workspace view is configured to contain content assigned by a user to the respective workspace view. The content includes application windows. The device displays a first workspace view in the plurality of workspace views on the display without displaying other workspace views in the plurality of workspace views and detects a first multifinger gesture on the touch-sensitive surface. In response to detecting the first multifinger gesture on the touch-sensitive surface, the device replaces display of the first workspace view with concurrent display of the plurality of workspace views.

24 Claims, 44 Drawing Sheets

(51) Int. Cl.
*G06F 3/0484* (2013.01)
*G06F 3/0481* (2013.01)
*G06F 3/01* (2006.01)

(52) U.S. Cl.
CPC ...... *G06F 3/04883* (2013.01); *G06F 3/04886* (2013.01); *G09G 5/14* (2013.01); *G06F 3/017* (2013.01); *G06F 2203/04808* (2013.01)

(56) References Cited

U.S. PATENT DOCUMENTS

| | | |
|---|---|---|
| 5,327,161 A | 7/1994 | Logan et al. |
| 5,359,703 A | 10/1994 | Robertson et al. |
| 5,371,845 A | 12/1994 | Newell et al. |
| 5,424,756 A | 6/1995 | Ho et al. |
| 5,463,725 A | 10/1995 | Henckel et al. |
| 5,483,261 A | 1/1996 | Yasutake |
| 5,490,241 A | 2/1996 | Mallgren et al. |
| 5,499,334 A * | 3/1996 | Staab ............... G06F 9/44505 715/778 |
| 5,511,148 A | 4/1996 | Wellner |
| 5,533,183 A * | 7/1996 | Henderson, Jr. ...... G06F 3/0481 715/835 |
| 5,581,670 A | 12/1996 | Bier et al. |
| 5,675,753 A | 10/1997 | Hansen et al. |
| 5,825,352 A | 1/1998 | Bisset et al. |
| 5,729,673 A | 3/1998 | Cooper et al. |
| 5,732,227 A | 3/1998 | Kuzunuki et al. |
| 5,808,601 A | 9/1998 | Leah et al. |
| 5,841,435 A * | 11/1998 | Dauerer ............... G06F 3/0481 715/764 |
| 5,872,559 A | 2/1999 | Shieh |
| 5,880,743 A | 3/1999 | Moran et al. |
| 5,886,697 A | 3/1999 | Naughton et al. |
| 5,910,800 A | 6/1999 | Shields et al. |
| 6,025,844 A | 2/2000 | Parsons |
| 6,028,271 A | 2/2000 | Gillespie et al. |
| 6,065,021 A | 5/2000 | George |
| 6,073,036 A | 6/2000 | Heikkinen et al. |
| 6,075,531 A | 6/2000 | Destefano |
| 6,160,551 A | 12/2000 | Naughton et al. |
| 6,175,364 B1 | 1/2001 | Wong et al. |
| 6,208,329 B1 | 3/2001 | Ballare |
| 6,215,490 B1 | 4/2001 | Kaply |
| 6,232,957 B1 | 5/2001 | Hinckley |
| 6,253,218 B1 | 6/2001 | Aoki et al. |
| 6,266,057 B1 | 7/2001 | Kuzunuki et al. |
| 6,278,443 B1 | 8/2001 | Amro et al. |
| 6,323,846 B1 | 11/2001 | Westerman et al. |
| 6,346,935 B1 | 2/2002 | Nakajima et al. |
| 6,392,673 B1 | 5/2002 | Andrew et al. |
| 6,480,813 B1 | 11/2002 | Bloomquist et al. |
| 6,545,669 B1 | 4/2003 | Kinawi et al. |
| 6,565,608 B1 | 5/2003 | Fein et al. |
| 6,570,557 B1 | 5/2003 | Westerman et al. |
| 6,646,655 B1 | 11/2003 | Brandt et al. |
| 6,657,615 B2 | 12/2003 | Harada |
| 6,677,932 B1 | 1/2004 | Westerman |
| 6,686,935 B1 | 2/2004 | Richard |
| 6,690,365 B2 | 2/2004 | Hinckley et al. |
| 6,807,361 B1 | 10/2004 | Girgensohn et al. |
| 6,856,259 B1 | 2/2005 | Sharp |
| 6,888,536 B2 | 5/2005 | Westerman et al. |
| 6,903,751 B2 | 6/2005 | Saund et al. |
| 6,928,619 B2 | 8/2005 | Clow et al. |
| 7,030,861 B1 * | 4/2006 | Westerman ......... G06F 3/04883 345/173 |
| 7,093,192 B2 | 8/2006 | Mullen et al. |
| 7,110,005 B2 | 9/2006 | Arvin et al. |
| 7,134,093 B2 | 11/2006 | Etgen et al. |
| 7,158,158 B1 | 1/2007 | Fleming et al. |
| 7,190,379 B2 | 3/2007 | Nissen |
| 7,216,293 B2 | 5/2007 | Kataoka et al. |
| 7,218,226 B2 | 5/2007 | Wehrenberg |
| 7,287,241 B2 | 10/2007 | Balsiger |
| 7,454,717 B2 | 11/2008 | Hinckley et al. |
| 7,456,823 B2 | 11/2008 | Poupyrev et al. |
| 7,469,381 B2 | 12/2008 | Ording |
| 7,469,833 B1 | 12/2008 | Kelley et al. |
| 7,477,233 B2 | 1/2009 | Duncan et al. |
| 7,489,324 B2 | 2/2009 | Royal et al. |
| 7,555,710 B2 | 6/2009 | Kobashi et al. |
| 7,557,797 B2 | 7/2009 | Ludwig |
| 7,614,008 B2 | 11/2009 | Ording |
| 7,619,618 B2 | 11/2009 | Westerman et al. |
| 7,633,076 B2 | 12/2009 | Huppi et al. |
| 7,634,725 B2 | 12/2009 | Nishikawa |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,688,306 B2 | 3/2010 | Wehrenberg et al. |
| 7,694,231 B2 | 4/2010 | Kocienda et al. |
| 7,705,830 B2 | 4/2010 | Westerman et al. |
| 7,728,823 B2 | 6/2010 | Lyon et al. |
| 7,743,348 B2 | 6/2010 | Robbins et al. |
| 7,812,826 B2 | 10/2010 | Ording et al. |
| 7,856,605 B2 | 12/2010 | Ording et al. |
| 7,904,810 B2 | 3/2011 | Chen et al. |
| 7,934,156 B2 | 4/2011 | Forstall et al. |
| 7,936,341 B2 | 5/2011 | Weiss |
| 7,956,847 B2 | 6/2011 | Christie |
| 8,023,158 B2 | 9/2011 | Maki et al. |
| 8,024,667 B2 | 9/2011 | Shaw et al. |
| 8,095,884 B2 | 1/2012 | Karunakaran et al. |
| 8,161,400 B2 | 4/2012 | Kwon |
| 8,171,401 B2 | 5/2012 | Sun |
| 8,171,431 B2 | 5/2012 | Grossman et al. |
| 8,176,435 B1 | 5/2012 | Jitkoff et al. |
| 8,176,438 B2 | 5/2012 | Zaman et al. |
| 8,209,630 B2 | 6/2012 | Thimbleby et al. |
| 8,276,085 B2 | 9/2012 | Sherwani |
| 8,291,349 B1 | 10/2012 | Park et al. |
| 8,291,350 B1 | 10/2012 | Park et al. |
| 8,312,387 B2 | 11/2012 | Williams et al. |
| 8,448,083 B1 | 5/2013 | Migos et al. |
| 8,456,431 B2 | 6/2013 | Victor |
| 8,458,617 B2 | 6/2013 | Victor |
| 8,464,173 B2 | 6/2013 | Victor |
| 8,525,799 B1 * | 9/2013 | Grivna ............... G06F 3/0416 345/173 |
| 8,539,385 B2 | 9/2013 | Capela et al. |
| 8,539,386 B2 | 9/2013 | Capela et al. |
| 8,612,884 B2 | 12/2013 | Capela et al. |
| 8,677,268 B2 | 3/2014 | Capela et al. |
| 8,766,928 B2 | 7/2014 | Weeldreyer et al. |
| 8,780,069 B2 | 7/2014 | Victor |
| 8,799,826 B2 | 8/2014 | Missig et al. |
| 8,832,585 B2 | 9/2014 | Missig et al. |
| 8,863,016 B2 | 10/2014 | Victor |
| 8,966,399 B2 | 2/2015 | Chiang et al. |
| 8,972,879 B2 | 3/2015 | Migos et al. |
| 9,081,494 B2 | 7/2015 | Migos |
| 9,098,182 B2 | 8/2015 | Migos et al. |
| 9,310,907 B2 | 4/2016 | Victor |
| 2002/0015024 A1 | 2/2002 | Westerman et al. |
| 2002/0018075 A1 | 2/2002 | Maulik et al. |
| 2002/0057292 A1 | 5/2002 | Holtz |
| 2002/0062321 A1 | 5/2002 | Shibata |
| 2002/0109668 A1 | 8/2002 | Rosenberg et al. |
| 2002/0109708 A1 | 8/2002 | Peurach et al. |
| 2002/0161772 A1 | 10/2002 | Bergelson et al. |
| 2003/0014382 A1 | 1/2003 | Iwamoto et al. |
| 2003/0128192 A1 | 7/2003 | Van Os |
| 2003/0128241 A1 | 7/2003 | Watanabe et al. |
| 2003/0142137 A1 | 7/2003 | Brown et al. |
| 2003/0179240 A1 * | 9/2003 | Gest .................. G06F 3/0481 715/779 |
| 2003/0189597 A1 * | 10/2003 | Anderson ............ G06F 3/0481 715/778 |
| 2003/0210268 A1 | 11/2003 | Kataoka et al. |
| 2003/0234768 A1 | 12/2003 | Rekimoto et al. |
| 2004/0066407 A1 | 4/2004 | Regan et al. |
| 2004/0088656 A1 | 5/2004 | Washio |
| 2004/0141009 A1 | 7/2004 | Hinckley et al. |

(56) References Cited

U.S. PATENT DOCUMENTS

| | | |
|---|---|---|
| 2004/0150668 A1 | 8/2004 | Myers et al. |
| 2004/0174398 A1* | 9/2004 | Luke ................ G06F 3/0481 715/856 |
| 2004/0174399 A1 | 9/2004 | Wu et al. |
| 2004/0225968 A1 | 11/2004 | Look et al. |
| 2004/0239621 A1* | 12/2004 | Numano .............. G06F 1/1616 345/156 |
| 2004/0239691 A1 | 12/2004 | Sprang et al. |
| 2005/0052427 A1 | 3/2005 | Wu et al. |
| 2005/0068290 A1 | 3/2005 | Jaeger |
| 2005/0071774 A1 | 3/2005 | Lipsky et al. |
| 2005/0088418 A1 | 4/2005 | Nguyen |
| 2005/0088423 A1 | 4/2005 | Keely et al. |
| 2005/0091008 A1 | 4/2005 | Green et al. |
| 2005/0108620 A1 | 5/2005 | Allyn et al. |
| 2005/0108656 A1 | 5/2005 | Wu et al. |
| 2005/0177796 A1 | 8/2005 | Takahashi |
| 2005/0188329 A1* | 8/2005 | Cutler .................. G06F 8/38 715/804 |
| 2005/0231512 A1 | 10/2005 | Niles et al. |
| 2005/0289476 A1 | 12/2005 | Tokkonen |
| 2006/0001650 A1 | 1/2006 | Robbins et al. |
| 2006/0022955 A1 | 2/2006 | Kennedy |
| 2006/0026521 A1 | 2/2006 | Hotelling et al. |
| 2006/0026535 A1 | 2/2006 | Hotelling et al. |
| 2006/0033721 A1 | 2/2006 | Woolley et al. |
| 2006/0033724 A1 | 2/2006 | Chaudhri et al. |
| 2006/0055662 A1 | 3/2006 | Rimas-Ribikauskas et al. |
| 2006/0055684 A1 | 3/2006 | Rimas-Ribikauskas et al. |
| 2006/0085757 A1 | 4/2006 | Andre et al. |
| 2006/0085767 A1 | 4/2006 | Hinckley et al. |
| 2006/0112335 A1 | 5/2006 | Hofmeister et al. |
| 2006/0125803 A1 | 6/2006 | Westerman et al. |
| 2006/0129945 A1 | 6/2006 | Dettinger et al. |
| 2006/0136246 A1 | 6/2006 | Tu |
| 2006/0136833 A1 | 6/2006 | Dettinger et al. |
| 2006/0161870 A1 | 7/2006 | Hotelling et al. |
| 2006/0174568 A1 | 8/2006 | Kinoshita et al. |
| 2006/0184966 A1 | 8/2006 | Hunleth et al. |
| 2006/0190833 A1* | 8/2006 | Sangiovanni ....... G06F 3/04883 715/767 |
| 2006/0197750 A1 | 9/2006 | Kerr et al. |
| 2006/0197753 A1 | 9/2006 | Hotelling |
| 2006/0238517 A1 | 10/2006 | King et al. |
| 2006/0238521 A1 | 10/2006 | Westerman et al. |
| 2006/0248469 A1* | 11/2006 | Czerwinski ......... G06F 3/04897 715/764 |
| 2006/0279532 A1 | 12/2006 | Olszewski et al. |
| 2007/0050726 A1 | 3/2007 | Wakai et al. |
| 2007/0055940 A1 | 3/2007 | Moore et al. |
| 2007/0061748 A1 | 3/2007 | Hirose |
| 2007/0064004 A1 | 3/2007 | Bonner et al. |
| 2007/0067711 A1 | 3/2007 | Woodall et al. |
| 2007/0079236 A1 | 4/2007 | Schrier et al. |
| 2007/0113198 A1 | 5/2007 | Robertson et al. |
| 2007/0126732 A1 | 6/2007 | Robertson et al. |
| 2007/0150810 A1* | 6/2007 | Katz .................... G06F 3/0481 715/229 |
| 2007/0150839 A1 | 6/2007 | Danninger |
| 2007/0152980 A1 | 7/2007 | Kocienda et al. |
| 2007/0152984 A1 | 7/2007 | Ording et al. |
| 2007/0160345 A1 | 7/2007 | Sakai et al. |
| 2007/0177803 A1* | 8/2007 | Elias .................. G06F 3/04883 382/188 |
| 2007/0186178 A1 | 8/2007 | Schiller |
| 2007/0188518 A1 | 8/2007 | Vale et al. |
| 2007/0192744 A1 | 8/2007 | Reponen |
| 2007/0192749 A1 | 8/2007 | Baudisch |
| 2007/0198942 A1 | 8/2007 | Morris |
| 2007/0220444 A1 | 9/2007 | Sunday et al. |
| 2007/0229471 A1 | 10/2007 | Kim et al. |
| 2007/0236475 A1 | 10/2007 | Wherry |
| 2007/0245257 A1 | 10/2007 | Chan et al. |
| 2007/0247435 A1 | 10/2007 | Benko et al. |
| 2007/0253025 A1 | 11/2007 | Terayoko |
| 2007/0257890 A1 | 11/2007 | Hotelling et al. |
| 2007/0263025 A1 | 11/2007 | Ohashi et al. |
| 2008/0019591 A1 | 1/2008 | Iwayama et al. |
| 2008/0022197 A1 | 1/2008 | Bargeron et al. |
| 2008/0034317 A1* | 2/2008 | Fard .................... G06F 3/0481 715/781 |
| 2008/0036743 A1 | 2/2008 | Westerman et al. |
| 2008/0042978 A1 | 2/2008 | Perez-Noguera |
| 2008/0052945 A1 | 3/2008 | Matas et al. |
| 2008/0066015 A1 | 3/2008 | Blankenhorn |
| 2008/0066016 A1 | 3/2008 | Dowdy et al. |
| 2008/0072173 A1 | 3/2008 | Brunner et al. |
| 2008/0094368 A1 | 4/2008 | Ording et al. |
| 2008/0094370 A1 | 4/2008 | Ording et al. |
| 2008/0098331 A1 | 4/2008 | Novick et al. |
| 2008/0100642 A1 | 5/2008 | Betancourt et al. |
| 2008/0109751 A1 | 5/2008 | Fitzmaurice et al. |
| 2008/0111766 A1 | 5/2008 | Uchino et al. |
| 2008/0136786 A1 | 6/2008 | Lanfermann |
| 2008/0140868 A1 | 6/2008 | Kalayjian et al. |
| 2008/0147664 A1 | 6/2008 | Fujiwara et al. |
| 2008/0148181 A1 | 6/2008 | Reyes et al. |
| 2008/0150715 A1 | 6/2008 | Tang et al. |
| 2008/0165141 A1 | 7/2008 | Christie |
| 2008/0165142 A1 | 7/2008 | Kocienda et al. |
| 2008/0167834 A1 | 7/2008 | Herz et al. |
| 2008/0168403 A1 | 7/2008 | Westerman et al. |
| 2008/0168404 A1* | 7/2008 | Ording ................ G06F 3/0485 715/863 |
| 2008/0174570 A1* | 7/2008 | Jobs .................... G06F 3/0488 345/173 |
| 2008/0180404 A1 | 7/2008 | Han et al. |
| 2008/0180405 A1 | 7/2008 | Han et al. |
| 2008/0180406 A1 | 7/2008 | Han et al. |
| 2008/0186285 A1 | 8/2008 | Shimizu |
| 2008/0211766 A1 | 9/2008 | Westerman et al. |
| 2008/0216022 A1 | 9/2008 | Lorch et al. |
| 2008/0229223 A1 | 9/2008 | Kake |
| 2008/0244410 A1 | 10/2008 | Schormann |
| 2008/0259040 A1 | 10/2008 | Ording et al. |
| 2008/0267468 A1 | 10/2008 | Geiger et al. |
| 2008/0270886 A1 | 10/2008 | Gossweiler et al. |
| 2008/0278455 A1 | 11/2008 | Atkins et al. |
| 2008/0284799 A1 | 11/2008 | Hollemans et al. |
| 2008/0297482 A1 | 12/2008 | Weiss |
| 2008/0303786 A1 | 12/2008 | Nakamura et al. |
| 2008/0309632 A1 | 12/2008 | Westerman et al. |
| 2008/0320391 A1 | 12/2008 | Lemay et al. |
| 2008/0320419 A1 | 12/2008 | Matas et al. |
| 2009/0013350 A1 | 1/2009 | Ohlfs et al. |
| 2009/0051660 A1 | 2/2009 | Feland et al. |
| 2009/0051946 A1 | 2/2009 | Hibi |
| 2009/0052751 A1* | 2/2009 | Chaney ............... G06K 9/6202 382/120 |
| 2009/0079700 A1 | 3/2009 | Abernathy |
| 2009/0083655 A1* | 3/2009 | Beharie ................ G06F 3/0481 715/781 |
| 2009/0100383 A1 | 4/2009 | Sunday et al. |
| 2009/0113330 A1 | 4/2009 | Garrison et al. |
| 2009/0122018 A1 | 5/2009 | Vymenets et al. |
| 2009/0140997 A1 | 6/2009 | Jeong et al. |
| 2009/0150775 A1 | 6/2009 | Miyazaki et al. |
| 2009/0158326 A1 | 6/2009 | Hunt et al. |
| 2009/0164936 A1 | 6/2009 | Kawaguchi |
| 2009/0172606 A1 | 7/2009 | Dunn et al. |
| 2009/0174679 A1 | 7/2009 | Westerman |
| 2009/0178008 A1 | 7/2009 | Herz et al. |
| 2009/0183930 A1 | 7/2009 | Yang et al. |
| 2009/0184939 A1 | 7/2009 | Wohlstadter et al. |
| 2009/0193351 A1 | 7/2009 | Lee et al. |
| 2009/0228792 A1 | 9/2009 | Van Os et al. |
| 2009/0231275 A1 | 9/2009 | Odgers |
| 2009/0237363 A1 | 9/2009 | Levy et al. |
| 2009/0239587 A1 | 9/2009 | Negron et al. |
| 2009/0256809 A1 | 10/2009 | Minor |
| 2009/0256857 A1 | 10/2009 | Davidson et al. |
| 2009/0259964 A1 | 10/2009 | Davidson et al. |
| 2009/0282332 A1 | 11/2009 | Porat |

(56) References Cited

U.S. PATENT DOCUMENTS

| | | |
|---|---|---|
| 2009/0282359 A1* | 11/2009 | Saul ............... G06F 3/0481 715/784 |
| 2009/0303231 A1 | 12/2009 | Robinet et al. |
| 2009/0307589 A1 | 12/2009 | Inose et al. |
| 2009/0309881 A1 | 12/2009 | Zhao et al. |
| 2009/0327975 A1 | 12/2009 | Stedman |
| 2010/0002002 A1 | 1/2010 | Lipsky et al. |
| 2010/0004030 A1 | 1/2010 | Nam |
| 2010/0007623 A1 | 1/2010 | Kaneko et al. |
| 2010/0017734 A1 | 1/2010 | Cummins et al. |
| 2010/0026647 A1* | 2/2010 | Abe ............... G06F 3/04883 345/173 |
| 2010/0031202 A1 | 2/2010 | Morris et al. |
| 2010/0031203 A1* | 2/2010 | Morris ............ G06F 3/04883 715/863 |
| 2010/0050076 A1 | 2/2010 | Roth |
| 2010/0053111 A1 | 3/2010 | Karlsson |
| 2010/0058238 A1 | 3/2010 | Ben Moshe |
| 2010/0073318 A1* | 3/2010 | Hu .................. G06F 3/044 345/174 |
| 2010/0088624 A1 | 4/2010 | Bligh et al. |
| 2010/0088641 A1 | 4/2010 | Choi |
| 2010/0090971 A1 | 4/2010 | Choi et al. |
| 2010/0095205 A1 | 4/2010 | Kinoshita |
| 2010/0095206 A1 | 4/2010 | Kim |
| 2010/0107101 A1 | 4/2010 | Shaw et al. |
| 2010/0134425 A1 | 6/2010 | Storrusten |
| 2010/0146436 A1 | 6/2010 | Jakobson et al. |
| 2010/0156813 A1 | 6/2010 | Duarte et al. |
| 2010/0162105 A1 | 6/2010 | Beebe et al. |
| 2010/0185949 A1 | 7/2010 | Jaeger |
| 2010/0194703 A1 | 8/2010 | Fedor et al. |
| 2010/0211920 A1 | 8/2010 | Westerman et al. |
| 2010/0214571 A1 | 8/2010 | Luo |
| 2010/0218100 A1 | 8/2010 | Simon et al. |
| 2010/0228746 A1 | 9/2010 | Harada |
| 2010/0231533 A1 | 9/2010 | Chaudhri |
| 2010/0235794 A1 | 9/2010 | Ording |
| 2010/0241955 A1 | 9/2010 | Price et al. |
| 2010/0283743 A1* | 11/2010 | Coddington ......... G06F 3/0485 345/173 |
| 2010/0283750 A1 | 11/2010 | Kang et al. |
| 2010/0283754 A1 | 11/2010 | Nakao |
| 2010/0289760 A1 | 11/2010 | Jonoshita et al. |
| 2010/0299598 A1 | 11/2010 | Shin et al. |
| 2010/0302176 A1 | 12/2010 | Nikula et al. |
| 2010/0309140 A1* | 12/2010 | Widgor ............ G06F 3/04883 345/173 |
| 2010/0313125 A1 | 12/2010 | Fleizach et al. |
| 2010/0313126 A1 | 12/2010 | Jung et al. |
| 2010/0318904 A1 | 12/2010 | Hillis et al. |
| 2010/0325529 A1 | 12/2010 | Sun |
| 2010/0333044 A1 | 12/2010 | Kethireddy |
| 2011/0004830 A1 | 1/2011 | Von Kaenel et al. |
| 2011/0010672 A1 | 1/2011 | Hope |
| 2011/0012848 A1 | 1/2011 | Li et al. |
| 2011/0012856 A1 | 1/2011 | Maxwell et al. |
| 2011/0018821 A1 | 1/2011 | Kii |
| 2011/0029927 A1 | 2/2011 | Lietzke et al. |
| 2011/0029934 A1 | 2/2011 | Locker et al. |
| 2011/0055742 A1* | 3/2011 | Tomono ............ G06F 3/0485 715/766 |
| 2011/0069016 A1 | 3/2011 | Victor |
| 2011/0069017 A1 | 3/2011 | Victor |
| 2011/0069018 A1 | 3/2011 | Atkins et al. |
| 2011/0074710 A1 | 3/2011 | Weeldreyer et al. |
| 2011/0093812 A1 | 4/2011 | Fong |
| 2011/0093821 A1 | 4/2011 | Wigdor et al. |
| 2011/0109581 A1 | 5/2011 | Ozawa et al. |
| 2011/0128367 A1 | 6/2011 | Yoshioka et al. |
| 2011/0145759 A1 | 6/2011 | Leffert et al. |
| 2011/0163944 A1 | 7/2011 | Bilbrey et al. |
| 2011/0163968 A1 | 7/2011 | Hogan |
| 2011/0179368 A1 | 7/2011 | King et al. |
| 2011/0179373 A1 | 7/2011 | Moore et al. |
| 2011/0185316 A1 | 7/2011 | Reid et al. |
| 2011/0185321 A1 | 7/2011 | Capela et al. |
| 2011/0209058 A1 | 8/2011 | Hinckley et al. |
| 2011/0209100 A1 | 8/2011 | Hinckley et al. |
| 2011/0209102 A1 | 8/2011 | Hinckley et al. |
| 2011/0209104 A1 | 8/2011 | Hinckley et al. |
| 2011/0231796 A1 | 9/2011 | Vigil |
| 2011/0252370 A1 | 10/2011 | Chaudhri |
| 2011/0252380 A1 | 10/2011 | Chaudhri |
| 2011/0252381 A1 | 10/2011 | Chaudhri |
| 2011/0258537 A1 | 10/2011 | Rives et al. |
| 2011/0302519 A1 | 12/2011 | Fleizach et al. |
| 2012/0023453 A1 | 1/2012 | Wagner |
| 2012/0023459 A1 | 1/2012 | Westerman |
| 2012/0026100 A1 | 2/2012 | Migos et al. |
| 2012/0030568 A1 | 2/2012 | Migos et al. |
| 2012/0030569 A1 | 2/2012 | Migos et al. |
| 2012/0044150 A1 | 2/2012 | Karpin et al. |
| 2012/0166975 A1* | 6/2012 | Oh ................. G06F 3/0482 715/760 |
| 2012/0188275 A1* | 7/2012 | Shimazu ............ G06F 3/0488 345/629 |
| 2013/0174062 A1 | 7/2013 | Stoustrup |
| 2013/0215064 A1 | 8/2013 | Cholewin et al. |
| 2013/0263055 A1 | 10/2013 | Victor |
| 2014/0002387 A1* | 1/2014 | Hashiba ............ G06F 3/041 345/173 |
| 2014/0075373 A1* | 3/2014 | Jitkoff ........... G06F 3/0481 715/784 |
| 2014/0075374 A1* | 3/2014 | Jitkoff ........... G06F 3/0481 715/784 |
| 2015/0007099 A1* | 1/2015 | Bernaudin .......... G06F 3/0484 715/783 |
| 2015/0015502 A1* | 1/2015 | Al-Nasser ............ G04G 17/08 345/173 |
| 2015/0111558 A1* | 4/2015 | Yang ............... G04G 21/04 455/418 |
| 2015/0309692 A1 | 10/2015 | Migos |
| 2016/0216868 A1 | 7/2016 | Victor |

FOREIGN PATENT DOCUMENTS

| | | |
|---|---|---|
| CN | 101458586 A | 6/2009 |
| CN | 101599002 A | 12/2009 |
| CN | 101617288 A | 12/2009 |
| EP | 1577746 A2 | 9/2005 |
| EP | 1615114 A2 | 1/2006 |
| EP | 1840717 A1 | 10/2007 |
| EP | 2060970 A1 | 5/2009 |
| EP | 2068237 A2 | 6/2009 |
| EP | 2136290 A2 | 12/2009 |
| EP | 2284675 A2 | 2/2011 |
| JP | 7-175587 A | 7/1995 |
| JP | 2001-228971 A | 8/2001 |
| JP | 2004-234661 A | 8/2004 |
| JP | 2009-217815 A | 9/2009 |
| JP | 2013-541061 A | 11/2013 |
| KR | 10-2005-0051638 A | 6/2005 |
| KR | 10-2009-0070491 A | 7/2009 |
| WO | 2000/016186 A2 | 3/2000 |
| WO | 2005/106800 A2 | 11/2005 |
| WO | 2006/020305 A2 | 2/2006 |
| WO | 2007/098243 A2 | 8/2007 |
| WO | 2008/044024 A2 | 4/2008 |
| WO | 2008/085737 A1 | 7/2008 |
| WO | 2008/138046 A1 | 11/2008 |
| WO | 2009/084141 A1 | 7/2009 |
| WO | 2009/084809 A1 | 7/2009 |
| WO | 2012/015933 A1 | 2/2012 |

OTHER PUBLICATIONS

Rubine, "The Automatic Recognition of Gestures," Dec. 1991, https://www.cs.cmu.edu/~music/papers/dean_rubine_thesis.pdf.*

(56) References Cited

OTHER PUBLICATIONS

Westerman et al., "Multi-Touch: A New Tactile 2-D Gesture Interface for Human-Computer Interaction," 2001, https://www.eecis.udel.edu/~westerma/HFES_multitouch_proceedings.pdf.*
Anthes, "Give your computer the finger: Touch-screen tech comes of age," Feb. 1, 2008, http://www.computerworld.com/article/2538989/computer-hardware/give-your-computer-the-finger--touch-screen-tech-comes-of-age.html.*
NextWindow, "NextWindow's Multi-Touch Overview," 2007, http://www.touch-base.com/documentation/Documents/nextwindow_multitouch.pdf.*
Korman, "Intuition, pleasure, and gestures," Oct. 5, 2007, https://www.cooper.com/journal/2007/10/intuition_pleasure_and_gesture.*
Spadaccini, "Multitouch Exhibit Design 1: Interaction and Feedback," Feb. 25, 2009, http://ideum.com/2009/02/25/multitouch-exhibit-design-1-interaction-and-feedback/.*
Brown, "Touch mice: Smartphone-style input on your PC?," Feb. 15, 2012, https://www.cnet.com/news/touch-mice-smartphone-style-input-on-your-pc/.*
Thurrott, "Windows 8 Tip: Use Trackpad Multitouch Gestures," Nov. 10, 2012, http://winsupersite.com/windows-8/windows-8-tip-use-trackpad-multi-touch-gestures.*
*Apple Inc.* vs. *Samsung Electronics Co. Ltd. et al.*, Judgment in Interlocutory proceeding, Case No. 396957/KG ZA 11-730, civil law sector, Aug. 24, 2011, pp. 1-65.
*Apple Inc.* vs. *Samsung Electronics Co. Ltd., et al.*, Samsung's Motion to Supplement Invalidity Contentions, Case No. 11-cv-01846-LHK, filed Jan. 27, 2012 together with Exhibit 6, Jan. 27, 2012, 47 pages.
*Apple Inc.* vs. *Samsung Electronics Co. Ltd., et al.*, Samsung's Patent Local Rule 3-3 and 3-4 Disclosures, Case No. 11-cv-01846-LHK, dated Oct. 7, 2011, together with Exhibits G-1 through G-7 and Exhibit H, Oct. 7, 2011, 287 pages.
HTC Europe Co. Ltd and Apple Inc. Invalidity Claim dated Apr. 5, 2012, together with annexes, 12 pages.
HTC Europe Co. Ltd and Apple Inc. invalidity Claim dated Jul. 29, 2011, together with amended Particulars of Claim and amended Grounds of Invalidity, 22 pages.
Motorola Mobility Opposition Grounds to Apple Inc. European Patent EP 2126678 dated Apr. 11, 2012, together with Exhibits E3, E4, and E5 re: CHT 2005, Apr. 2-7, 2005, Portland Oregon, USA, Apr. 2012, 53 pages.
Pleading notes Mr B.J. Berghuis van Woodman, in matter of *Apple Inc.* vs *Samsung Electronics*, Case No. KG ZA 11-730 and KG ZA 11-731,, Aug. 10-11, 2010, pp. 1-16.
Pleading notes Mr Kleemans, Mr Blomme and Mr Van Oorschot, in matter of *Apple Inc.* vs *Samsung Electronics*, Case No. KG ZA 11-730 and KG ZA 11-731, Aug. 10, 2011, 35 pages.
*Samsung Electronics GmbH* vs *Apple Inc.*, "List scrolling and document translation, scaling and rotation on a touch-screen display", Opposition, Jan. 30, 2012, 27 pages.
*Samsung Electronics* vs *Apple Inc.*, Statement of Defense Also Counterclaim, Case No. KG ZA 2011-730, Jul. 20, 2011, 44 pages.
*Samsung Electronics* vs *Apple Inc.*, Statement of Defense Also Counterclaim, Case No. KG ZA 2011-731, Jul. 20, 2011, 48 pages.
Office Action received for European Patent Application No. 09756118.7, dated Feb. 13, 2013, 5 pages.
Office Action received for European Patent Application No. 09756118.7, dated Mar. 7, 2014, 7 pages.
Notice of Allowance received for Korean Patent Application No. 10-2012-7022209, dated Apr. 28, 2014, 5 pages (Official Copy only).(See Communication under 37 CFR § 1.98(a) (3)).
Office Action Received for Korean Patent Application No. 10-2012-7022448, dated Jun. 13, 2014, 3 pages (Official Copy only).(See Communication under 37 CFR § 1.98(a) (3)).
Notice of Allowance received for Korean Patent Application No. 10-2013-7003785, dated Aug. 14, 2014, 2 pages (Official Copy only).(See Communication under 37 CFR § 1.98(a) (3)).

Office Action received for Korean Patent Application No. 10-2013-7003785, dated Jan. 28, 2014, 4 pages (Official Copy only).(See Communication under 37 CFR § 1.98(a) (3)).
Office Action received for European Patent Application No. 11702357.2, dated Jan. 14, 2014, 5 pages.
Office Action received for European Patent Application No. 11741385.6, dated Jan. 22, 2014, 3 pages.
Office Action received for European Patent Application No. 11741385.6, dated Sep. 16, 2014, 7 pages.
Notice of Allowance received for U.S. Appl. No. 12/567,171, dated Apr. 1, 2014, 8 pages.
Non-Final Office Action received for U.S. Appl. No. 12/567,405, dated Jan. 16, 2014, 19 pages.
Notice of Allowance received for U.S. Appl. No. 12/567,405, dated Jun. 11, 2014, 9 pages.
Notice of Allowance received for U.S. Appl. No. 12/768,623, dated Feb. 20, 2014, 8 pages.
Notice of Allowance received for U.S. Appl. No. 12/848,063, dated Dec. 4, 2014, 8 pages.
Notice of Allowance received for U.S. Appl. No. 12/848,063, dated Mar. 27, 2015, 8 pages.
Non Final Office Action received for U.S. Appl. No. 12/848,067, dated Apr. 16, 2014, 40 pages.
Notice of Allowance received for U.S. Appl. No. 12/848,067, dated Dec. 12, 2014, 2 pages.
Notice of Allowance received for U.S. Appl. No. 12/848,067, dated Oct. 22, 2014, 23 pages.
Notice of Allowance received for U.S. Appl. No. 12/848,074, dated Mar. 13, 2015, 8 pages.
Notice of Allowance received for U.S. Appl. No. 12/848,074, dated May 13, 2014, 10 pages.
Final Office Action received for U.S. Appl. No. 12/848,087, dated Jan. 28, 2015, 30 pages.
Non-Final Office Action received for U.S. Appl. No. 12/848,087, dated Jul. 14, 2014, 18 pages.
Non-Final Office Action received for U.S. Appl. No. 13/909,001, dated Sep. 26, 2013, 7 pages.
Notice of Allowance received for U.S. Appl. No. 13/909,001, dated Mar. 3, 2014, 7 pages.
Notice of Acceptance received for Australian Patent Application No. 2011209729, dated Jan. 15, 2015, 2 pages.
Office Action received for Chinese Patent Application No. 201180016102.7, dated Oct. 16, 2014, 10 pages (Official Copy only).(See Communication under 37 CFR § 1.98(a) (3)).
Office Action received for Chinese Patent Application No. 201180037474.8, dated Dec. 22, 2014, 6 pages (Official Copy only).(See Communication under 37 CFR § 1.98(a) (3)).
Office Action received for Japanese Patent Application No. 2013-521943, dated Feb. 27, 2015, 2 pages (Official Copy only).(See Communication under 37 CFR § 1.98(a) (3)).
Office Action received for Japanese Patent Application No. 2013-521943, dated Jan. 6, 2014, 2 pages (Official Copy only).(See Communication under 37 CFR § 1.98(a) (3)).
Office Action received for Japanese Patent Application No. 2013-521943, dated Sep. 1, 2014, 2 pages (Official Copy only).(See Communication under 37 CFR § 1.98(a) (3)).
Beaudouin-Lafon, M., "Novel Interaction Techniques for Overlapping Windows", Available at <http://portal.acm.org/citation.cfm?id=502371>, Nov. 11-14, 2001, pp. 153-154.
International Preliminary Report on Patentability received for PCT Patent Application No. PCT/US2011/022532, dated Aug. 9, 2012, 11 pages.
International Preliminary Report on Patentability received for PCT Patent Application No. PCT/US2011/022525, dated Aug. 9, 2012, 8 pages.
Guimbretiere, Francois, "Paper Augmented Digital Documents", CHI Letters, vol. 5, No. 2, 2003, pp. 51-60.
International Preliminary Report on Patentability received for PCT Patent Application No. PCT/US2009/057899, dated Apr. 5, 2012, 14 pages.
International Preliminary Report on Patentability received for PCT Patent Application No. PCT/US2011/022519, dated Aug. 9, 2012, 8 pages.

(56) References Cited

OTHER PUBLICATIONS

Notice of Allowance received for Korean Patent Application No. 10-2012-7022448, dated Apr. 27, 2015, 2 pages (Official Copy only). (See Communication under 37 CFR § 1.98(a) (3)).
Notice of Allowance received for U.S. Appl. No. 12/848,074, dated Apr. 28, 2015, 5 pages.
Office Action received for Chinese Patent Application No. 201180037474.8, dated Aug. 24, 2015, 8 pages (3 pages of English Translation and 5 pages of Official Copy).
Office Action Received for European Patent Application No. 09756118.7, dated Oct. 8, 2015, 6 pages.
Notice of Acceptance received for Australian Patent Application No. 2011282703, dated May 8, 2015, 2 pages.
Office Action received for Chinese Patent Application No. 201180016102.7, dated Aug. 25, 2015, 23 pages (14 pages of English Translation and 9 pages of Official copy).
Notice of Allowance received for U.S. Appl. No. 13/909,002, dated Dec. 4, 2015, 7 pages.
Office Action Received for Japanese Patent Application No. 2013521943, dated Nov. 2, 2015, 4 pages (2 pages of English Translation and 2 pages of Official Copy).
Office Action received for Chinese Patent Application No. 2011800161027, dated Mar. 9, 2016, 8 pages (3 pages of English Translation and 5 pages of Official Copy).
Office Action received for Australian Patent Application No. 2015202218, dated Feb. 12, 2016, 5 pages.
Intention to Grant received for European Patent Application No. 11702357.2, dated Feb. 26, 2016, 6 pages.
Notice of Allowance received for Chinese Patent Application No. 201180037474.8, dated Mar. 3, 2016, 3 pages (2 pages of English Translation and 1 page of Official Copy).
Decision on Appeal received for Japanese Patent Application No. 2013521943, dated Mar. 25, 2016, 3 pages (1 page of English Translation and 2 pages of Official Copy).
Bumptop, "3D Desktop", Available at <http://www.youtube.com/watch?v=I_IxBwvf3Vk>, retrieved on Sep. 18, 2006, 2 pages.
Notice of Allowance received for U.S. Appl. No. 12/567,206, dated Aug. 21, 2014, 6 pages.
Non-Final Office Action received for U.S. Appl. No. 12/848,067, dated Jun. 6, 2012, 16 pages.
Final Office Action received for U.S. Appl. No. 12/848,074, dated Apr. 3, 2013, 15 pages.
Non-Final Office Action received for U.S. Appl. No. 12/848,074, dated Jun. 29, 2012, 12 pages.
Final Office Action received for U.S. Appl. No. 12/848,087, dated Aug. 22, 2013, 22 pages.
Non-Final Office Action received for U.S. Appl. No. 12/848,087, dated Mar. 7, 2013, 19 pages.
Office Action received for Australian Patent Application No. 2011209729, dated Jun. 24, 2013, 4 pages.
Office Action received for Australian Patent Application No. 2011282703, dated Oct. 21, 2013, 3 pages.
"Spaces (software)", Wikipedia, the free encyclopedia, available at <http://en.wikipedia.org/wiki/Spaces_(software)>, Jul. 15, 2009, 3 pages.
"Virtual Desktop", Wikipedia, the free encyclopedia, available at <http://en.wikipedia.org/wiki/Virtual_desktop>, Jul. 20, 2009, 3 pages.
ALAI6666, "Jeff Han's 8 ft. Multi-Touch Display Wall", Available at <http://www.youtube.com/watch?v=JfFwgPuEdSk>, retrieved on May 16, 2007, 2 pages.
Alessandro, Valli, "Minority Report Interface Prototype", Available at <http://www.youtube.com/watch?v=3bn-zZX9kdc>, retrieved on Jul. 12, 2006, 3 pages.
Angell, "Is Bimanual the Future Paradigm for Human Computer Interaction?", University of Plymouth, 2006, 36 pages.
apple.com, "Pages Keyboard Shortcuts", Available at <http://www.apple.com/support/pages/shortcuts/>, retrieved on Jan. 18, 2010, 6 pages.

Apted et al., "Tabletop Sharing of Digital Photographs for the Elderly", CHI 2006: Proceedings, Montreal, Quebec, Canada, Apr. 2006, 10 pages.
Autodesklabs, "Autodesk Design on Jeff Han's Perceptive Pixel Multi-Touch", Available at <http://www.youtube.com/watch?v=O7ENumwMohs>, retrieved on Jul. 27, 2007, 2 pages.
Baudisch, Patrick, "The Cage: Efficient Construction in 3D using a Cubic Adaptive Grid", Proceedings of the 9th annual ACM symposium on User interface software and technology UIST '96, 1996, 2 pages.
Beaudouin-Lafon et al., "CPN/Tools: A Post-WIMP Interface for Editing and Simulating Coloured Petri Nets", Proceedings of 22nd International Conference on Application and Theory of Petri Nets 2001, 2001, pp. 1-10.
Bederson, B., "PhotoMesa: A Zoomable Image Browser Using Quantum Treemaps and Bubble", UIST 2001, Orlando, Florida, Nov. 2001, 10 pages.
Benko et al., "Precise Selection Techniques for Multi-Touch Screens", CHI 2006, Apr. 22-27, 2006, 10 pages.
BESTSHEEP1, "TDesk Multiuser", Available on <http://www.youtube.com/watch?v=PjsO-Ibli34>, retrieved on Sep. 6, 2007, 2 pages.
Botjunkie, "Microsoft Surface Demo @ CES 2008", Available at <http://www.youtube.com/watch?v=Zxk_WywMTzc>, retrieved on Jan. 8, 2008, 2 pages.
Brandl et al., "Combining and Measuring the Benefits of Bimanual Pen and Direct-Touch Interaction on Horizontal Interfaces", AVI'08, Naples, Italy, May 2008, pp. 1-8.
Brandl, P., "Combining and Measuring the Benefits of Bimanual Pen and Direct-Touch Interaction on Horizontal Interfaces", Media Interaction Lab, Side presentation, May 2008, 26 pages.
Butz et al., "Hybrid Widgets on an Interactive Tabletop", Ubicomp '07, Innsbruck, Austria, Sep. 2007, 7 pages.
Buxton, Bill, "A Multi-Touch Three Dimensional Touch-Tablet", Available at <http://www.youtube.com/watch?v=Arrus9CxUiA>, retrieved on Nov. 18, 2009, 3 pages.
Buxton, W. et al., "A Study in Two-Handed Input", Proceedings of CHI '86, Boston, MA, Apr. 1986, 10 pages.
Buxton, W., "Chapter 11: Two-Handed Input in Human-Computer Interaction", Aug. 22, 2008, pp. 11.1-11.18.
Buxton, W., "Chapter 5: Case Study 1: Touch Tablets", Haptic Input, Jan. 4, 2009, 20 pages.
Buxton, W. et al., "Issues and Techniques in Touch-Sensitive Tablet Input", Computer Graphics 19(3), Available at <http://http://www.dgp.toronto.edu/OTP/papers/bill.buxton/touch.html>, Proceedings of SIGGRAPH'85, 1985, pp. 215-224.
Buxton, W. et al., "Multi-Touch Systems that I Have Known and Loved", Available at <http://www.billbuxton.com/multitouchOverview.html>, Jan. 12, 2007, pp. 1-21.
Chanfrado, "Multi Touch (new touchscreen technology)", Available at <http://www.youtube.com/watch?v=1ftJhDBZqss>, retrieved on Mar. 17, 2006, 2 pages.
Chen, et al., "Relative role of merging and two-handed operation on command selection speed", Int. J. Human-Computer Studies 66 (2008), Jun. 2008, pp. 729-740.
Cho, et al., "Interaction for Tabletop Computing Environment: An Analysis and Implementation", Science and Technology (2005), ACM, 2005, pp. 11-18.
Cocoadex, "Photo Touch: Multi-touch Photo Organization for your Mac", Available at <http://www.youtube.com/watch?v=D7x7jV3P1-0>, retrieved on Mar. 30, 2008, 3 pages.
Continuumshow, "IdentityMine's multitude of Multi-touch apps", Available at <http://www.youtube.com/watch?v=HcpdNb9LHns>, retrieved on Nov. 6, 2008, 3 pages.
Couturier et al., "Pointing Fingers: Using Multiple Direct Interactions with Visual Objects to Perform Music", Proceedings of the 2003 Conference on New Interfaces for Musical Expression May 2003, Montreal, Canada, May 2003, pp. 184-187.
Cutedraw, "Moving, Rotating, Resizing and Flipping Shapes", Available at <http://www.cutedraw.com/Moving,%20Rotating,%20Resizing%20Flipping%20Shapes.php>, 2007, 5 pages.

(56) References Cited

OTHER PUBLICATIONS

Darthstoo, "Wii Multi-touch Photo Gallery", Available at <http://www.youtube.com/watch?v=0CYVxQ2OM9s>, retrieved on Apr. 10, 2008, 3 pages.
Derene, G., "Microsoft Surface: Behind-the-Scenes First Look", Popular Mechanics.com, Available at <http://www.popularmechanics.com/technology/gadgets/news/4217348?page=3>, Jul. 1, 2007, 4 pages.
Dwigdor, "Lucid Touch: a See-Through Multi-Touch Mobile Device", Available at <http://www.youtube.com/watch?v=qbMQ7urAvuc>, retrieved on Aug. 21, 2007, 2 pages.
Engadget, "LG.Philips 52-inch Multi-Touch Display", Available at <http://www.youtube.com/watch?v=9qO-diu4jq4>, retrieved on Jan. 8, 2008, 2 pages.
FOXMULD3R, "Multi-touch Interface (from Adobe TED)", Available at <http://www.youtube.com/watch?v=UcKqyn-gUbY>, retrieved on Aug. 3, 2006, 2 pages.
Faas, Ryan, "Spaces: A Look at Apple's Take on Virtual Desktops in Leopard", Computerworld, Available at <http://www.computerworld.com/s/article/9005267/Spaces_A_look_at_Apple_s_take_on_virtual_desktops_in_Leopard?taxonomyName . . . >, Nov. 21, 2006, 3 pages.
Fingerworks Forums, "FingerWorks Support Forums—Product Comments—TouchStream KeyBoards—Is the Multitouch Lemur", available at <http://64233.167.104/search?q=cache:sjVdtyFBvRMJ:forums.finger>, Dec. 24, 2004, 2 pages.
Fingerworks, Inc., "Installation and Operation Guide for iGesture Products w/Keys", Available at <www.fingerworks.com>, © 2002, 10 pages.
Fingerworks, Inc., "Installation and Operation Guide for the TouchStream", Available at <http://www.fingerworks.com>, 2002, 14 pages.
Fingerworks, Inc., "Quick Reference Guide for iGesture Products", Available at <http://www.fingerworks.com>, 1999-2002, 2 pages.
Fingerworks, Inc., "Quick Reference Guide for TouchStream ST/LP", Available at <http://www.fingerworks.com>, © 2001-2002, 4 pages.
Fingerworks, Inc., "TouchStream LP Silver", Available at <http://www.fingerworks.com>, Apr. 27, 2005, 18 pages.
Google Docs, "Move, Resize and Rotate Objects", Available at <http://docs.google.com/support/bin/answer.py?hl=en&answer=141914>, retrieved on Jan. 18, 2010, 1 page.
Notice of Allowance received for U.S. Appl. No. 12/848,074, dated Jun. 3, 2015, 5 pages.
Non-Final Office Action received for U.S. Appl. No. 13/909,002, dated Jun. 23, 2015, 6 pages.
International Search Report and Written Opinion received for PCT Patent Application No. PCT/US2011/022519, dated Jul. 1, 2011, 3 pages.
International Search Report and Written Opinion received for PCT Patent Application No. PCT/US2009/057899, dated Jun. 14, 2010, 19 pages.
International Search Report and Written Opinion received for PCT Patent Application No. PCT/US2011/022525, dated Apr. 27, 2011, 10 pages.
International Search Report and Written Opinion received for PCT Patent Application No. PCT/US2011/022532, dated May 24, 2011, 16 pages.
International Search Report and Written Opinion received for PCT Patent Application No. PCT/US2011/045552, dated Dec. 13, 2011, 4 pages.
International Preliminary Report on Patentability received for PCT Patent Application No. PCT/US2011/045552, dated Feb. 14, 2013, 8 pages.
Invitation to Pay Additional Fees received for PCT Patent Application No. PCT/US2009/057899, dated Apr. 29, 2010, 8 pages.
Office Action received for Korean Patent Application No. 10-2012-7022209, dated Oct. 21, 2013, 1 page.
Final Office Action received for U.S. Appl. No. 12/567,171, dated Jan. 3, 2013, 12 pages.

Non-Final Office Action received for U.S. Appl. No. 12/567,171, dated Jul. 6, 2012, 13 pages.
Notice of Allowance received for U.S. Appl. No. 12/567,171, dated Oct. 4, 2013, 9 pages.
Final Office Action received for U.S. Appl. No. 12/567,206 dated Apr. 4, 2013, 21 pages.
Non Final Office Action received for U.S. Appl. No. 12/567,206 dated Aug. 30, 2012, 13 pages.
Notice of Allowance received for U.S. Appl. No. 12/567,206 dated May 8, 2014, 8 pages.
Notice of Allowance received for U.S. Appl. No. 12/567,206, dated Aug. 8, 2013, 8 pages.
Final Office Action received for U.S. Appl. No. 12/567,405, dated Dec. 17, 2012, 19 pages.
Non-Final Office Action received for U.S. Appl. No. 12/567,405, dated May 17, 2012, 14 pages.
Non-Final Office Action received for U.S. Appl. No. 12/567,460, dated Aug. 4, 2011, 13 pages.
Notice of Allowance received for U.S. Appl. No. 12/567,460, dated Apr. 10, 2013, 9 pages.
Notice of Allowance received for U.S. Appl. No. 12/567,460, dated Aug. 10, 2012, 8 pages.
Notice of Allowance received for U.S. Appl. No. 12/567,460, dated Dec. 24, 2012, 8 pages.
Notice of Allowance received for U.S. Appl. No. 12/567,460, dated Jan. 18, 2012, 8 pages.
Final Office Action received for U.S. Appl. No. 12/567,553, dated Mar. 12, 2012, 15 pages.
Non-Final Office Action received for U.S. Appl. No. 12/567,553, dated Sep. 16, 2011, 11 pages.
Notice of Allowance received for U.S. Appl. No. 12/567,553, dated Apr. 2, 2013, 9 pages.
Notice of Allowance received for U.S. Appl. No. 12/567,553, dated Aug. 10, 2012, 8 pages.
Notice of Allowance received for U.S. Appl. No. 12/567,553, dated Dec. 24, 2012, 8 pages.
Notice of Allowance received for U.S. Appl. No. 12/567,553, dated Jun. 12, 2012, 8 pages.
Notice of Allowance received for U.S. Appl. No. 12/567,570, dated Dec. 19, 2012, 7 pages.
Notice of Allowance received for U.S. Appl. No. 12/567,570, dated Mar. 27, 2013, 8 pages.
Final Office Action received for U.S. Appl. No. 12/768,623, dated Jan. 22, 2013, 34 pages.
Final Office Action received for U.S. Appl. No. 12/768,623, dated Oct. 23, 2013, 31 pages.
Non-Final Office Action received for U.S. Appl. No. 12/768,623, dated Jun. 7, 2012, 12 pages.
Non-Final Office Action received for U.S. Appl. No. 12/768,623, dated May 30, 2013, 34 pages.
Final Office Action received for U.S. Appl. No. 12/790,504, dated Apr. 1, 2013, 21 pages.
Non-Final Office Action received for U.S. Appl. No. 12/790,504, dated Oct. 3, 2012, 22 pages.
Notice of Allowance received for U.S. Appl. No. 12/790,504, dated Aug. 13, 2013, 14 pages.
Non-Final Office Action received for U.S. Appl. No. 12/790,508, dated Nov. 7, 2012, 32 pages.
Notice of Allowance received for U.S. Appl. No. 12/790,508, dated Jul. 10, 2013, 7 pages.
Notice of Allowance received for U.S. Appl. No. 12/790,508, dated Nov. 8, 2013, 11 pages.
Non-Final Office Action received for U.S. Appl. No. 12/790,516, dated Aug. 27, 2012, 9 pages.
Non-Final Office Action received for U.S. Appl. No. 12/790,516, dated Feb. 2, 2012, 10 pages.
Notice of Allowance received for U.S. Appl. No. 12/790,516, dated May 15, 2013, 7 pages.
Non-Final Office Action received for U.S. Appl. No. 12/790,524, dated Sep. 24, 2012, 22 pages.
Notice of Allowance received for U.S. Appl. No. 12/790,524, dated Feb. 5, 2013, 8 pages.

(56) References Cited

OTHER PUBLICATIONS

Notice of Allowance received for U.S. Appl. No. 12/790,524, dated May 13, 2013, 6 pages.
Final Office Action received for U.S. Appl. No. 12/848,063, dated Oct. 11, 2013, 15 pages.
Non-Final Office Action received for U.S. Appl. No. 12/848,063, dated Aug. 9, 2012, 14 pages.
Non-Final Office Action received for U.S. Appl. No. 12/848,063, dated Mar. 29, 2013, 13 pages.
Final Office Action received for U.S. Appl. No. 12/848,067, dated Jan. 10, 2013, 35 pages.
Guimbretiére et al., "Benefits of Merging Command Selection and Direct Manipulation", ACM Transactions on Computer-Human Interaction, vol. 12, No. 3, Sep. 2005, pp. 460-476.
Guimbretiére, F., "Curriculum Vitae", 2008, 5 pages.
Hcikonstanz, "Multi-touch Interaction: Browser Control", Available at <http://www.youtube.com/watch?v=jTOK5Zbfm4U>, retrieved on Sep. 12, 2008, 2 pages.
Hinckley et al., "Interaction and Modeling Techniques for Desktop Two-Handed Input", UIST '98, San Francisco, CA, Nov. 1998, 10 pages.
Hinckley, K., "Haptic Issues for Virtual Manipulation", University of Virginia, Dissertation Presented, Available at <http://research.microsoft.com/en-us/um/peoplekenh/all-published-papers/hinckley-thesis-haptic-issues-for-virtual-manipulation.pdf>, Dec. 1996, 216 pages.
Hodges et al., "ThinSight: Versatile Multi-touch Sensing for Thin Form-factor Displays", UIST '07, Newport, Rhode Island, USA, Oct. 7-10, 2007, 10 pages.
Hudson, Scott E., "Adaptive Semantic Snaping—A Technique for Semantic Feedback at the Lexical Level", Proceedings of the SIGCHI Conference on Human Factors in Computing Systems, Apr. 1990, pp. 65-70.
I3PGROUP, "I3 MultiTouch Interactive Table", Available at <http://www.youtube.com/watch?v=M2oijV-bRrw>, retrieved on Nov. 16, 2007, 2 pages.
IBM, "Resizing Shapes by Dragging Sizing Handles", IBM WebSphere Help System, available at <http://publib.boulder.ibm.com/infocenter/wsadhelp/v5r1m2/index.jsp?topic=/com.rational.xtools.umivisualizer.doc/topics/tresizedrag.html>, 1999, 1 page.
Inkspace, "Inkscape Tutorial: Basic", Inkscape.org, Available at <http://web.archive.org/web20051225021958/http://inkscape.org/doc/basic/tutorial-basic.html>, Apr. 20, 2005, pp. 1-7.
Intuilab, "Multitouch Time and Geo Tagging Photosharing with IntuiFace", Available at <http://www.youtube.com/watch?v=ftsx21liFvo>, retrieved on Jan. 31, 2008, 3 pages.
Jin et al., "GIA: Design of a Gesture-Based Interaction Photo Album", Pers Ubiquit Comput, Jul. 1, 2004, pp. 227-233.
Kane et al., "Slide Rule: Making Mobile Touch Screens Accessible to Blind People Using Multi-Touch Interaction Techniques", Assets, Oct. 13-15, 2008, pp. 73-80.
Karsenty et al., "Inferring Graphical Constraints with Rockit", Digital-Paris Research Laboratory, Mar. 1992, 30 pages.
Krishnaarava, "Cubit—Open Source Multitouch Display", Available at <http://www.youtube.com/watch?v=btFIrrDiUxk>, retrieved on May 2, 2008, 3 pages.
Kristensson et al., "InfoTouch: An Explorative Multi-Touch Visualization Interface for Tagged Photo Collections", Proceedings NordiCHI 2008, Jul. 16, 2005, pp. 491-494.
Kurata et al., "Tangible Tabletop Interface for an Expert to Collaborate with Remote Field Workers", CollabTech2005, Slides, Jul. 16, 2005, 27 pages.
Kurata et al., "Tangible Tabletop Interface for an Expert to Collaborate with Remote Field Workers", CollabTech2005, Jul. 16, 2005, pp. 58-63.
Kurtenbach et al., "The Design of a GUI Paradigm based on Tablets, Two-hands, and Transparency", Mar. 27, 1997, 8 pages.
Lee et al., "A Multi-Touch Three Dimensional Touch-Sensitive Tablet", CHI '85 Proceedings of the SIGCHI Conference on Human Factors in Computing Systems, Apr. 1985, pp. 21-25.

Malik et al., "Visual Touchpad: A Two-Handed Gestural Input Device", ICMI'04 Proceedings of the 6th International Conference on Multimodal Intercases, ACM, Oct. 13-15, 2004, pp. 289-296.
Markandtanya, "Imagining Multi-touch in Outlook", May 2008, 3 pages.
Markusson, D., "Interface Development of a Multi-Touch Photo Browser", Umea University, Master's Thesis presented, Apr. 18, 2008, 76 pages.
Matsushita et al., "Dual Touch: A Two-Handed Interface for Pen-Based PDAs", UIST '00, San Diego, California, Nov. 2000, 2 pages.
Matsushita et al., "HoloWall: Designing a Finger, Hand, Body and Object Sensitive Wall", UIST '97 Proceedings of the 10th annual ACM symposium on User interface software and technology, Oct. 1997, 2 pages.
Media Interaction Lab, "Bimanual Pen & Touch", Available at <http://mi-lab.org/projects/bimanual-pen-touch/>, Nov. 2008, 5 pages.
microsoft.com, "Quickly Copy Formatting with the Format Painter", Available at <http://office.microsoft.com/enus/help/HA012176101033.aspx>, 2003, 1 page.
Moscovich et al., "Indirect Mappings of Multi-touch Input Using One and Two Hands", CHI 2008, Florence, Italy, Apr. 2008, 9 pages.
Moscovich et al., "Multi-Finger Cursor Techniques", GI '06 Proceedings of Graphics Interface 2006, Quebec City, Quebec, Canada, Jun. 9, 2006, 7 pages.
Moscovich, T., "Multi-touch Interaction", CHI 2006, Montréal, Québec, Canada, Apr. 2006, pp. 1-4.
Moscovich, T., "Principles and Applications of Multi-touch Interaction", Brown University, Dissertation Presented, May 2007, 114 pages.
Mueller et al., "Visio 2007 for Dummies", John Wiley & Sons, Dec. 18, 2006, pp. 178-181.
Murphy, Peter, "Review: SBSH Calendar Touch", Available at <http://justanothermobilemonday.com/Wordpress/2008/12/08/review-sbsh-calendar-touch/>, Dec. 8, 2008, 7 pages.
Nepsihus, "PhotoApp (Multi-Touch)", Available at <http://www.youtube.com/watch?v=RJTVULGnZQ0>, retrieved on Dec. 30, 2007, 3 pages.
Raskin, A., "Enso 2.0 Design Thoughts", Aza's Thoughts, Available at <http://www.azaraskin/blog/post/enso-20-design-thoughts/>, Dec. 6, 2008, 16 pages.
Raskin, A., "Visual Feedback: Why Modes Kill", Humanized, Dec. 2006, 18 pages.
Sahlin et al., "Flash® CS4 All-in-One for Dummies®", John Wiley & Sons, Dec. 3, 2008, 4 pages.
Shen et al., "Informing the Design of Direct-Touch Tabletops", IEEE Sep./Oct. 2006, pp. 36-46.
Shen, C., "Interactive tabletops: User Interface, Metaphors and Gestures", SIGGRAPH2007, Aug. 2007, 14 pages.
TABLETOPRESEARCH201, "Gesture Registration, Relaxation, and Reuse for Multi-Point", Available at <http://www.youtube.com/watch?v=dT4dXuah2yM>, retrieved on May 19, 2008, 2 pages.
Thomas, Gläser, "Photoshop MT—Desktop Digital Imaging on FTIR multitouch", Available at <http://www.youtube.com/watch?v=JmHNr9EH1iU>, retrieved on Feb. 7, 2007, 2 pages.
Tse et al., "Enabling Interaction with Single User Applications Through Speech and Gestures on a Multi-User Tabletop", Mitsubishi Electric Research Laboratories, 2005, pp. 336-343.
Ullmer et al., "The metaDESK: Models and Prototypes for Tangible User Interfaces", UIST '97, Banff, Alberta, Canada, Oct. 14, 1997, pp. 1-10.
UNWIRELIFE1, "HP TouchSmart tx2—Multi-Touch Part 2", Available at <http://www.youtube.com/watch?v=Yon3vRwc94A>, retrieved on Dec. 19, 2008, 3 pages.
Vanderlin, Todd, "Smart Surface Beta", Available at <http://www.youtube.com/watch?v=68wFqxdXENw>, retrieved on Mar. 29, 2008, 3 pages.
Westerman, Wayne, "Hand Tracking, Finger Identification, and Chordic Manipulation on a Multi-Touch Surface", Doctoral Dissertation, 1999, 363 Pages.
Wilson, A., "Robust Computer Vision-Based Detection of Pinching for One and Two-Handed Gesture Input", UIST '06, Montreux, Switzerland, Oct. 2006, 4 pages.

(56) References Cited

OTHER PUBLICATIONS

Wu et al., "Multi-Finger and Whole Hand Gestural Interaction Techniques for Multi-User Tabletop Displays", UiST '03, Vancouver, BC, Canada, © ACM 2003,, Nov. 5-7, 2003, pp. 193-202.
Yee, K., "Two-Handed Interaction on a Tablet Display", SIGCHI 2004, Vienna, Austria, Apr. 2004, 4 pages.
ZAC96, "Microsoft Surface Demo", Available at <http://www.youtube.com/watch?v=rKgU6ubBgJA>, retrieved on Aug. 17, 2007, 2 pages.
Decision to Grant received for European Patent Application No. 11702357.2, dated Jul. 14, 2016, 2 Pages.
Office Action received for European Patent Application No. 11702358.0, dated Jun. 28, 2016, 5 pages.
Advisory Action received for U.S. Appl. No. 12/848,087, dated Jun. 17, 2015, 3 pages.
Extended European Search Report received for European Patent Application No. 16177552.3, dated Sep. 30, 2016, 7 pages.
Notice of Allowance received for Chinese Patent Application No, 201180016102.7, dated Sep. 5, 2016, 4 pages (2 pages of English Translation and 2 pages of Official Copy).
Office Action received for European Patent Application No. 11741385.6, dated Sep. 27, 2016, 8 pages.
Summons to Attend Oral Proceedings received for European Patent Application No. 09756118,7, dated Sep. 23, 2016, 8 pages.
Notice of Acceptance received for Australian Patent Application No. 2015202218, dated Dec. 20, 2016, 3 pages.
Notice of Allowance received for U.S. Appl. No. 14/793,574, dated Dec. 13, 2016, 20 pages.
Decision to Grant received for European Patent Application No. 09756118.7, dated Jul. 13, 2017, 2 pages.
Intention to Grant received for European Patent Application No. 09756118.7, dated Mar. 2, 2017, 8 pages.
Notice of Allowance received for Australian Patent Application No. 2015202218, dated Apr. 11, 2017, 4 pages.
Summons to attend Oral proceedings received for European Patent Application No. 11741385.6, dated Apr. 26, 2017, 10 pages.
Extended European Search Report received for European Patent Application No. 17180535.1, dated Oct. 30, 2017, 9 pages.
Brief Communication Relating to Oral Proceedings received for European Patent Application No, 11741385.6, dated Oct. 23, 2017, 17 pages.
Decision to Refusal received for European Patent Application No. 11741385.6, dated Dec. 14, 2017, 23 pages.
Summons to Attend Oral proceedings received for European Patent Application No. 11741385.6, mailed on Oct. 19, 2017, 2 pages.
"Visio 2003 Professional-Basics", Available online at: URL:http://d.scribd.com/docs/2dolxjrcshr9fcemu941.pdf, [retrieved on Mar. 15, 2009], Sep. 1, 2005, pp. 77-80.
Non-Final Office Action received for U.S. Appl. No. 15/088,450, dated Jul. 23, 2018, 12 pages.
Office Action received for European Patent Application No. 11702358.0, dated Mar. 9, 2018, 4 pages.
Decision on Appeal received for U.S. Appl. No. 12/848,087, dated Aug. 29, 2018, 9 pages.
Office Action received for European Patent Application No. 16177552.3, dated Aug. 23, 2018, 7 pages.
Office Action received for European Patent Application No. 17180535.1, dated Oct. 8, 2018, 6 pages.

* cited by examiner

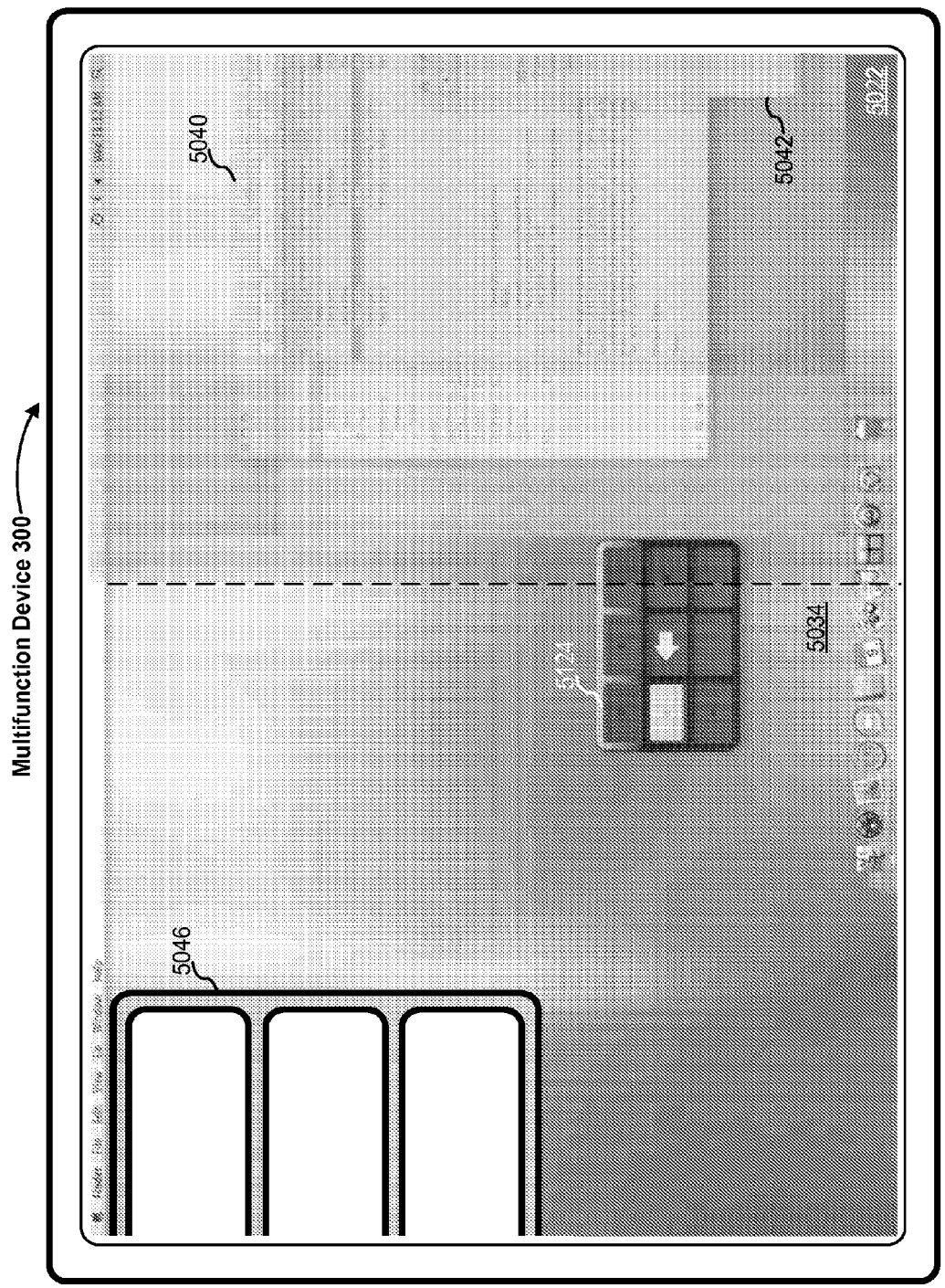

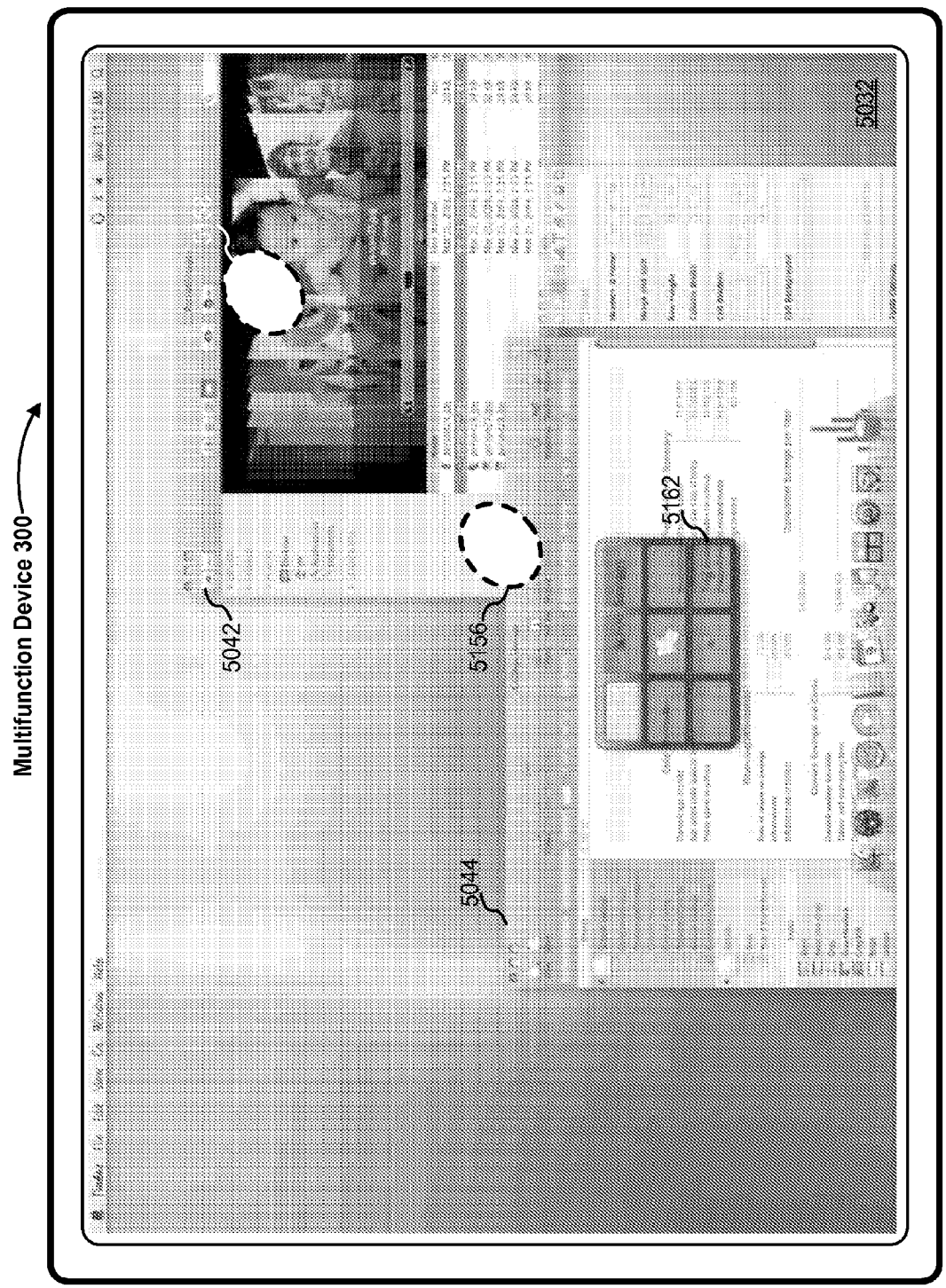

DEVICE, METHOD, AND GRAPHICAL USER INTERFACE FOR MANIPULATING WORKSPACE VIEWS

RELATED APPLICATION

This application is a continuation of U.S. patent application Ser. No. 12/567,206 filed Sep. 25, 2009, the entire contents of which is incorporated herein by reference.

TECHNICAL FIELD

The disclosed embodiments relate generally to workspace views in electronic devices with touch-sensitive surfaces. More particularly, the disclosed embodiments relate to manipulating workspace views on such devices, such as moving between workspace views, moving a window between two workspace views, and displaying multiple workspace views.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate virtual objects in user interfaces for multifunction devices.

While using an operating system or other application with a plurality of open applications and/or application windows, a user may need to move from one workspace view (i.e., a first "virtual desktop") to a different workspace view (i.e., a second "virtual desktop"), move one or more windows from a first workspace view to another workspace view, or see several workspace views simultaneously. Exemplary operating system user interfaces in which multiple workspace views can or could be implemented include the user interfaces for the OS X, Darwin, RTXC, LINUX, UNIX, and WINDOWS operating systems.

But existing methods for performing these manipulations of workspace views are cumbersome and inefficient. For example, moving between one workspace view and another workspace view may require selecting an icon or other small graphical user interface object with a cursor, and/or remembering unintuitive keyboard shortcuts or other navigation commands. Such manipulations are tedious and create a significant cognitive burden on a user. In addition, existing methods take longer than necessary, thereby wasting energy. This latter consideration is particularly important in battery-operated devices.

Accordingly, there is a need for electronic devices with faster, more efficient methods and interfaces for manipulating workspace views. Such methods and interfaces may complement or replace existing methods for manipulating workspace views. Such methods and interfaces reduce the cognitive burden on a user and produce a more efficient human-machine interface. For battery-operated electronic devices, such methods and interfaces conserve power and increase the time between battery charges.

SUMMARY

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, a tablet, or a handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, in addition to manipulating workspace views, the functions include one or more of: image editing, drawing, presenting, word processing, website creating, disk authoring, spreadsheet making, game playing, telephoning, video conferencing, e-mailing, instant messaging, workout support, digital photographing, digital videoing, web browsing, digital music playing and/or digital video playing. Executable instructions for performing these functions may be included in a computer readable storage medium or other computer program product configured for execution by one or more processors.

In accordance with some embodiments, a computer-implemented method is performed at a multifunction device with a display and a touch-sensitive surface. The method includes creating a plurality of workspace views. A respective workspace view is configured to contain content assigned by a user to the respective workspace view. The content includes application windows. The method further includes displaying a first workspace view in the plurality of workspace views on the display, without displaying other workspace views in the plurality of workspace views. The method also includes detecting a first multifinger gesture on the touch-sensitive surface. In response to detecting the first multifinger gesture on the touch-sensitive surface, the method includes replacing display of the first workspace view with concurrent display of the plurality of workspace views.

In accordance with some embodiments, a graphical user interface on a multifunction device with a display and a touch-sensitive surface includes a plurality of workspace views. The respective workspace view is configured to contain content assigned by a user to the respective workspace view. The content includes application windows. A first workspace view in the plurality of workspace views on the display is displayed without displaying other workspace views in the plurality of workspace views. A first multifinger gesture is detected on the touch-sensitive surface. In response to detecting the first multifinger gesture on the touch-sensitive surface, display of the first workspace view is replaced with concurrent display of the plurality of workspace views.

In accordance with some embodiments, a multifunction device, comprises: a display; a touch-sensitive surface; one or more processors; memory; and one or more programs. The one or more programs are stored in the memory and configured to be executed by the one or more processors. The one or more programs include instructions for creating a plurality of workspace views. A respective workspace view is configured to contain content assigned by a user to the respective workspace view. The content includes application windows. The one or more programs also include instructions for displaying a first workspace view in the plurality of workspace views on the display, without displaying other workspace views in the plurality of workspace views; instructions for detecting a first multifinger gesture on the touch-sensitive surface. In response to detection of the first multifinger gesture on the touch-sensitive surface the device includes instructions to replace display of the first workspace view with concurrent display of the plurality of workspace views.

In accordance with some embodiments, a computer readable storage medium stores one or more programs, the one or more programs comprise instructions which, when executed by a multifunction device with a display and a touch-sensitive surface, cause the device to create a plurality of workspace views. A respective workspace view is configured to contain content assigned by a user to the respective workspace view. The content includes application windows. The programs also include instructions which, when executed by the multifunction device, cause the device to: display a first workspace view in the plurality of workspace views on the display, without displaying other workspace views in the plurality of workspace views; detect a first multifinger gesture on the touch-sensitive surface; and, in response to detection of the first multifinger gesture on the touch-sensitive surface instructions, replace display of the first workspace view with concurrent display of the plurality of workspace views.

In accordance with some embodiments, a multifunction device, comprises: a display; a touch-sensitive surface; means for creating a plurality of workspace views. A respective workspace view is configured to contain content assigned by a user to the respective workspace view. The content includes application windows, The device also comprises means for displaying a first workspace view in the plurality of workspace views on the display, without displaying other workspace views in the plurality of workspace views; means for detecting a first multifinger gesture on the touch-sensitive surface; and means, responsive to detection of the first multifinger gesture on the touch-sensitive surface, for replacing display of the first workspace view with concurrent display of the plurality of workspace views.

In accordance with some embodiments, an information processing apparatus for use in a multifunction device with a display and a touch-sensitive surface, comprises: means for creating a plurality of workspace views. A respective workspace view is configured to contain content assigned by a user to the respective workspace view. The content includes application windows. The information processing apparatus also comprises means for displaying a first workspace view in the plurality of workspace views on the display, without displaying other workspace views in the plurality of workspace views; means for detecting a first multifinger gesture on the touch-sensitive surface; and means, responsive to detection of the first multifinger gesture on the touch-sensitive surface, for replacing display of the first workspace view with concurrent display of the plurality of workspace views.

Thus, electronic devices with touch-sensitive surfaces are provided with faster, more efficient methods and interfaces for manipulating workspace views, thereby increasing the effectiveness, efficiency, and user satisfaction with such devices. Such methods and interfaces may complement or replace existing methods for manipulating workspace views.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
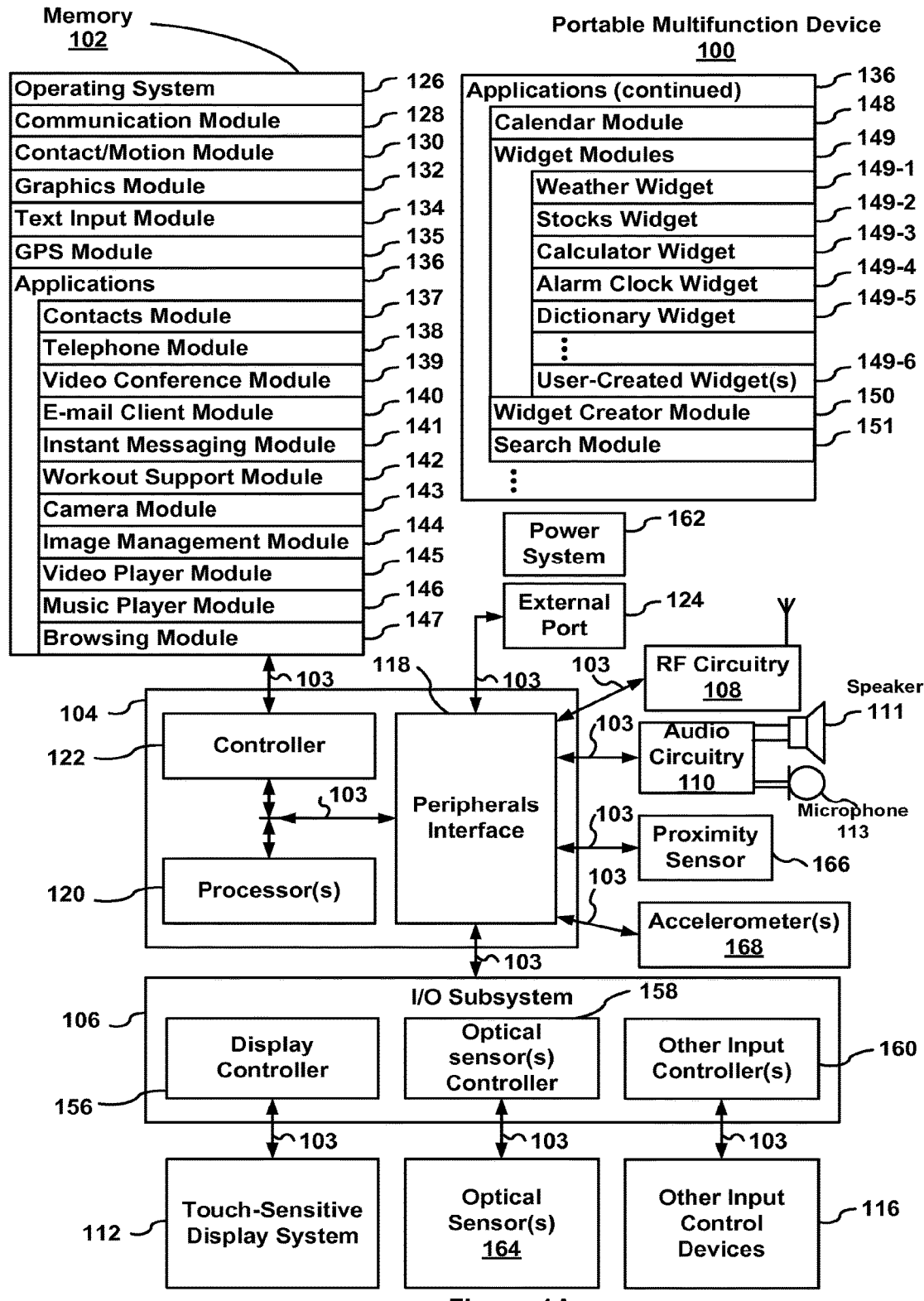
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of computing devices, user interfaces for such devices, and associated processes for using such devices are described. In some embodiments, the computing device is a portable communications device such as a mobile telephone that also contains other functions, such as PDA and/or music player functions. Exemplary embodiments of portable multifunction devices include, without limitation, the iPhone® and iPod Touch® devices from Apple, Inc. of Cupertino, Calif. Other portable devices such as laptops or tablet computers with touch-sensitive surfaces (e.g., touch screen displays and/or touch pads) may also be used. It should also be understood that, in some embodiments, the device is not a portable communications device, but is a desktop computer with a touch-sensitive surface (e.g., a touch screen display and/or a touch pad).

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and application Ser. No. 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
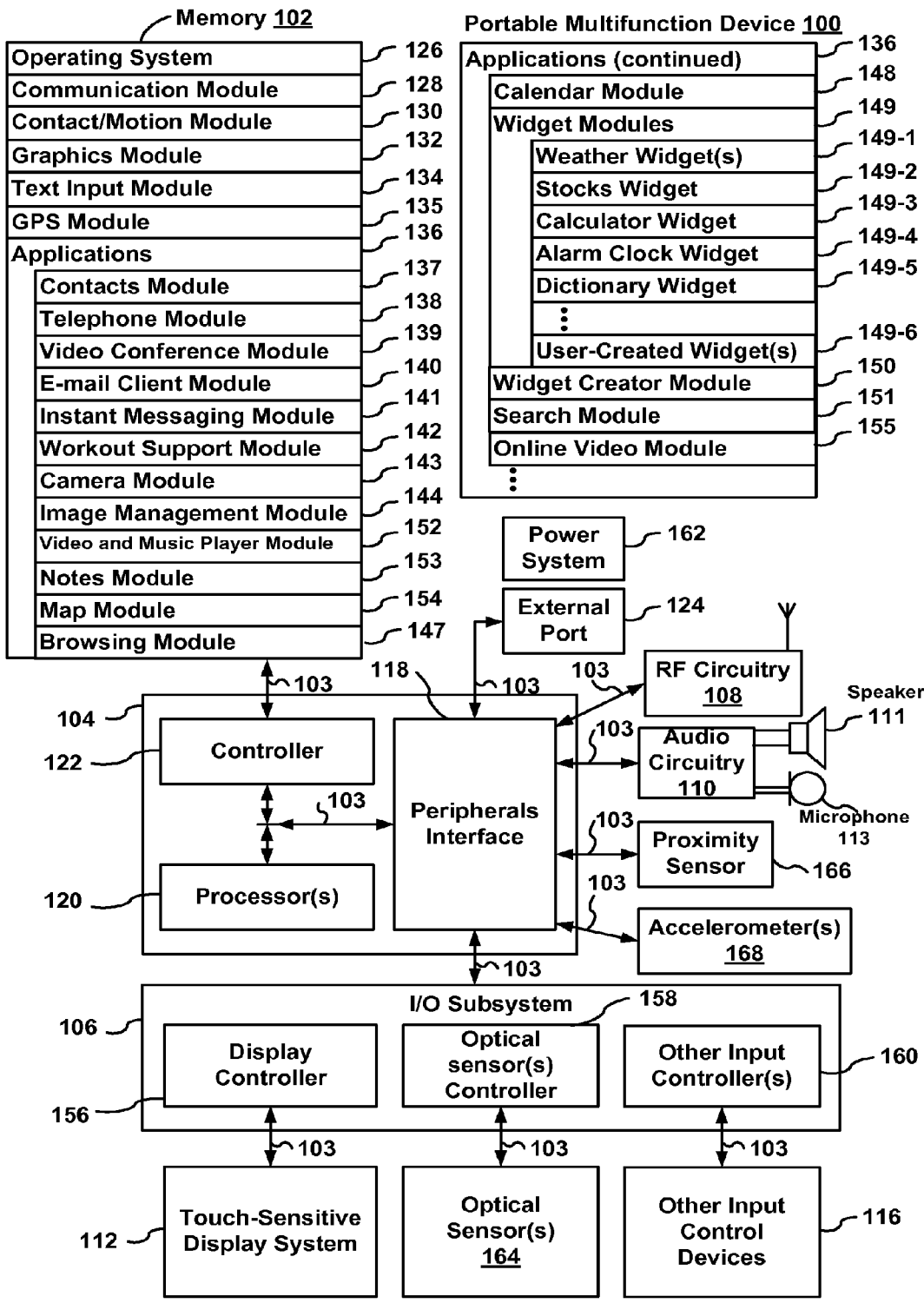

Attention is now directed towards embodiments of portable devices with touch-sensitive displays, FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS)), or any other, suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112. In an exemplary embodiment, projected mutual capacitance sensing technology is used, such as that found in the iPhone® and iPod Touch® from Apple, Inc. of Cupertino, Calif.

A touch-sensitive display in some embodiments of the touch screen 112 may be analogous to the multi-touch sensitive touchpads described in the following U.S. Patents: U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, a touch screen 112 displays visual output from the portable device 100, whereas touch sensitive touchpads do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the, touch-sensitive surface formed by the touch screen.

In some embodiments, the device 100 may include a physical or virtual click wheel as an input control device 116. A user may navigate among and interact with one or more graphical objects (e.g., icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lenses, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device"; application Ser. No. 11/240,788, "Proximity Detector In Handheld Device"; application Ser. No. 11/620,702, "Using Ambient Light Sensor To Augment Proximity Sensor Output"; application Ser. No. 11/586,862, "Automated Response To And Sensing Of User Activity In Portable Devices"; and application Ser. No. 11/638,251, "Methods And Systems For Automatic Configuration Of Peripherals," which are hereby incorporated by reference in their entirety. In some embodiments, the proximity sensor turns off and disables the touch screen 112 when the multifunction device is placed near the user's ear (e.g., when the user is making a phone call).

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). The contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 detects contact on a touchpad. In some embodiments, the contact/motion module 130 and the controller 160 detects contact on a click wheel.

The contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up event.

In some embodiments, the contact/motion module 130 (FIG. 3) detects finger gestures, and characterizes the finger gestures to determine whether the finger gestures are associated with specific elements in the user interface (e.g., applications and/or windows) or are part of a multifinger gesture (e.g., a pinching gesture or a five finger tap gesture) for changing the context (e.g., from a plurality of concurrently displayed workspace views to a single workspace view or from a first workspace view to a second workspace view) on the multifunction device.

The graphics module 132 includes various known software components for rendering and displaying graphics on the touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, the graphics module 132 stores data representing graphics to be used. Each graphic may be assigned a corresponding code. The graphics module 132 receives, from applications etc., one or more codes specifying graphics to be displayed along with, if necessary, coordinate data and other graphic property data, and then generates screen image data to output to display controller 156.

The text input module 134, which may be a component of graphics module 132, provides soft keyboards for entering text in various applications (e.g., contacts 137, e-mail 140, IM 141, browser 147, and any other application that needs text input).

The GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

The applications 136 may include the following modules (or sets of instructions), or a subset or superset thereof:

a contacts module 137 (sometimes called an address book or contact list);
a telephone module 138;
a video conferencing module 139;
an e-mail client module 140;
an instant messaging (IM) module 141;
a workout support module 142;
a camera module 143 for still and/or video images;
an image management module 144;
a video player module 145;
a music player module 146;
a browser module 147;
a calendar module 148;
widget modules 149, which may include weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which merges video player module 145 and music player module 146;
notes module 153;
map module 154; and/or
online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display. controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the videoconferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, the workout support module 142 may be used to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify (e.g., reposition to a new date/time), and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

In conjunction with touch screen 112, display system controller 156, contact module 130, graphics module 132, audio circuitry 110, speaker 111, RF circuitry 108, text input module 134, e-mail client module 140, and browser module 147, the online video module 155 allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein), These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
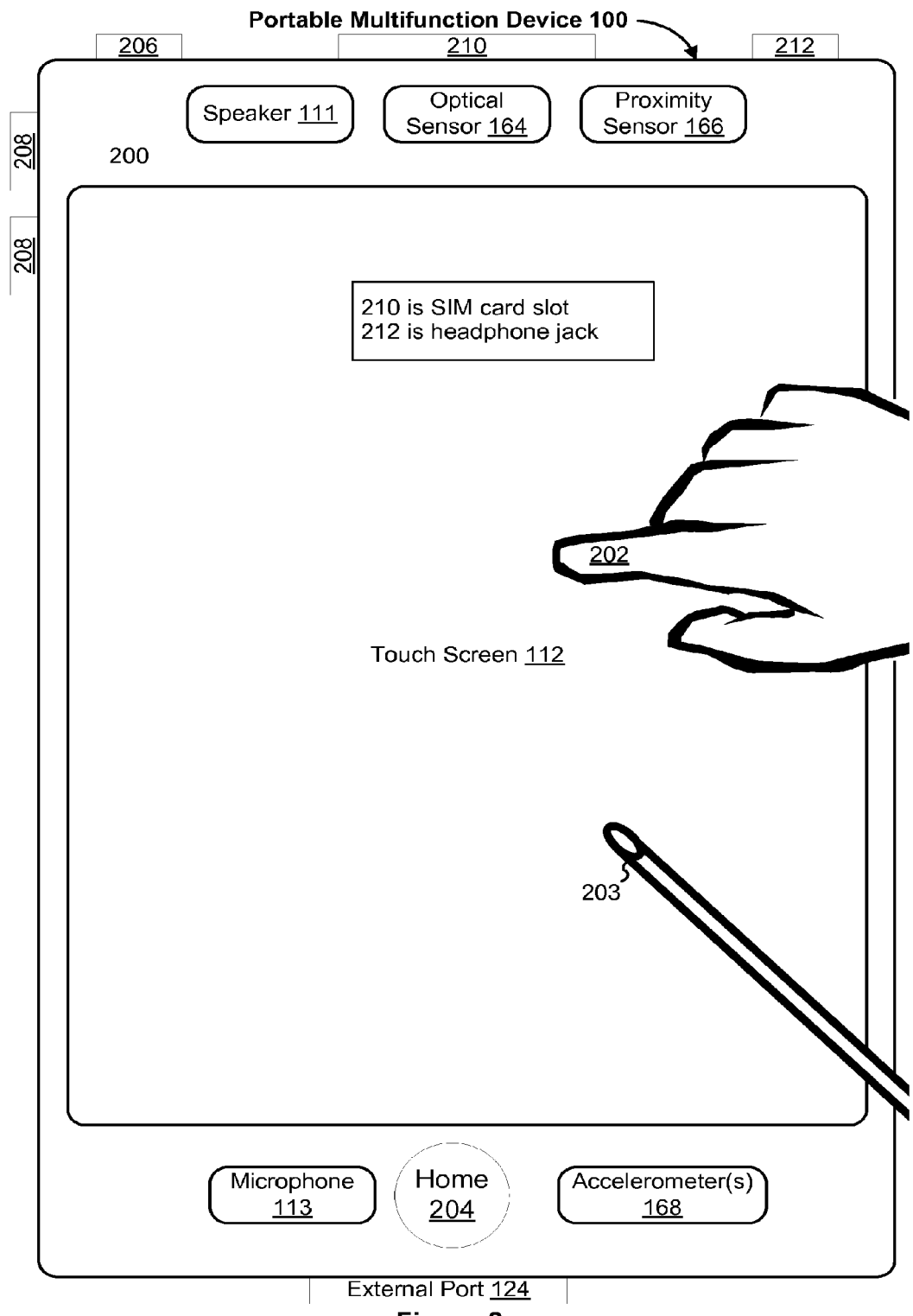
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Figure 3:
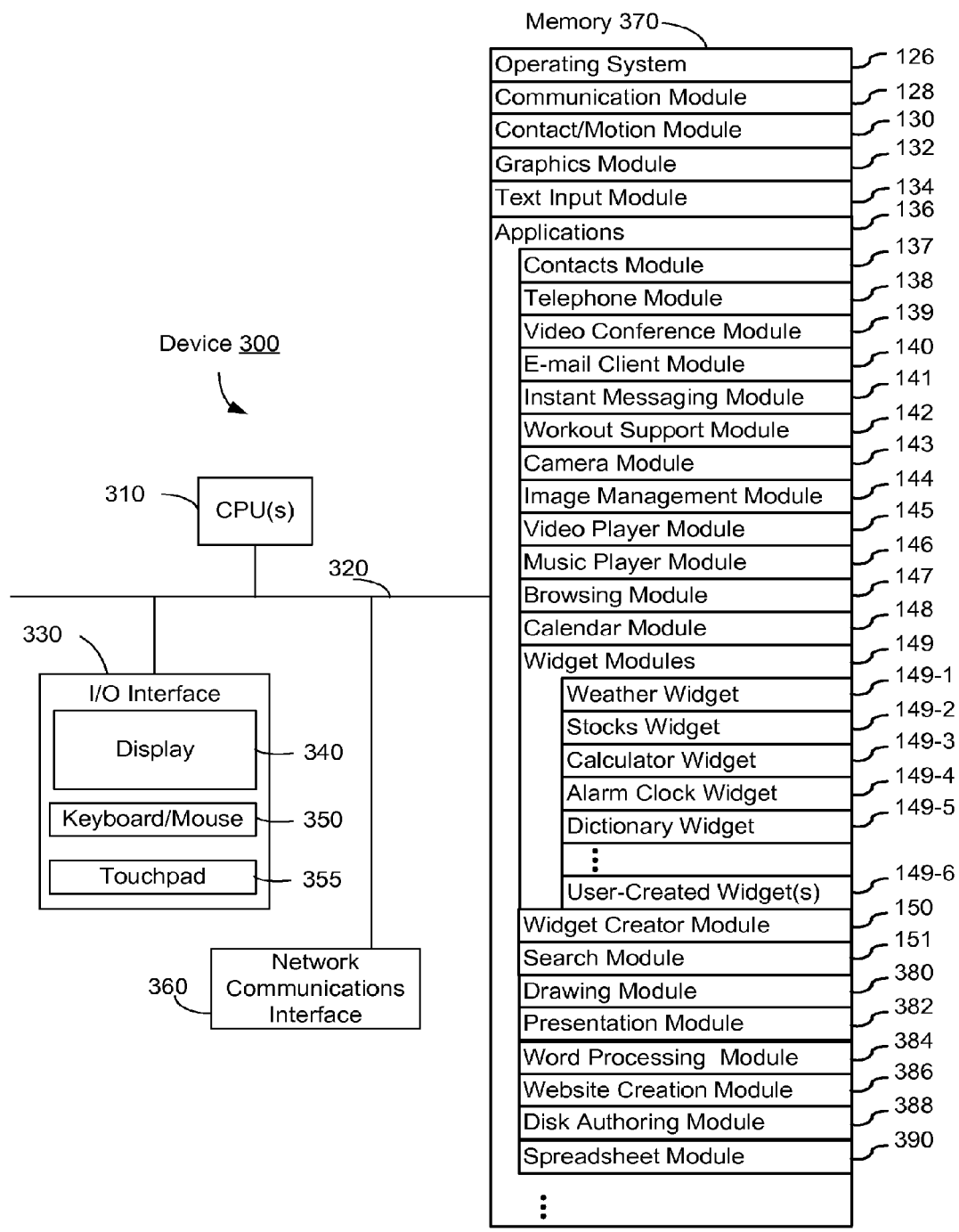
FIG. 3 is a block diagram of an exemplary multifunction device with a display and a touch-sensitive surface in accordance with some embodiments.

FIG. 3 is a block diagram of an exemplary multifunction device with a display and a touch-sensitive surface in accordance with some embodiments. Device 300 need not be portable. In some embodiments, the device 300 is a laptop computer, a desktop computer, a tablet computer, a multimedia player device, a navigation device, an educational device (such as a child's learning toy), a gaining system, or a control device (e.g., a home or industrial controller). The device 300 typically includes one or more processing units (CPU's) 310, one or more network or other communications interfaces 360, memory 370, and one or more communication buses 320 for interconnecting these components. The communication buses 320 may include circuitry (sometimes called a chipset) that interconnects and controls communications between system components. The device 300 includes an input/output (I/O) interface 330 comprising a display 340, which is typically a touch screen display. The user interface 330 also may include a keyboard and/or mouse (or other pointing device) 350 and a touchpad 355, Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from the CPU(s) 310. In some embodiments, memory 370 stores programs, modules, and data structures analogous to the programs, modules, and data structures stored in the memory 102 of portable multifunction device 100 (FIG. 1), or a subset thereof. Furthermore, memory 370 may store additional programs, modules, and data structures not present in the memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on a portable multifunction device 100.

Figure 4A:
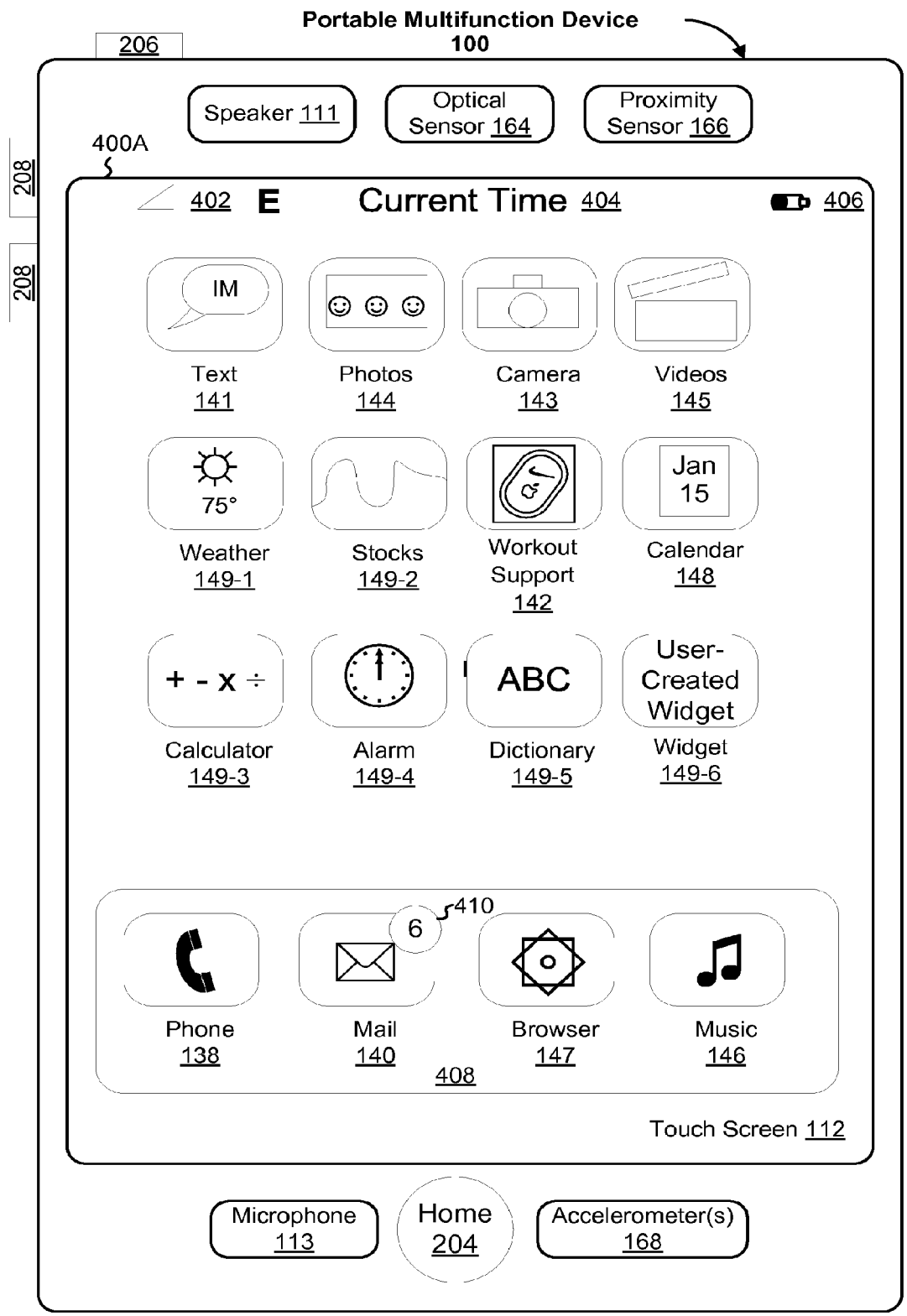
FIGS. 4A and 4B illustrate exemplary user interfaces for a menu of applications on a portable multifunction device in accordance with some embodiments.
Figure 4B:
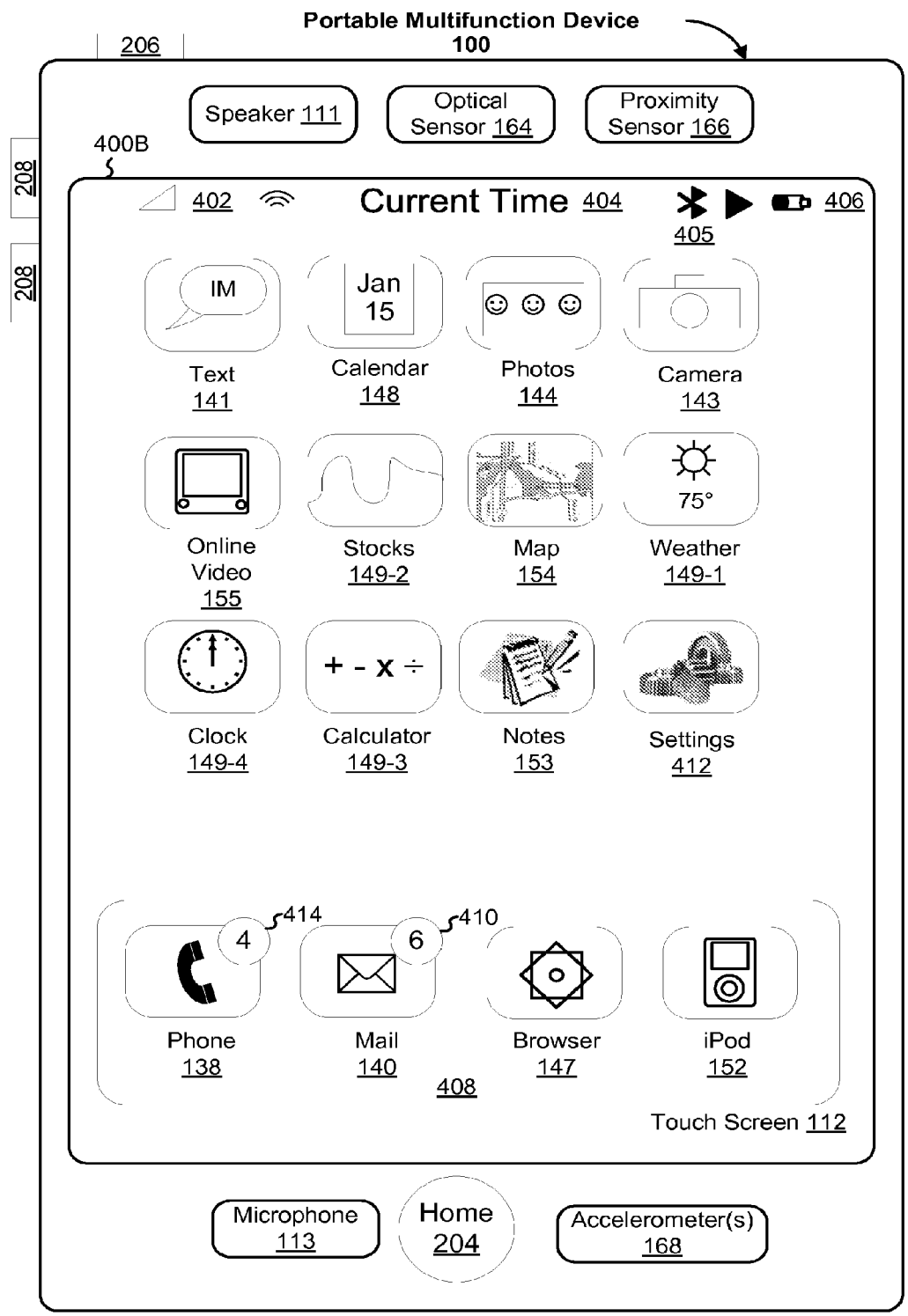

FIGS. 4A and 4B illustrate exemplary user interfaces for a menu of applications on a portable multifunction device 100 in accordance with some embodiments. Similar user interfaces may be implemented on device 300. In some embodiments, user interface 400A includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Music player 146; and
Icons for other applications, such as:
  IM 141;
  Image management 144;
  Camera 143;
  Video player 145;
  Weather 149-1;
  Stocks 149-2;
  Workout support 142;
  Calendar 148;
  Calculator 149-3;
  Alarm clock 149-4;
  Dictionary 149-5; and
  User-created widget 149-6.

In some embodiments, user interface 400B includes the following elements, or a subset or superset thereof:
  402, 404, 405, 406, 141, 148, 144, 143, 149-3, 149-2, 149-1, 149-4, 410, 414, 138, 140, and 147, as described above;
  Map 154;
  Notes 153;
  Settings 412, which provides access to settings for the device 100 and its various applications 136, as described further below;
  Video and music player module 152, also referred to as iPod (trademark of Apple, Inc.) module 152; and
  Online video module 155, also referred to as YouTube (trademark of Google, Inc.) module 155.

Attention is now directed towards embodiments of user interfaces ("UI") and associated processes that may be implemented on a multifunction device with a display and a touch-sensitive surface, such as device 300 or portable multifunction device 100.

FIGS. 5A-5GG illustrate exemplary user interfaces for manipulating workspace views in accordance with some embodiments. The user interfaces in these figures are used to illustrate the processes described below with respect to FIGS. 6A-6E.

FIGS. 5A-5E illustrate replacing display of a first workspace view (e.g., 5002, FIG. 5A) with concurrent display of a plurality of workspace views (FIG. 5E) in response to detecting a bimanual pinching gesture that includes two finger contacts 5006 and 5008 on opposite sides of the touch screen display moving towards each other.

FIGS. 5F-5I illustrate replacing display of the first workspace view (e.g., 5002, FIG. 5F) with concurrent display of a plurality of workspace views in response to detecting a two-finger pinching gesture (made with contacts 5050 and 5052) at a location on the touch-sensitive surface that corresponds to a corner of the display.

Figure 5A:
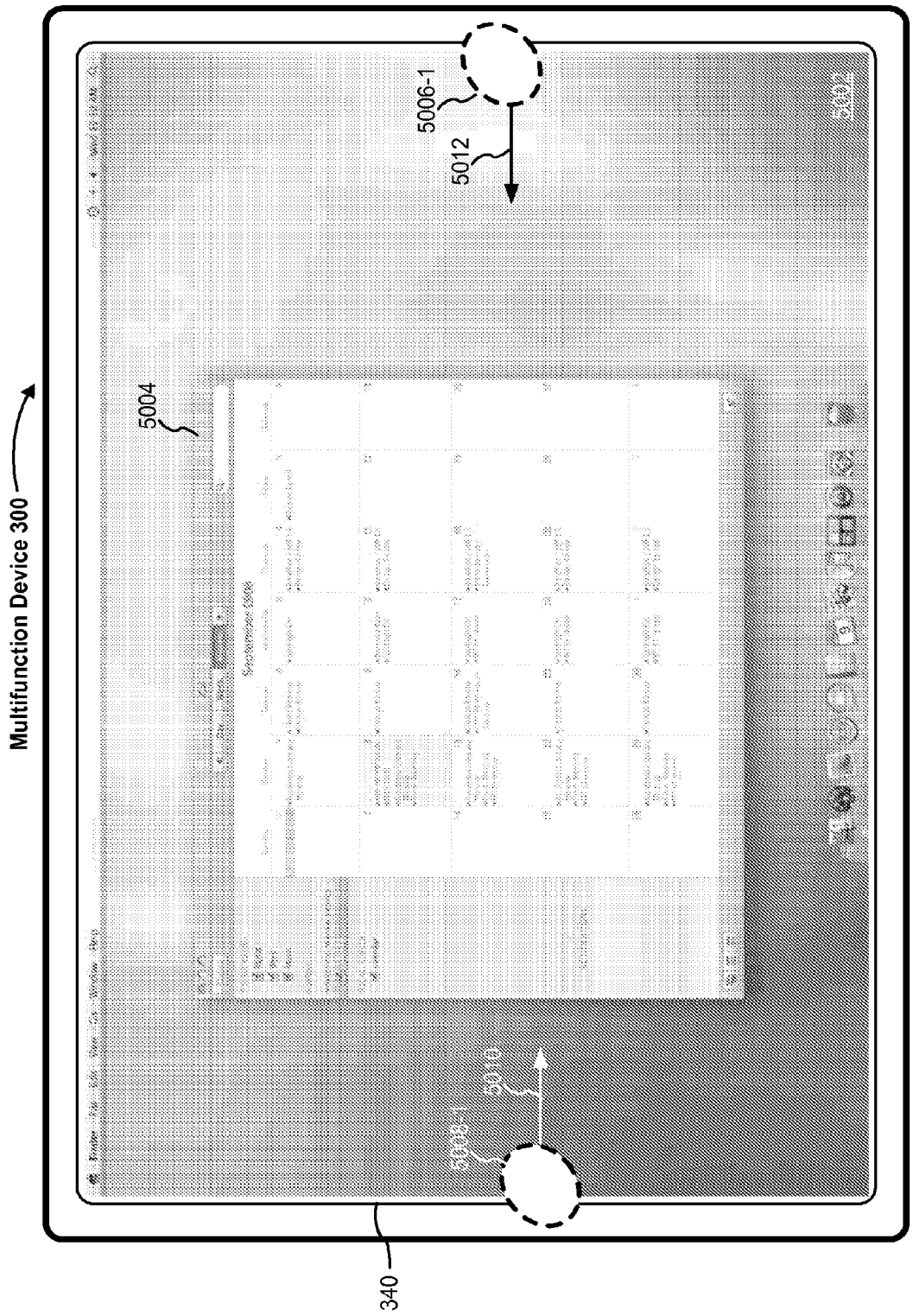
FIGS. 5A-5GG illustrate exemplary user interfaces for manipulating workspace views in accordance with some embodiments.
Figure 5B:
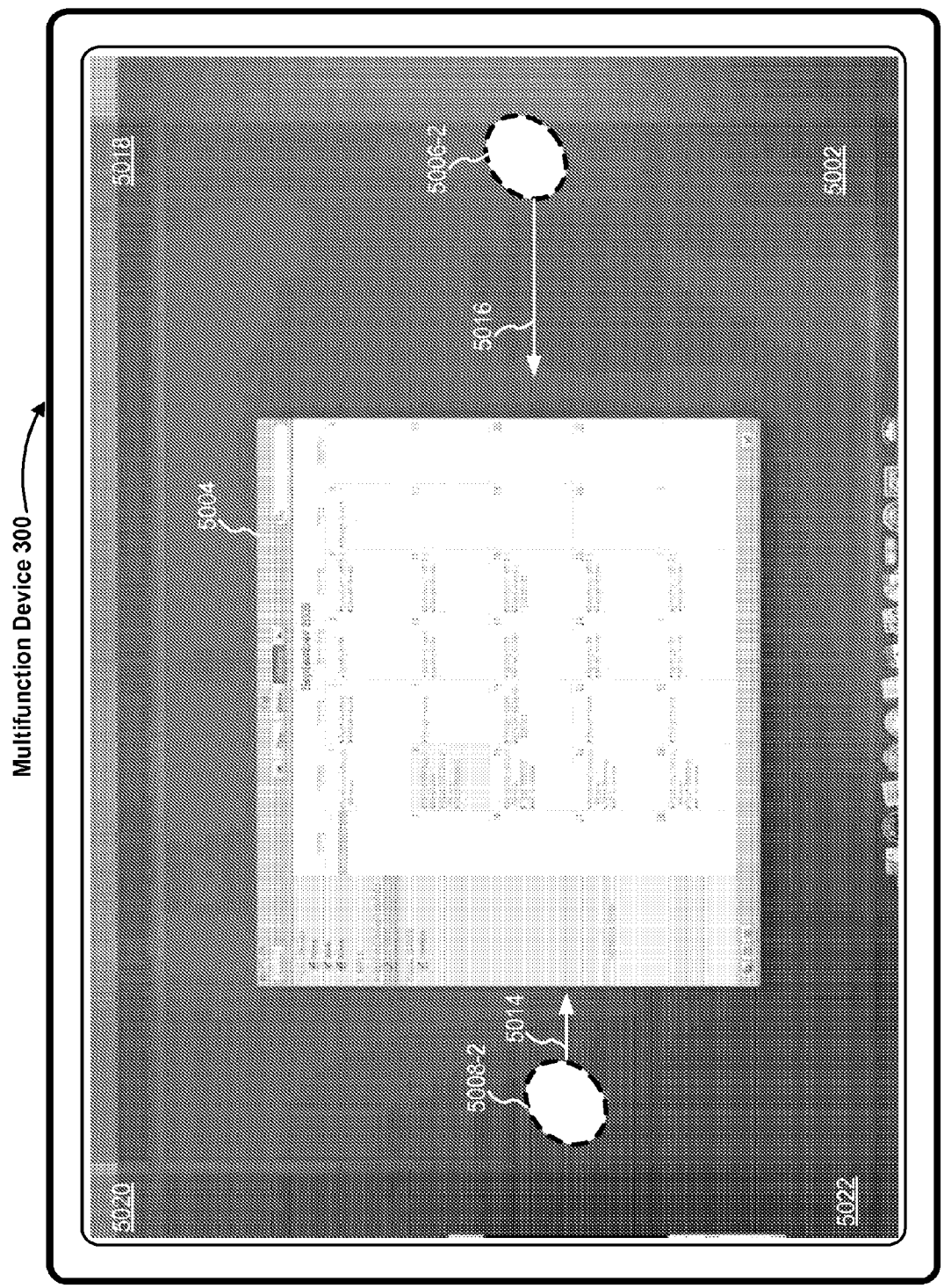
Figure 5C:
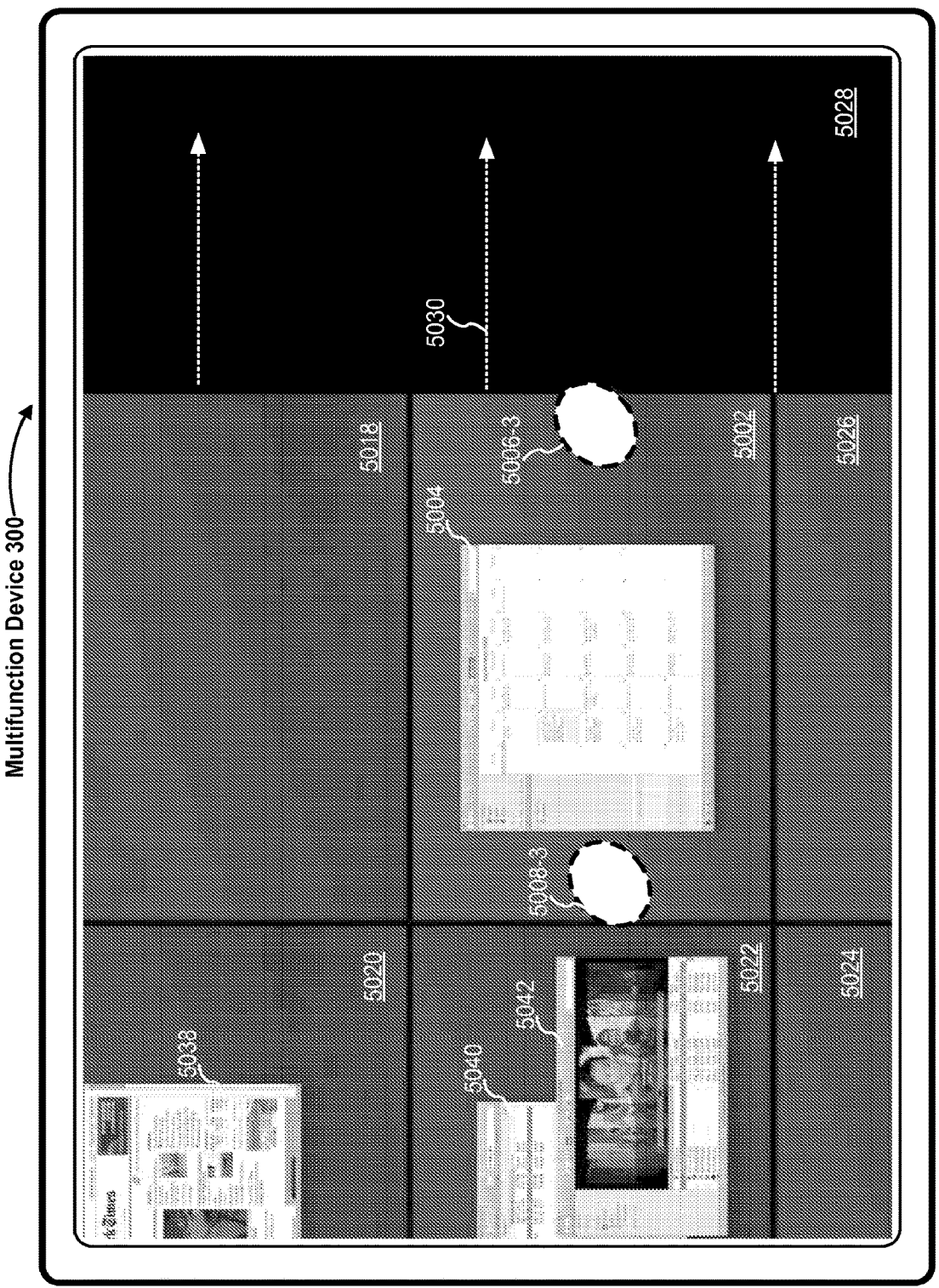
Figure 5D:
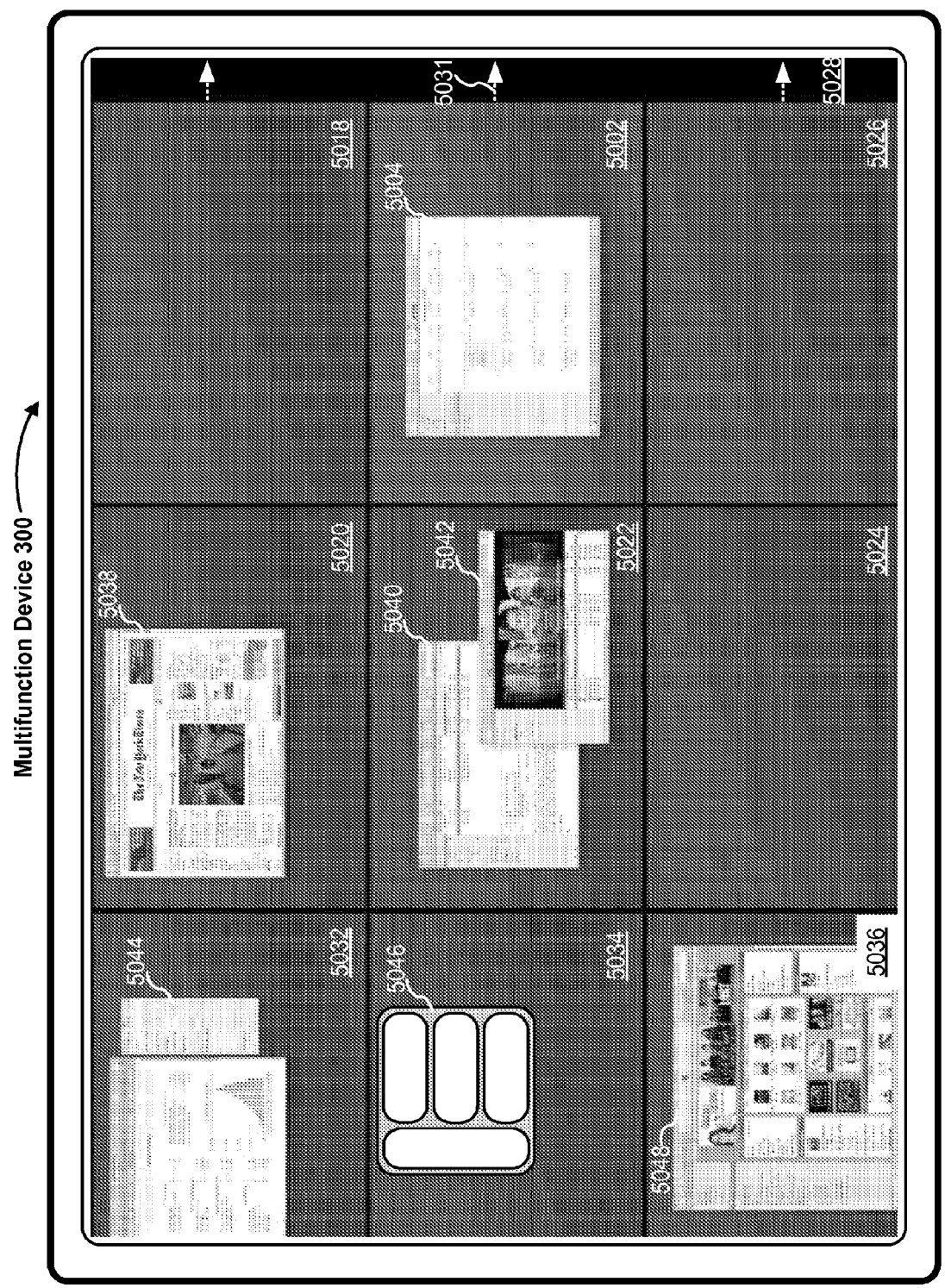
Figure 5E:
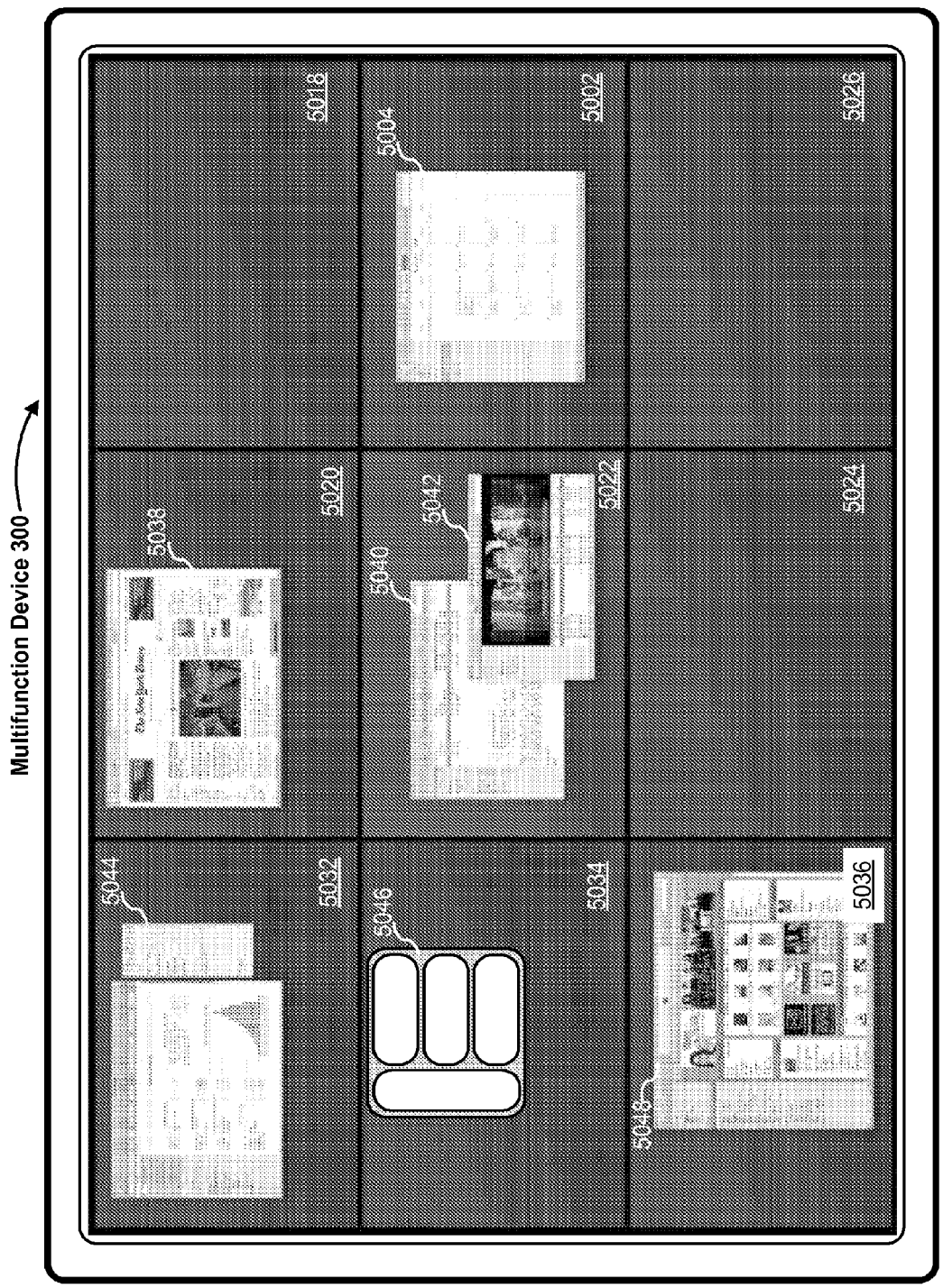
Figure 5F:
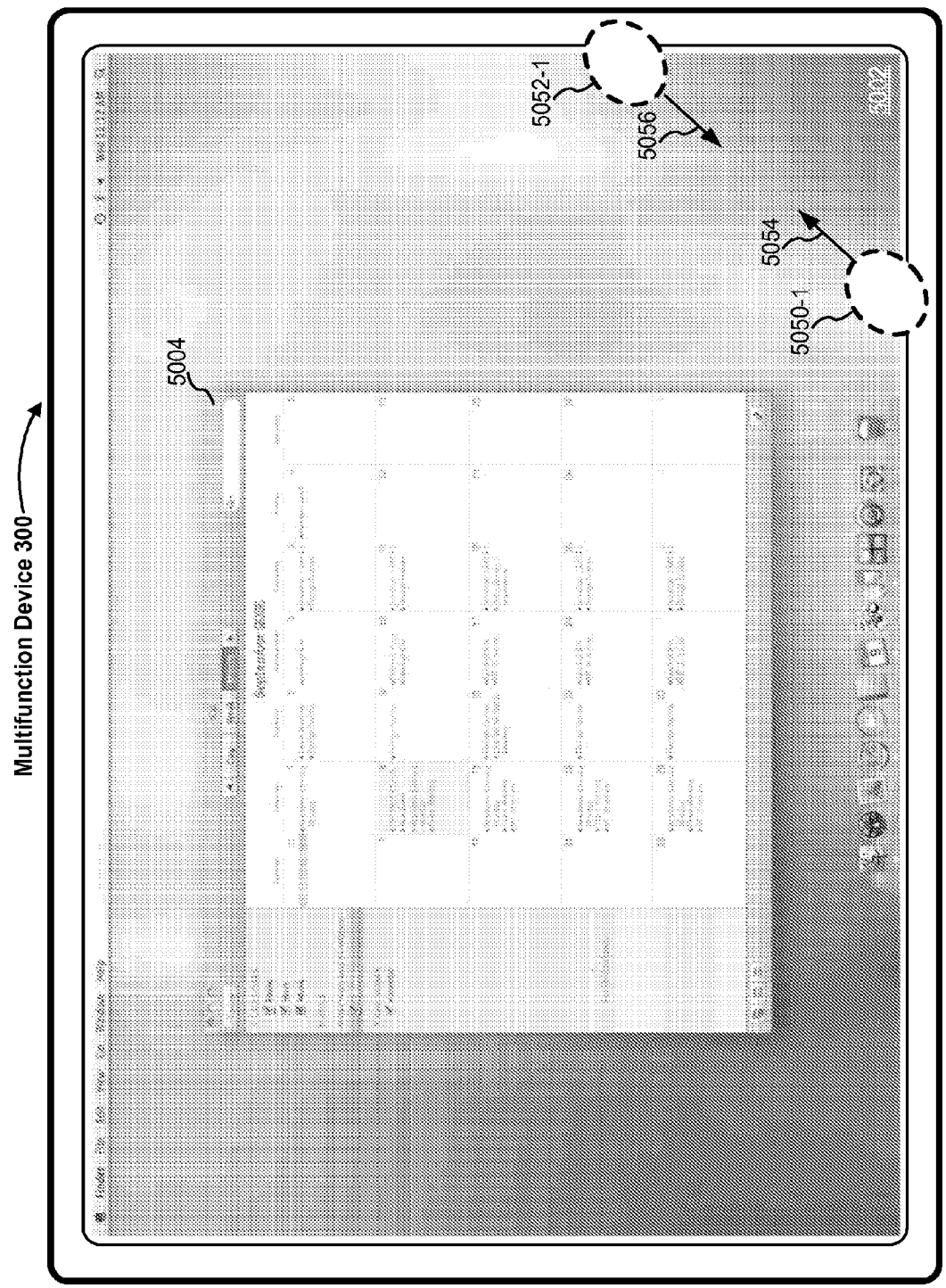
Figure 5G:
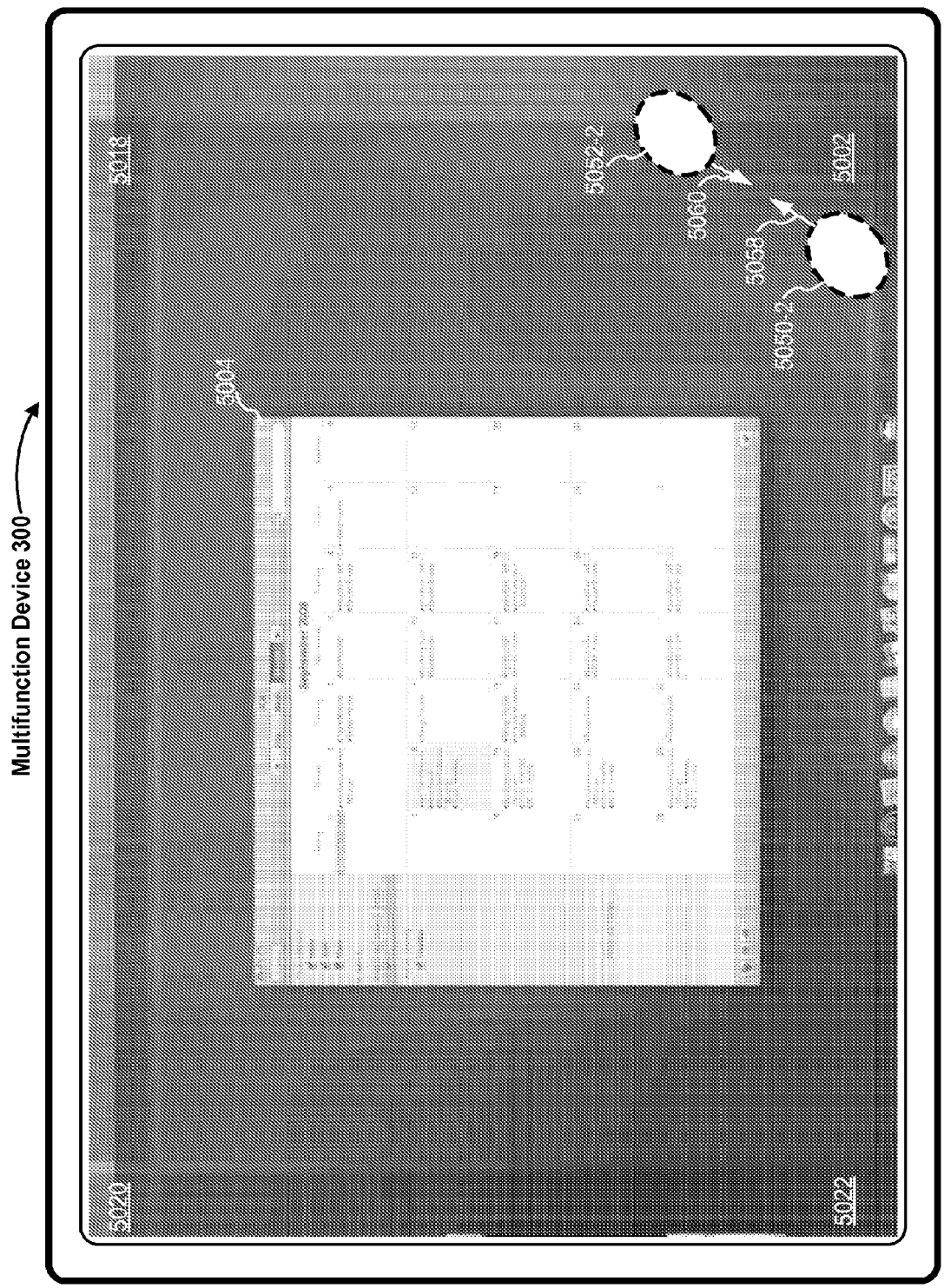
Figure 5H:
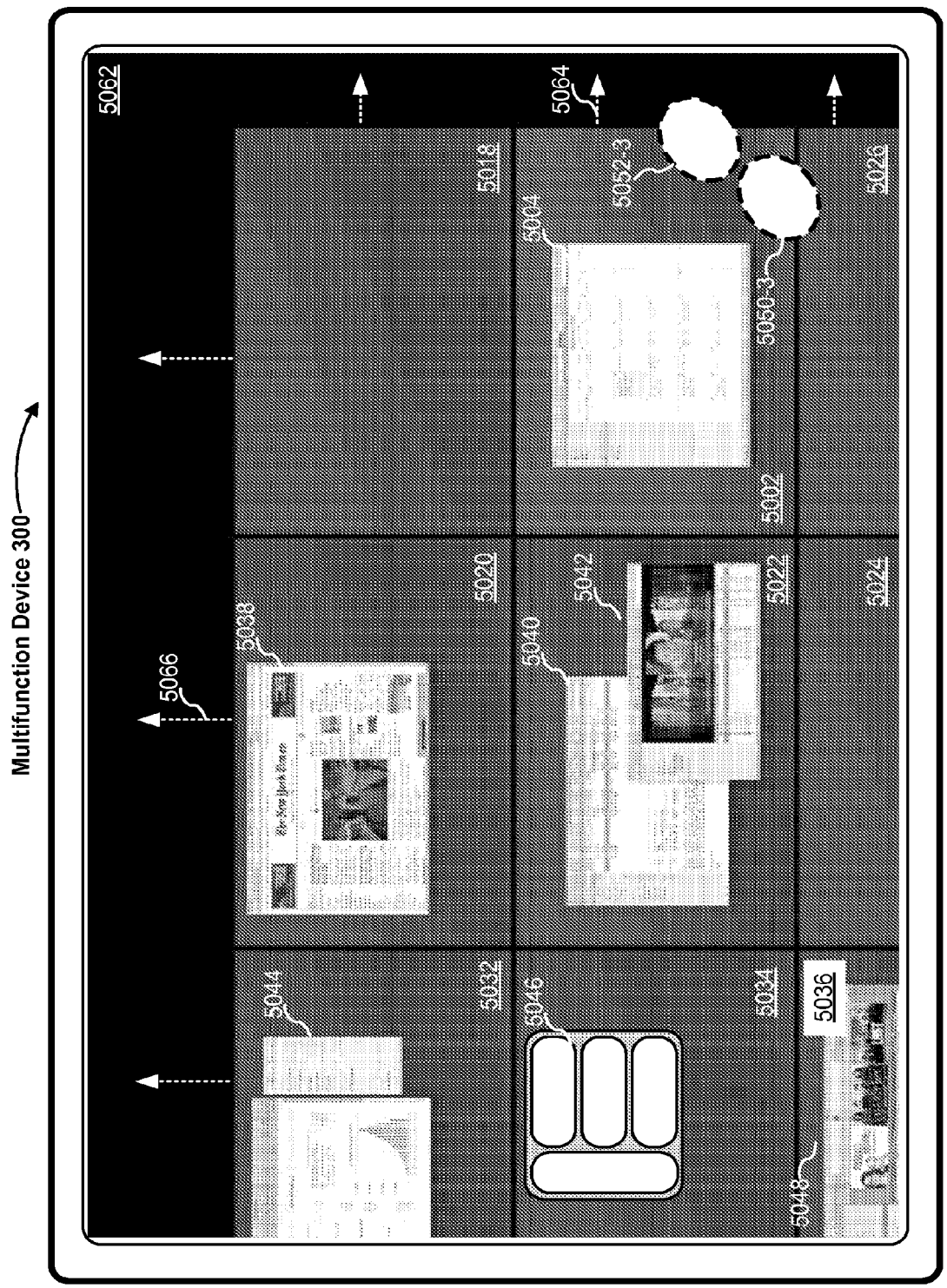
Figure 5I:
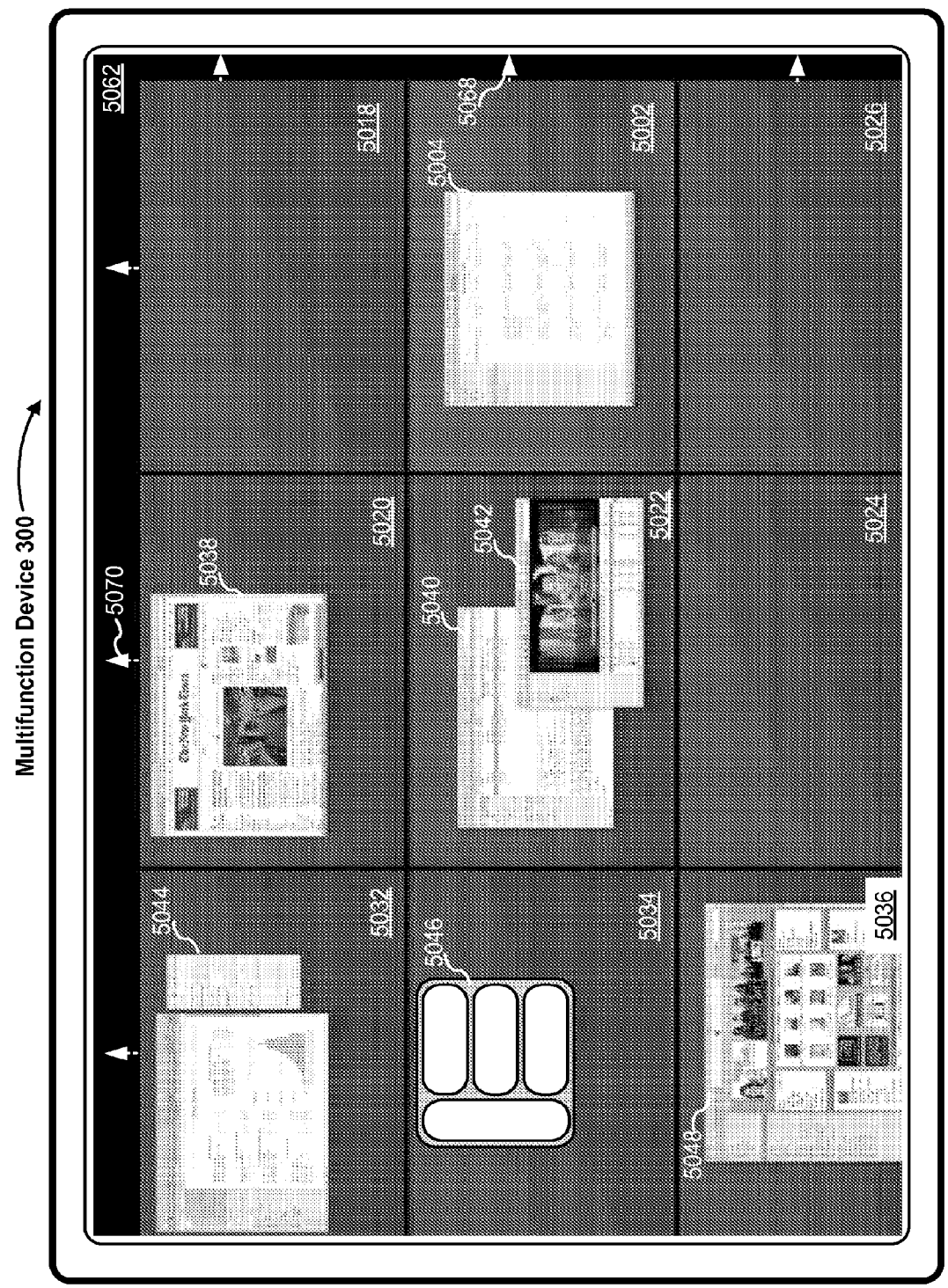
Figure 5J:
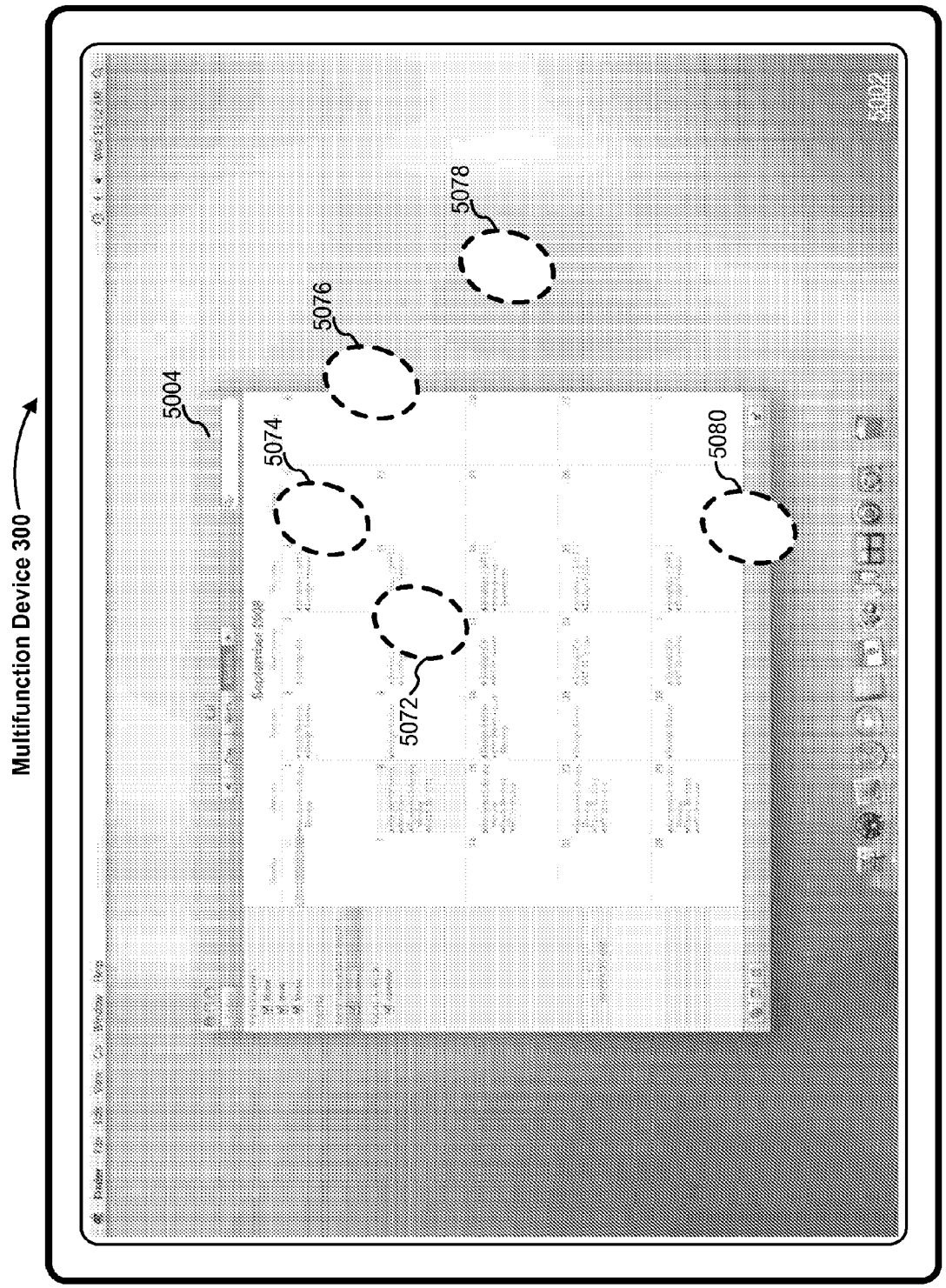

FIG. 5J illustrates a five-finger tap gesture, which when detected initiates replacement of the display of a first workspace view (e.g., 5002) with concurrent display of a plurality of workspace views.

FIGS. 5K-5O illustrate replacing display of a first workspace view (e.g., 5002, FIG. 5K) with concurrent display of a plurality of workspace views (FIG. 5O) in response to detecting a five-finger pinch gesture.

FIGS. 5O-5R illustrate replacing a concurrent display of a plurality of workspace views (FIG. 5O) with display of a single workspace view (e.g., 5022, FIG. 5R) in response to detecting an input by the user, such as a finger tap gesture 5118 (FIG. 5O) on the single workspace view.

Figure 5K:
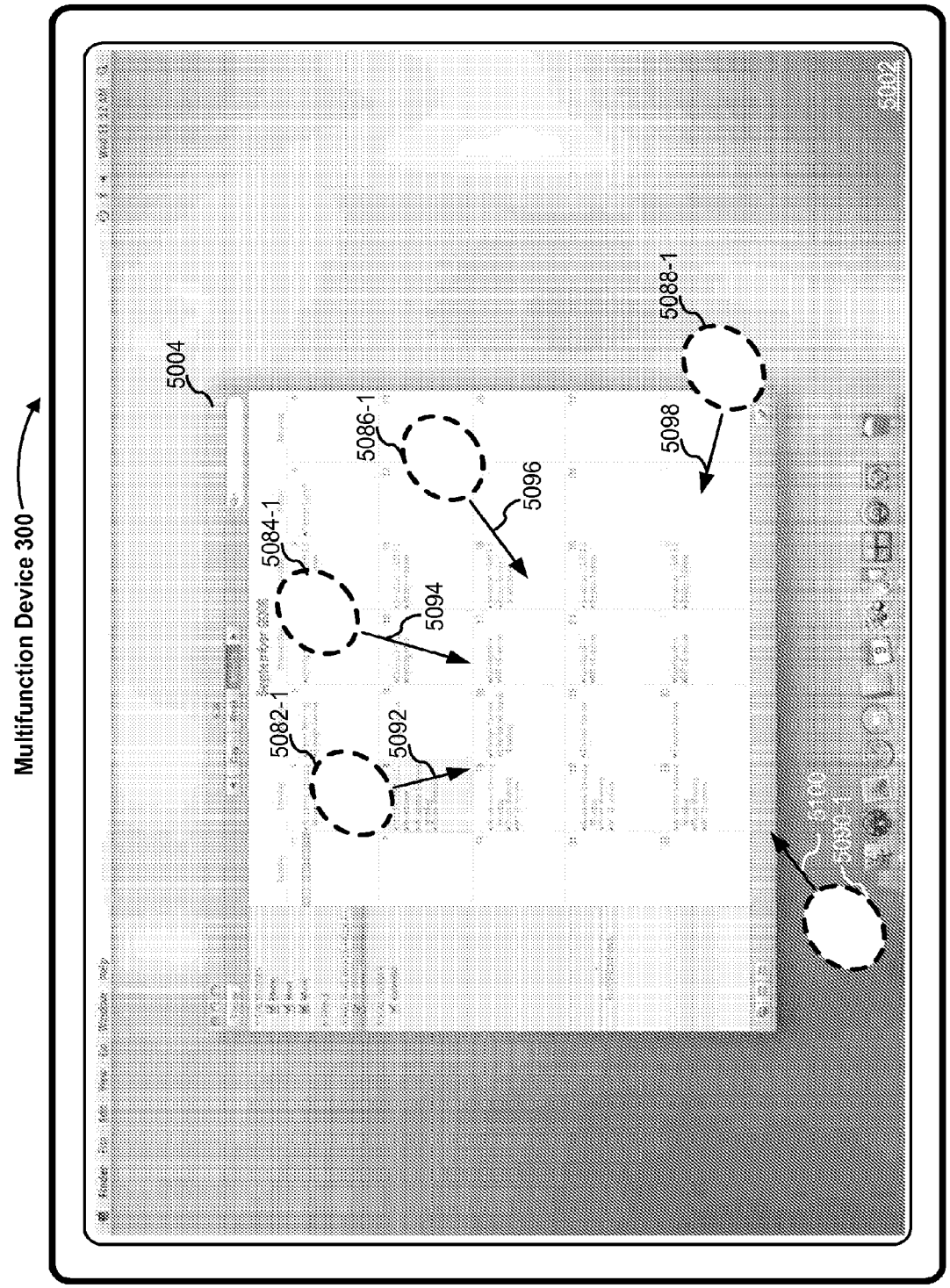
Figure 5L:
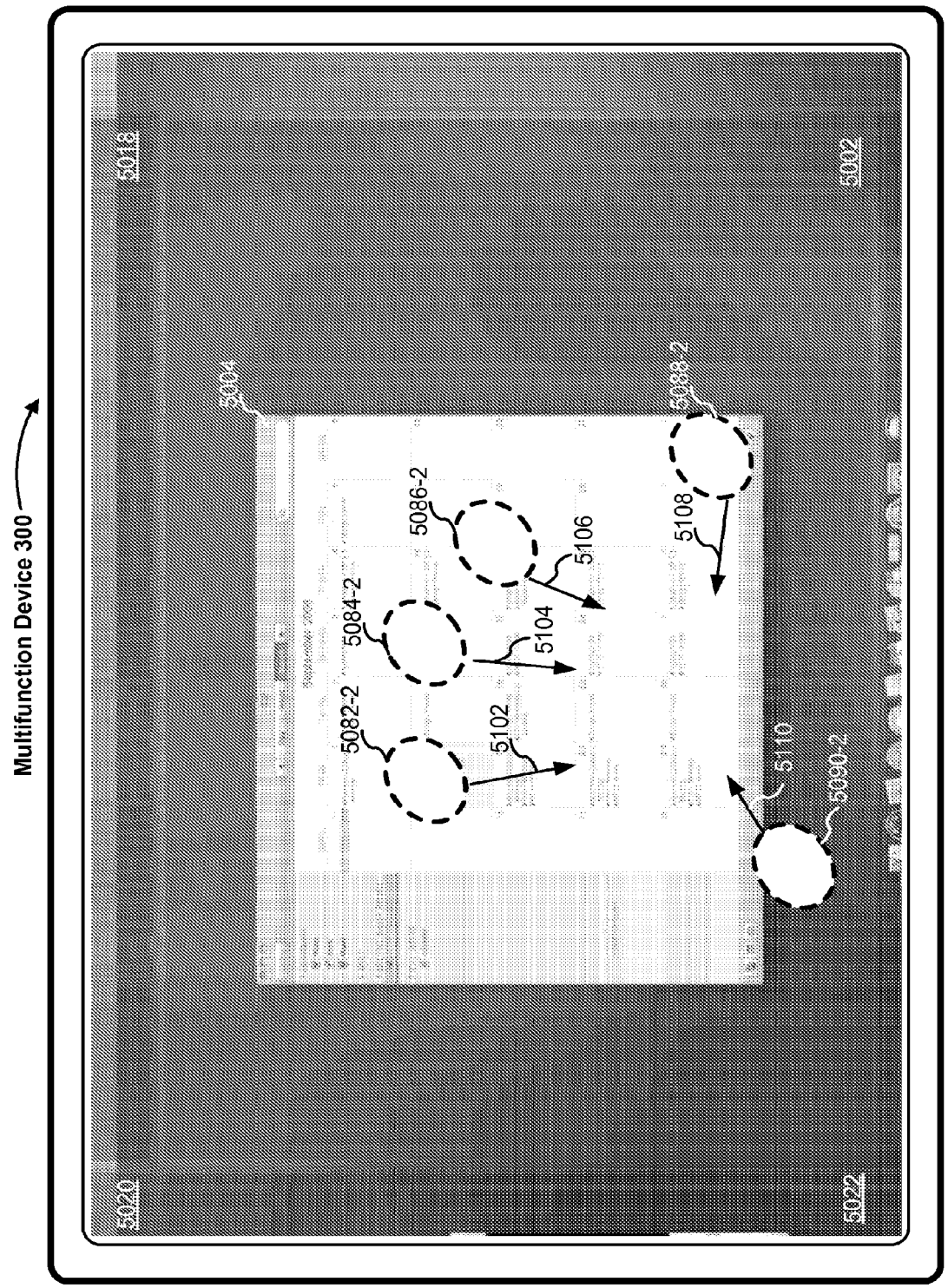
Figure 5M:
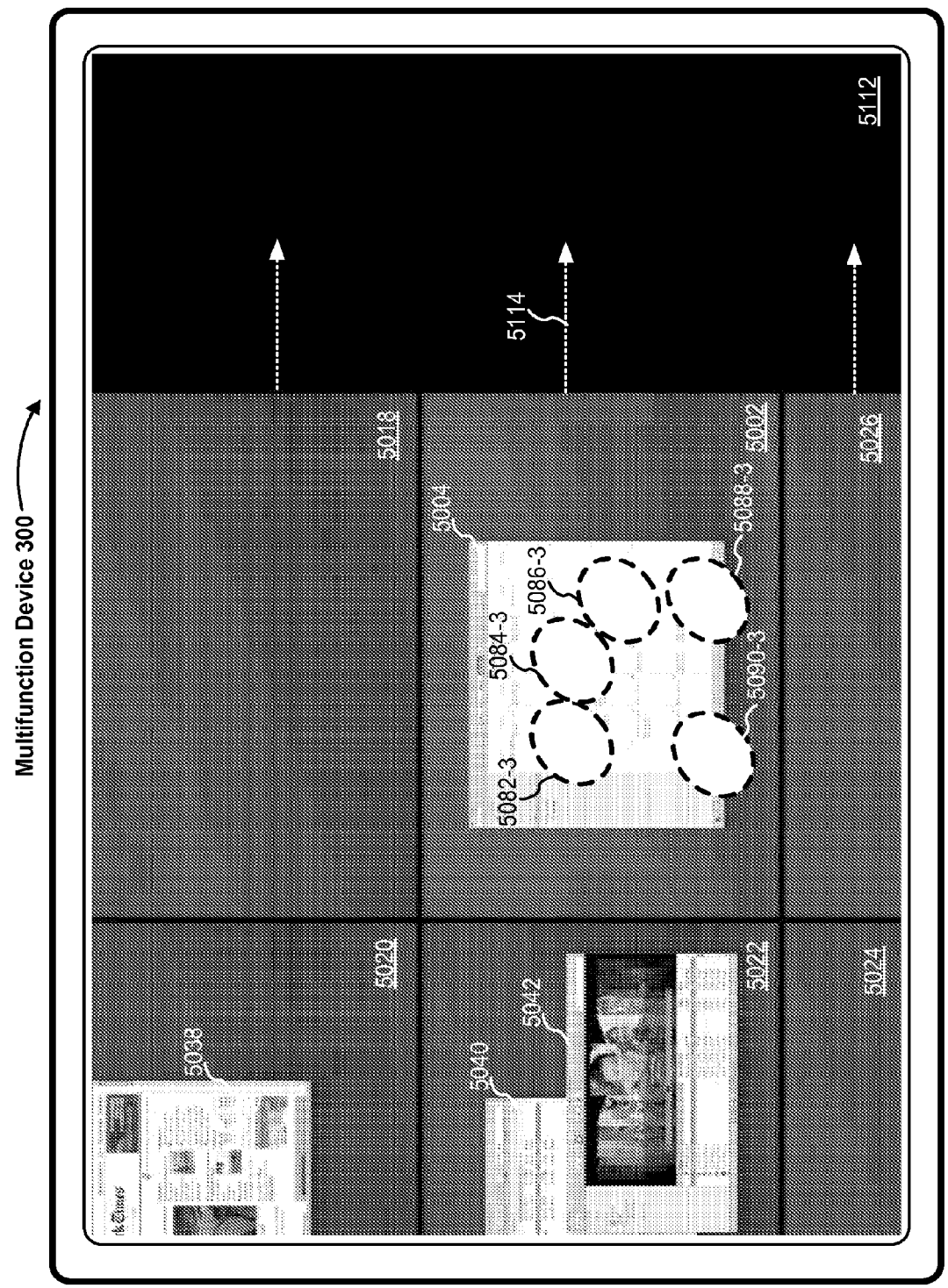
Figure 5N:
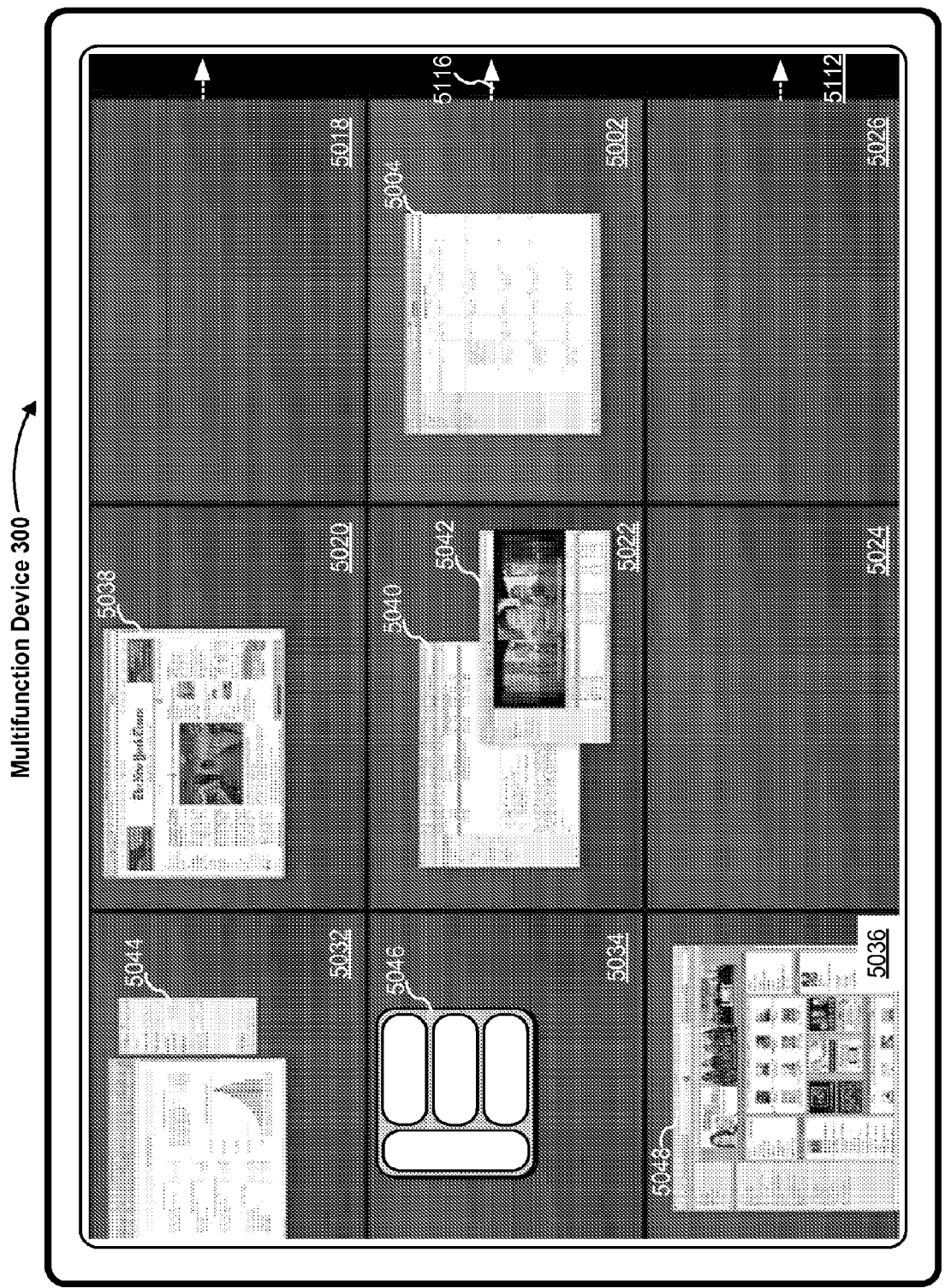
Figure 5O:
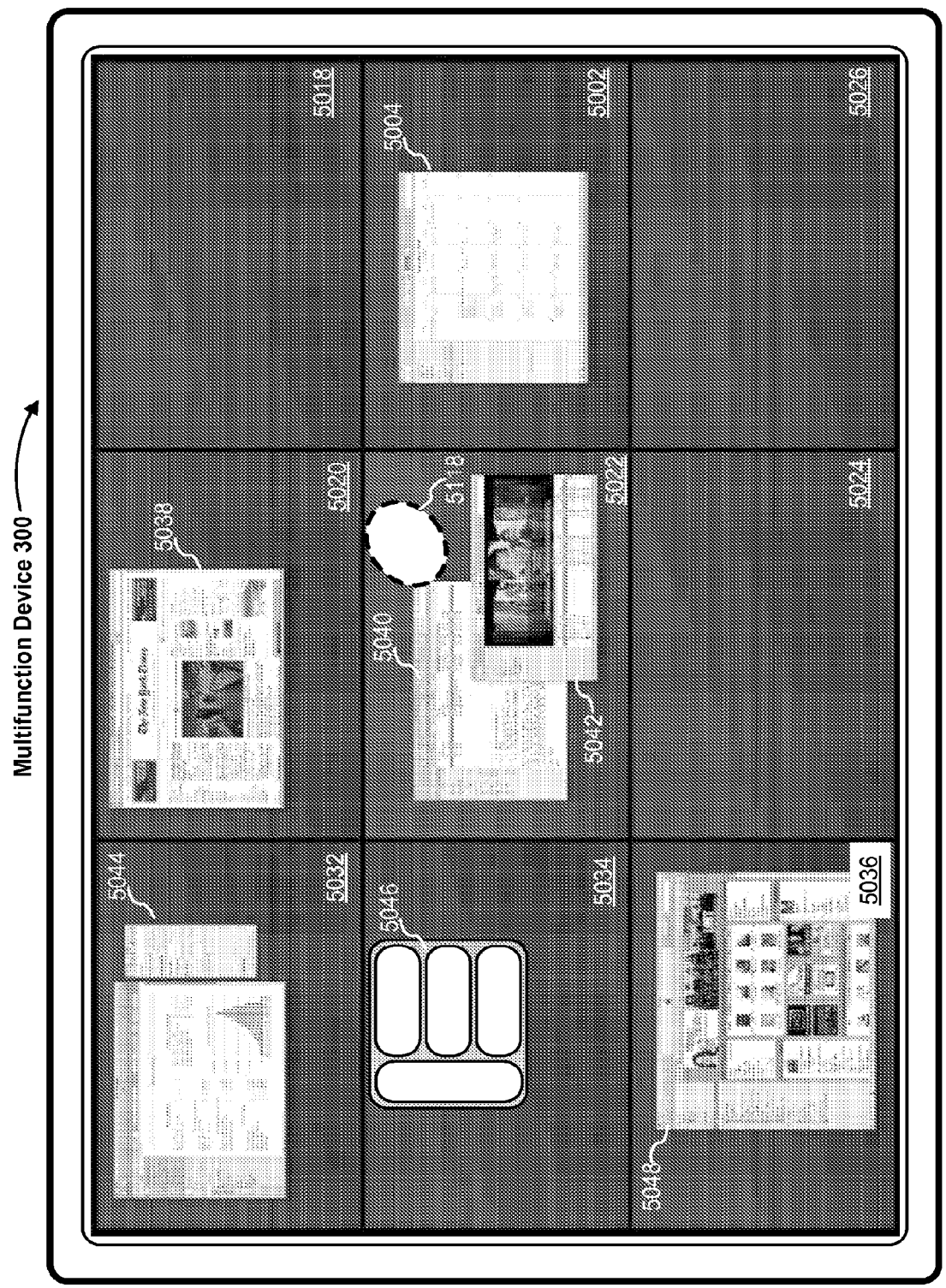
Figure 5P:
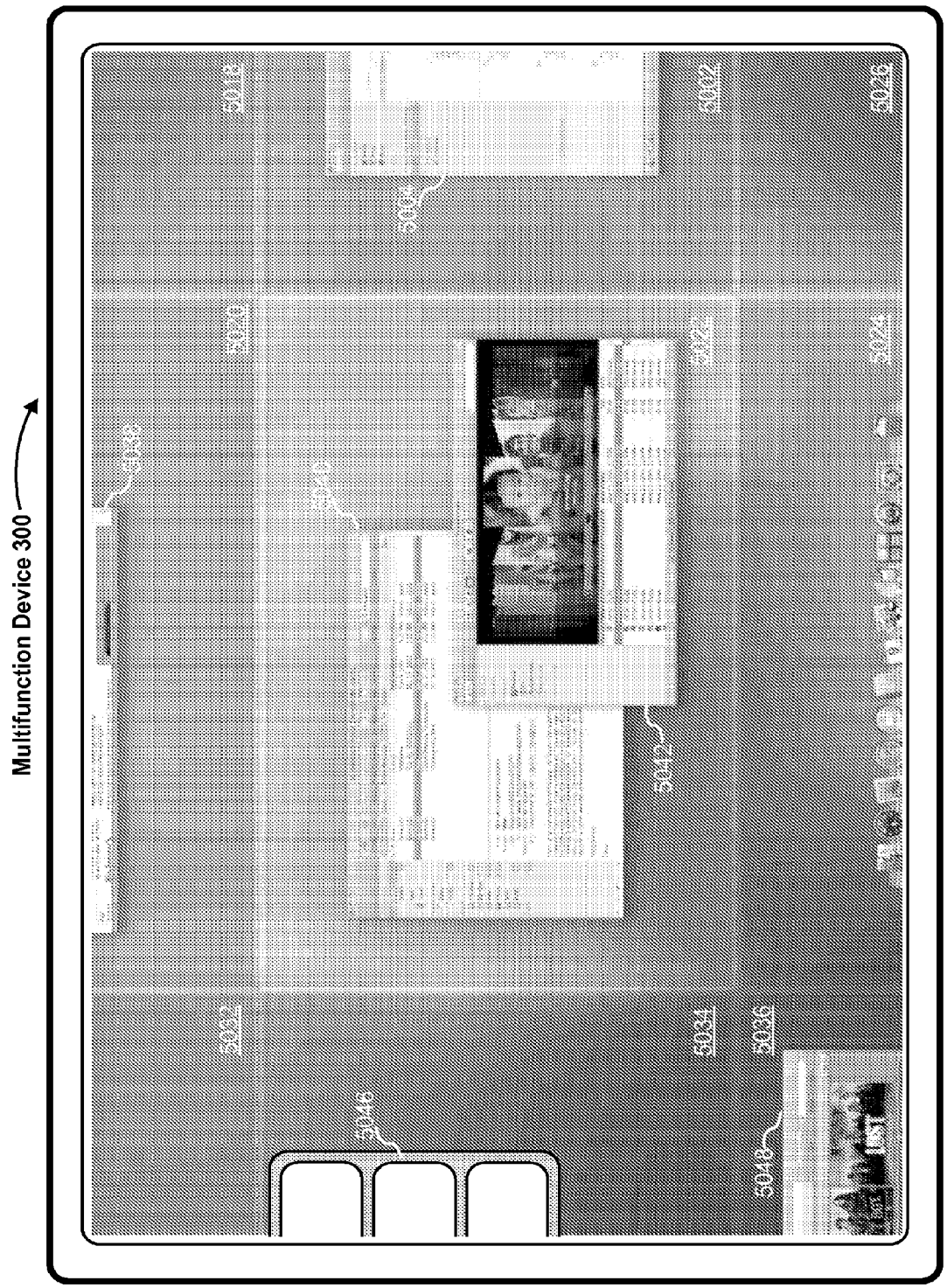
Figure 5Q:
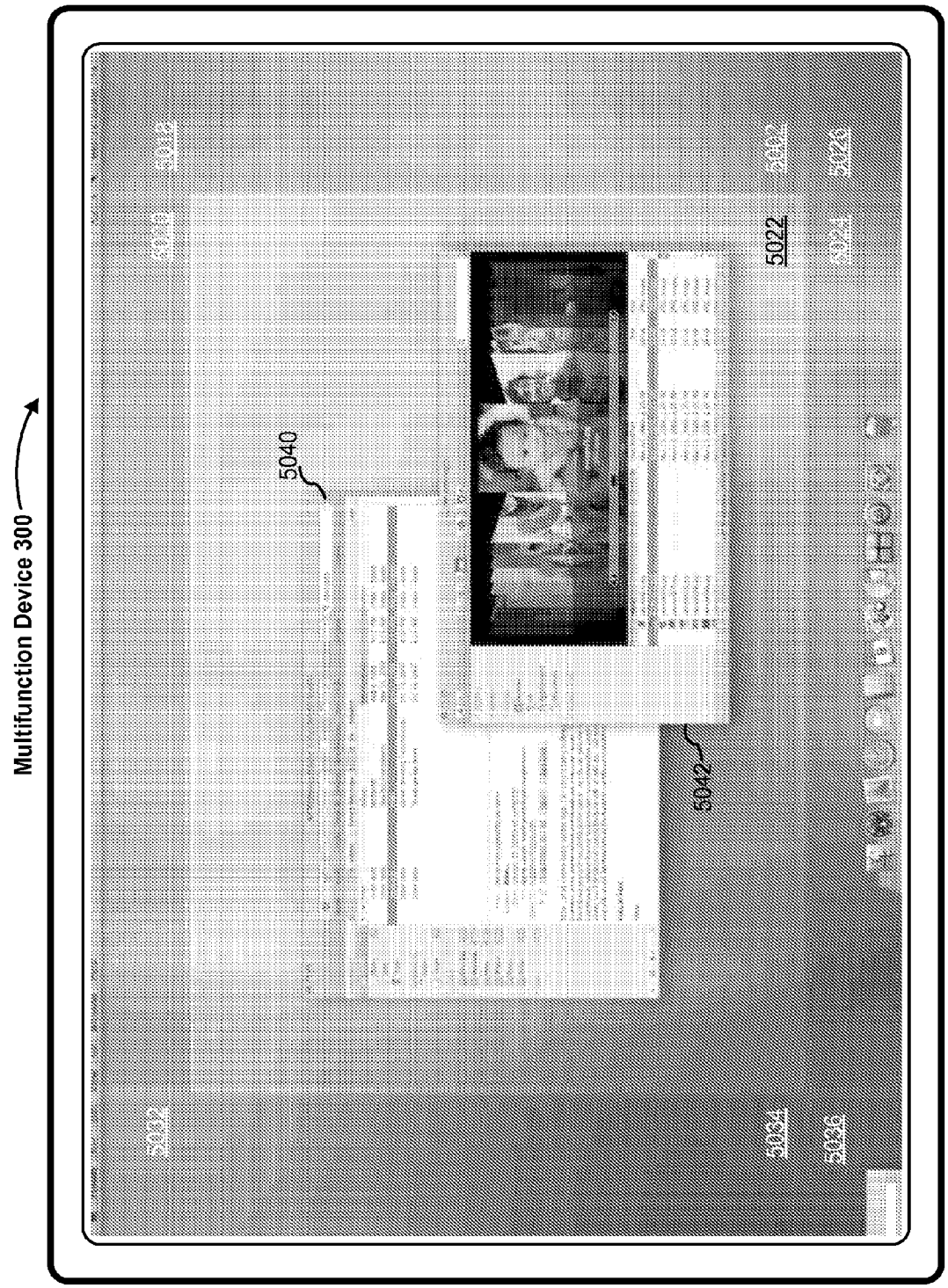
Figure 5R:
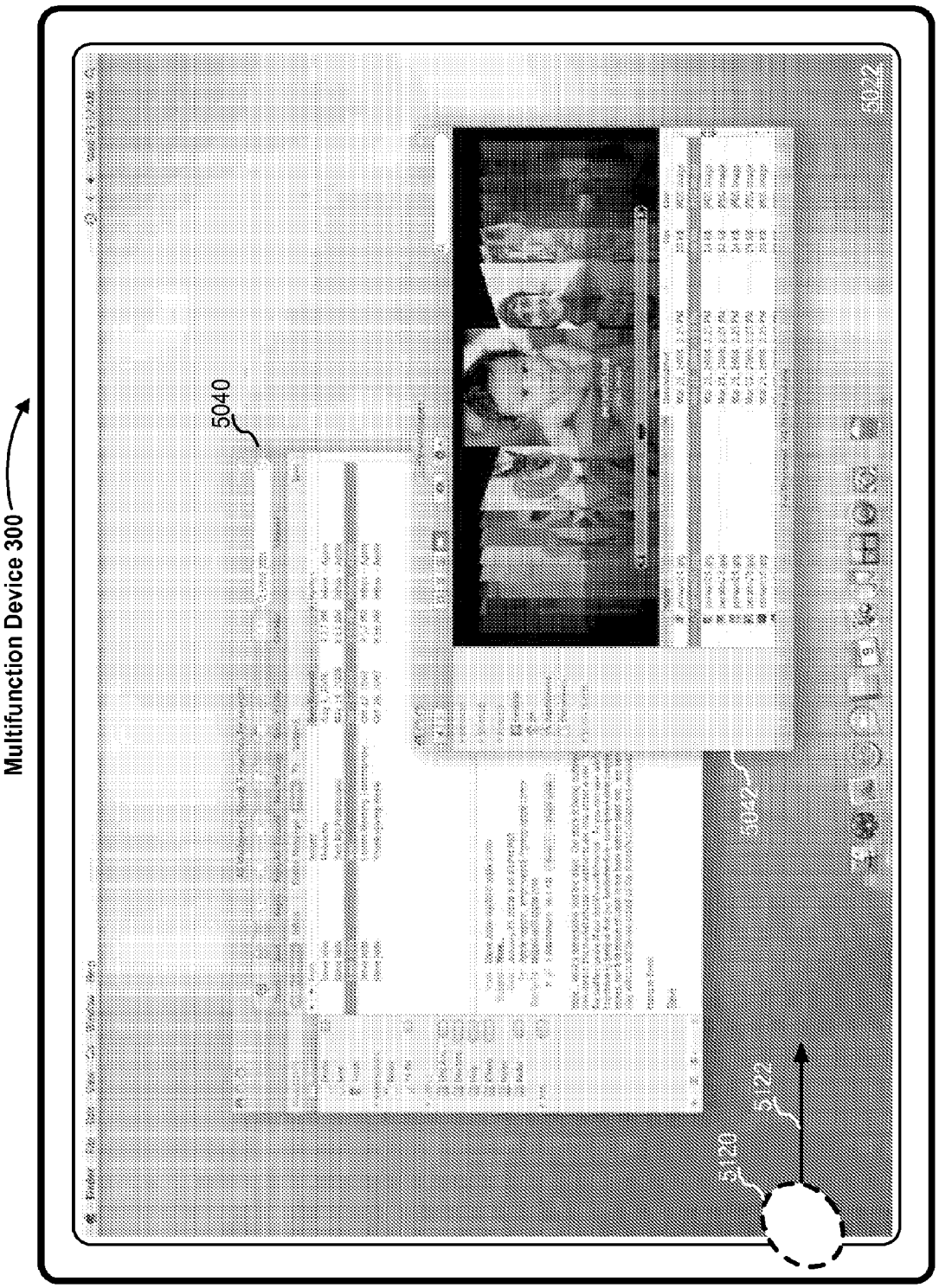
Figure 5S:
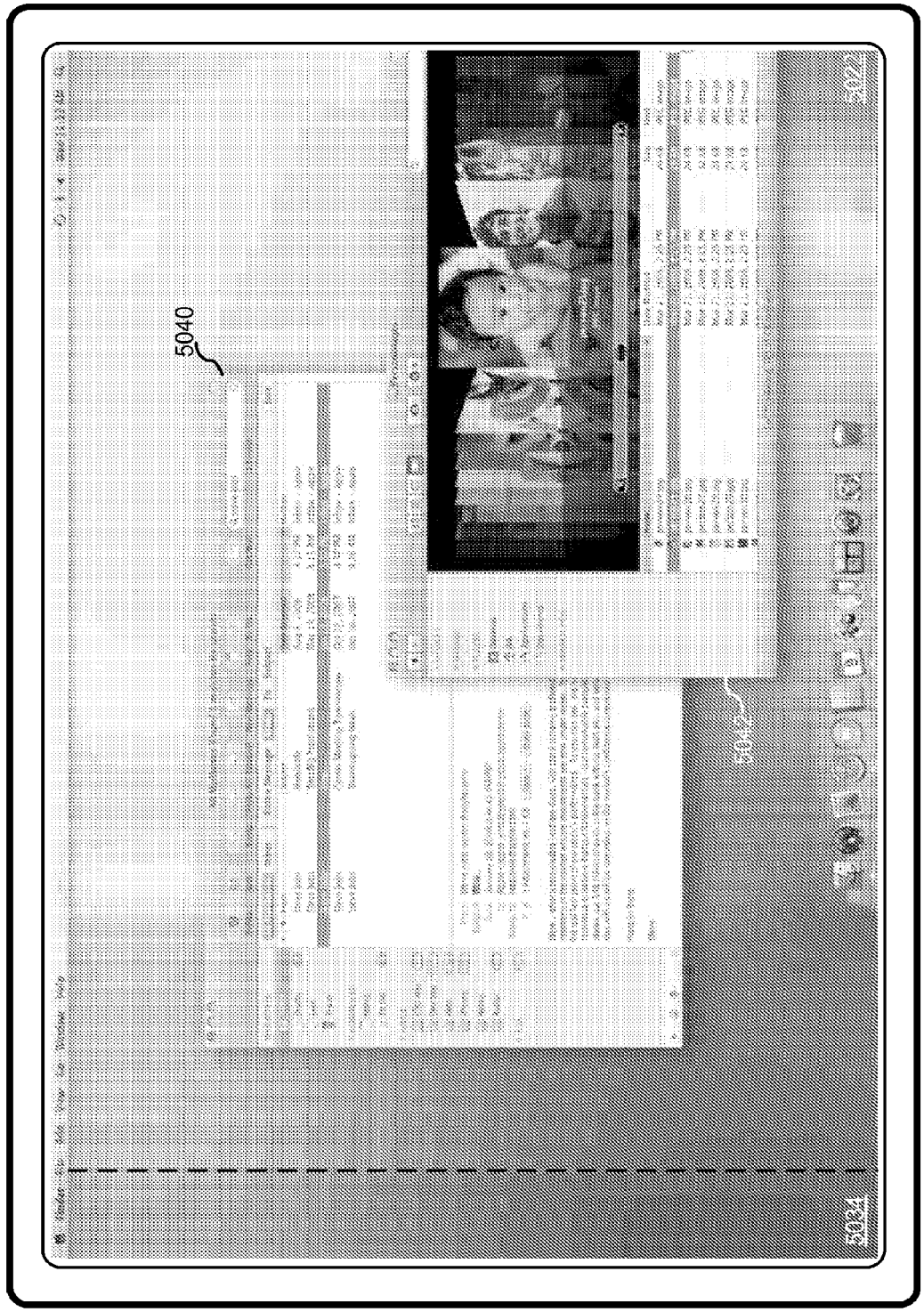

FIGS. 5R-5U illustrate replacing a display of a first single workspace view (e.g., 5022, FIG. 5R) with a display of a second single workspace view (e.g., 5034, FIG. 5O) in response to detecting a swipe gesture (e.g., movement 5122 of contact 5120, FIG. 5R).

FIGS. 5V-5Y illustrate replacing a display of a first single workspace view (e.g., 5022, FIG. 5V) with a display of a second single workspace view (e.g., 5034, FIG. 5Y) in response to detecting a swipe gesture (e.g., movement 5130 of contact 5128, FIG. 5V) while maintaining selection of a window (e.g., 5040) that was selected in the first single workspace view.

Figure 5U:
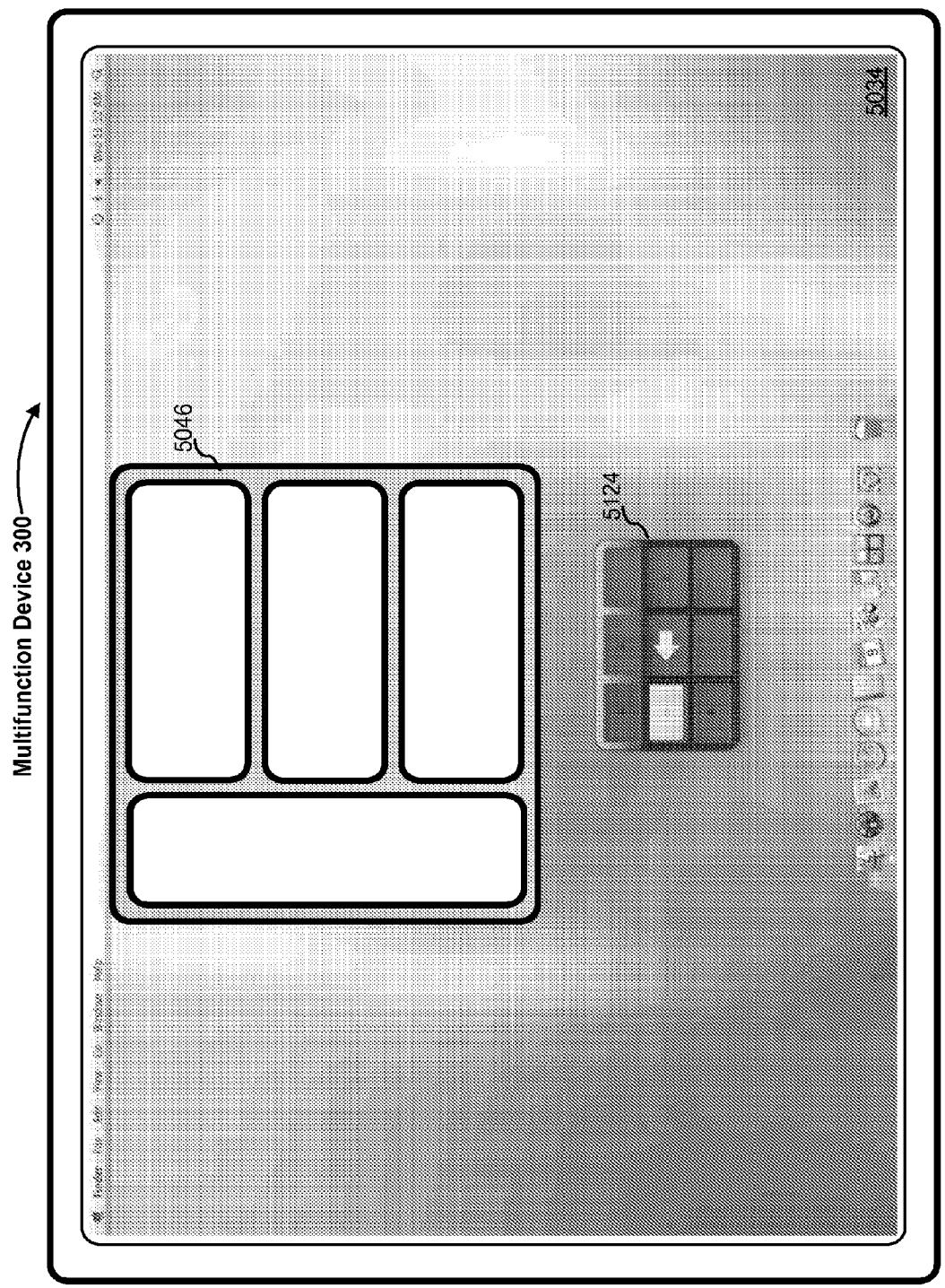
Figure 5V:
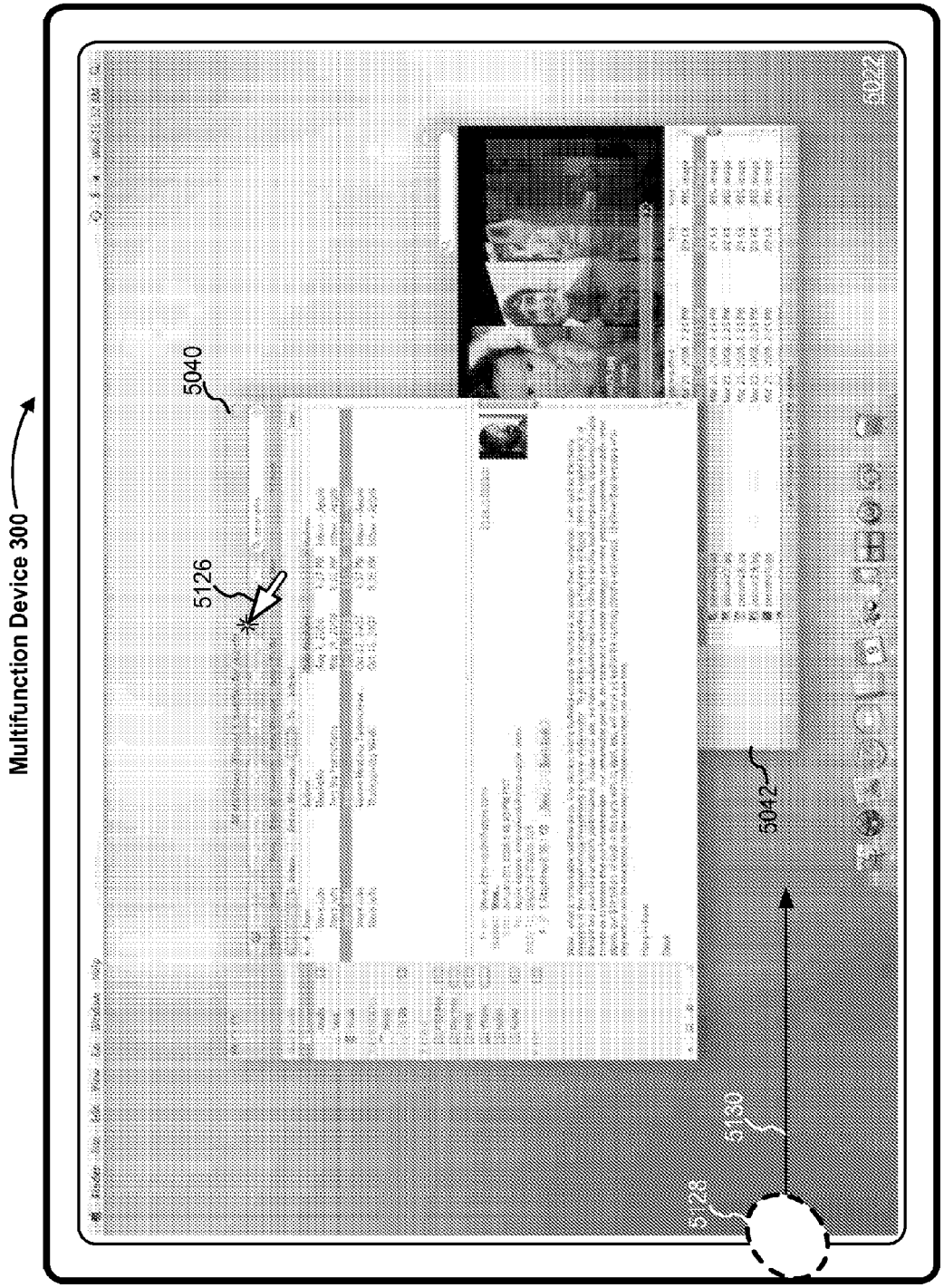
Figure 5W:
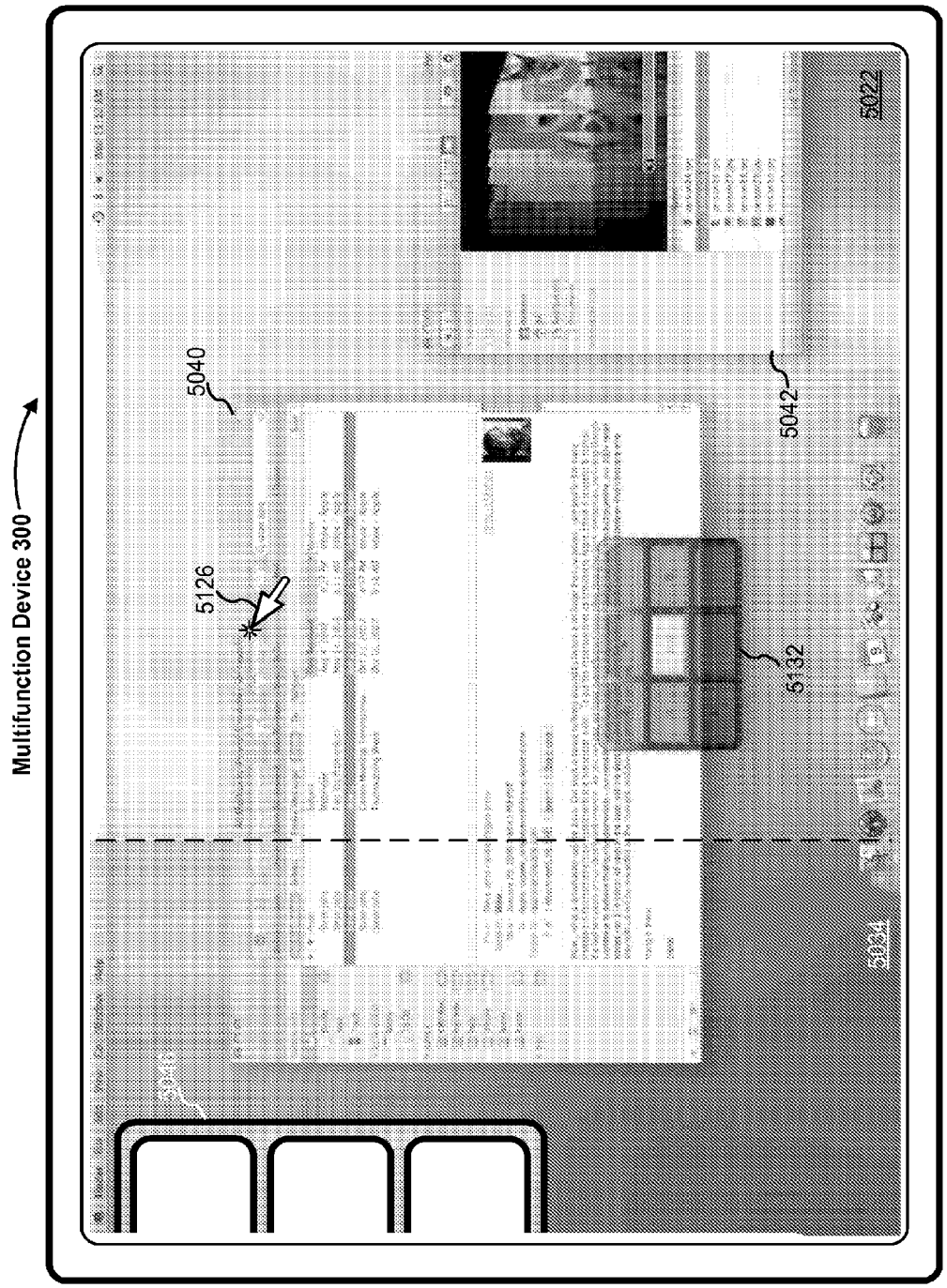
Figure 5X:
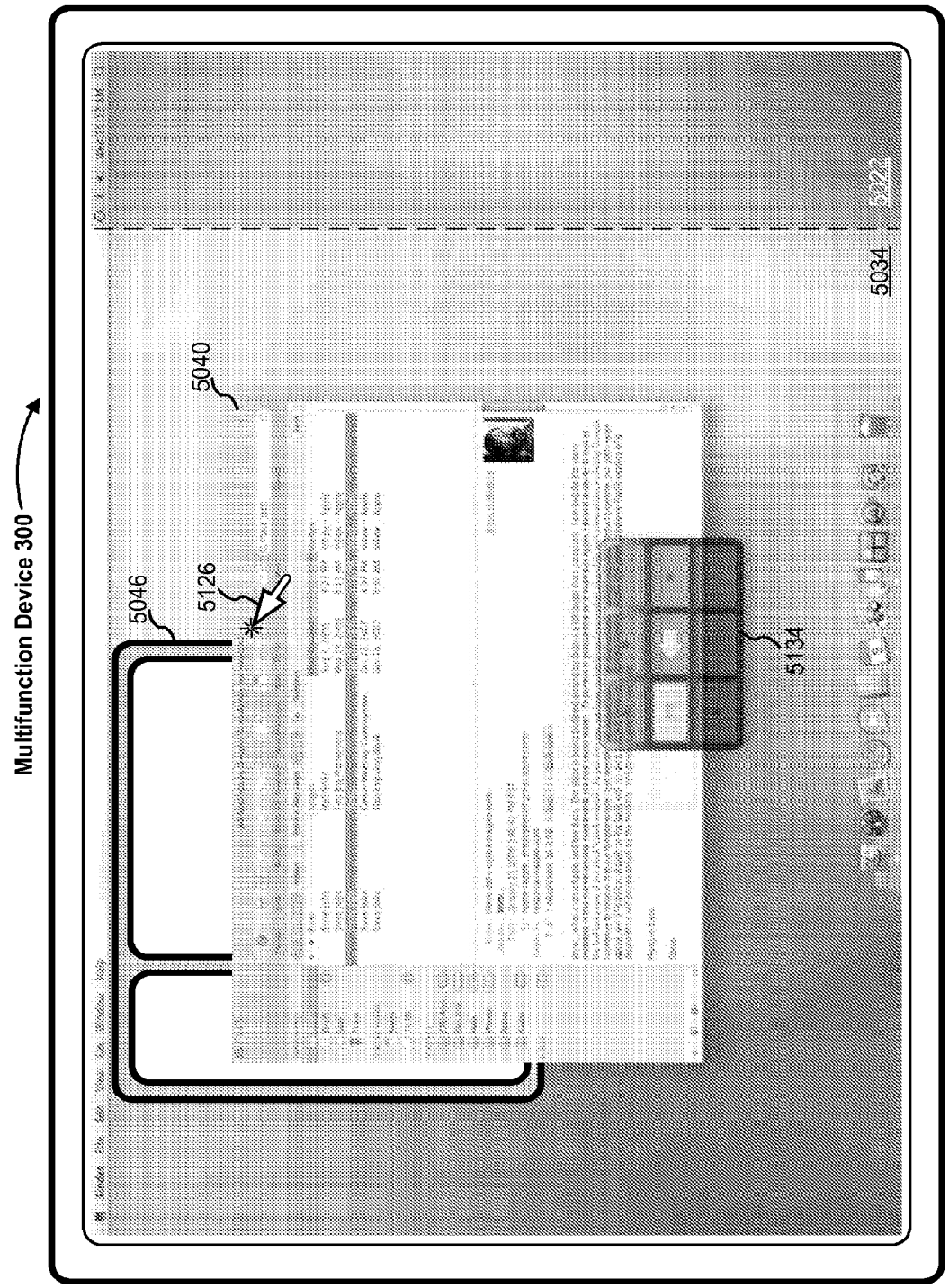
Figure 5Y:
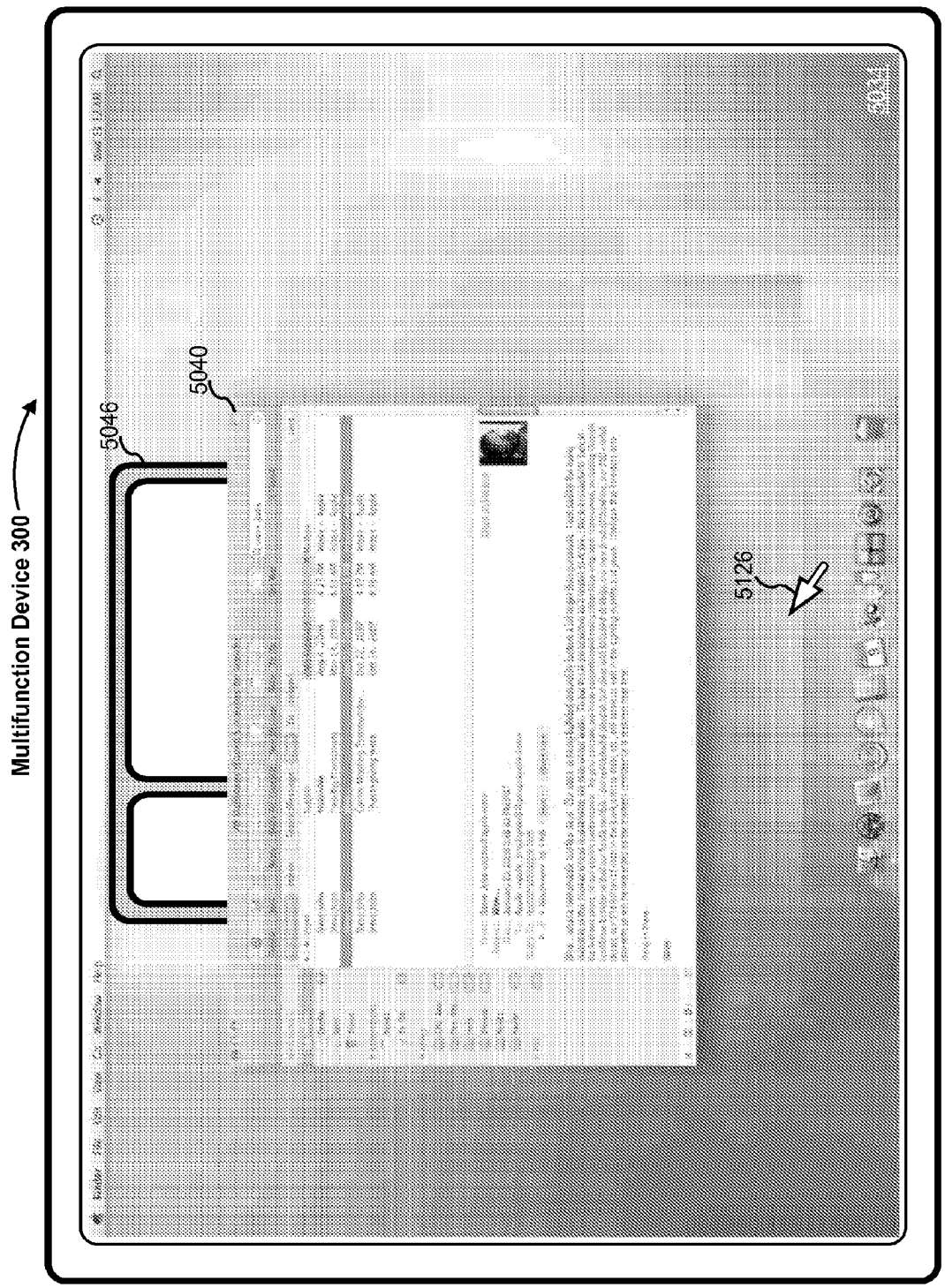
Figure 5Z:
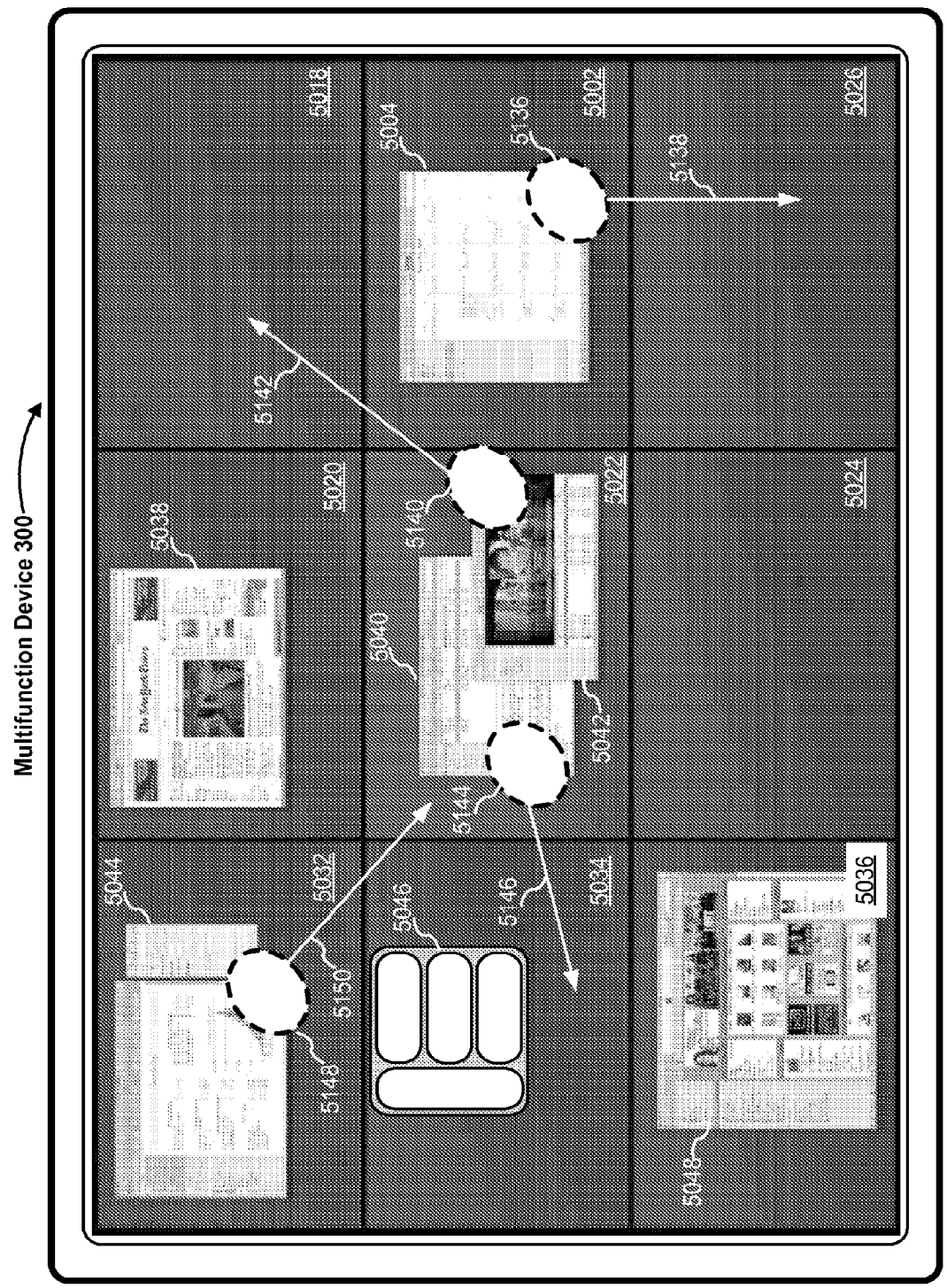
Figure 5A:
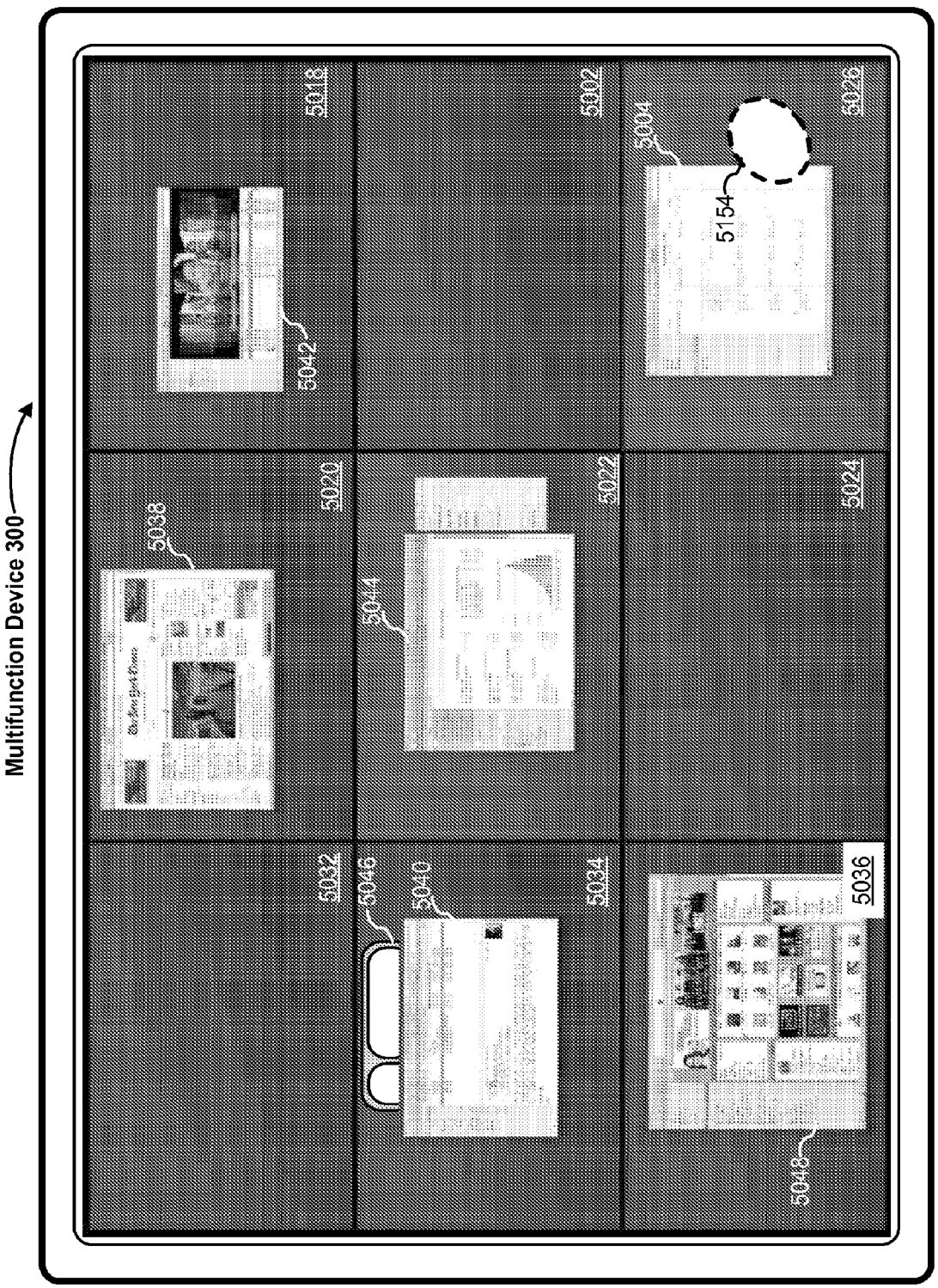
Figure 5B:
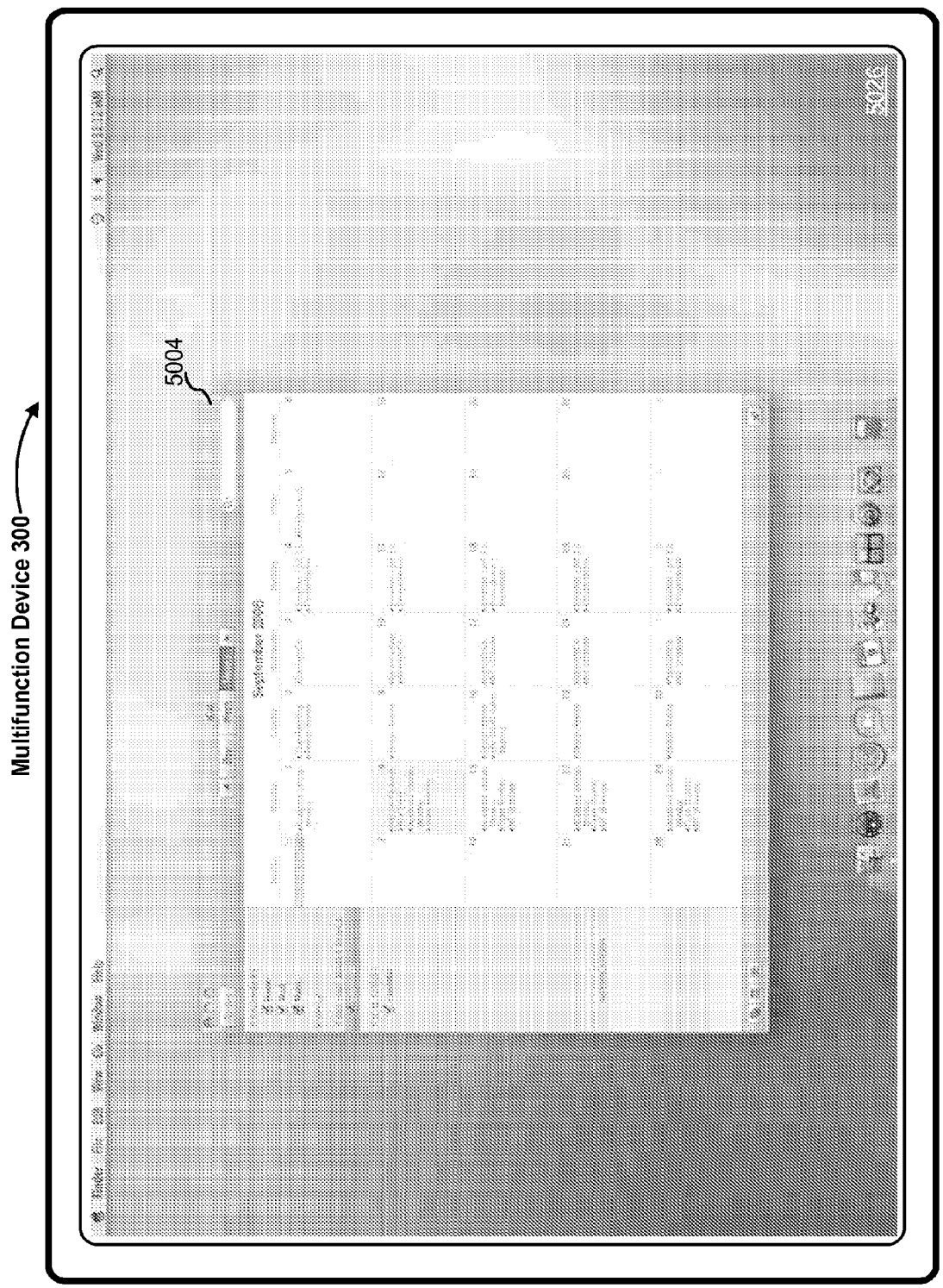
Figure 5C:
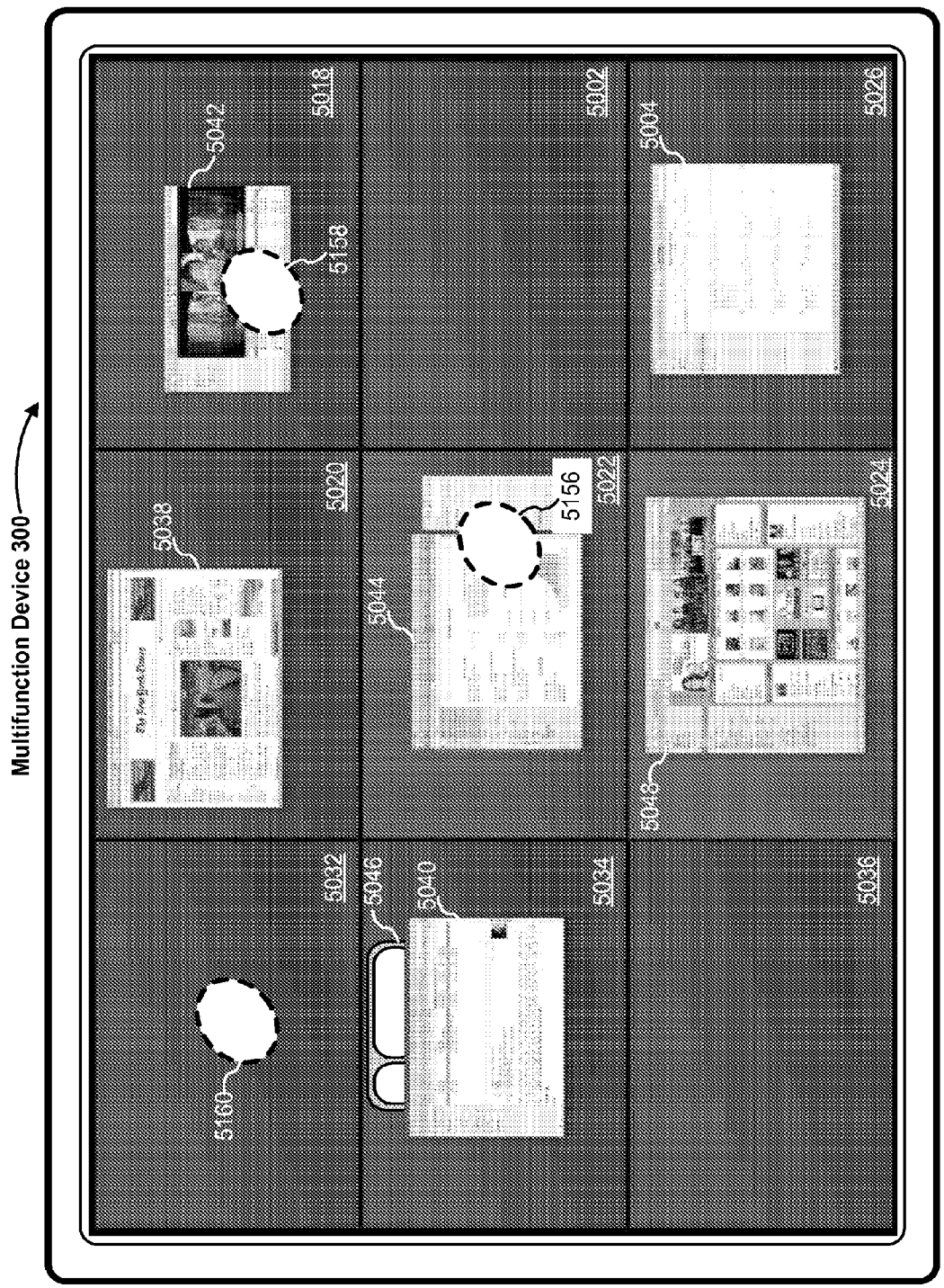
Figure 5D:
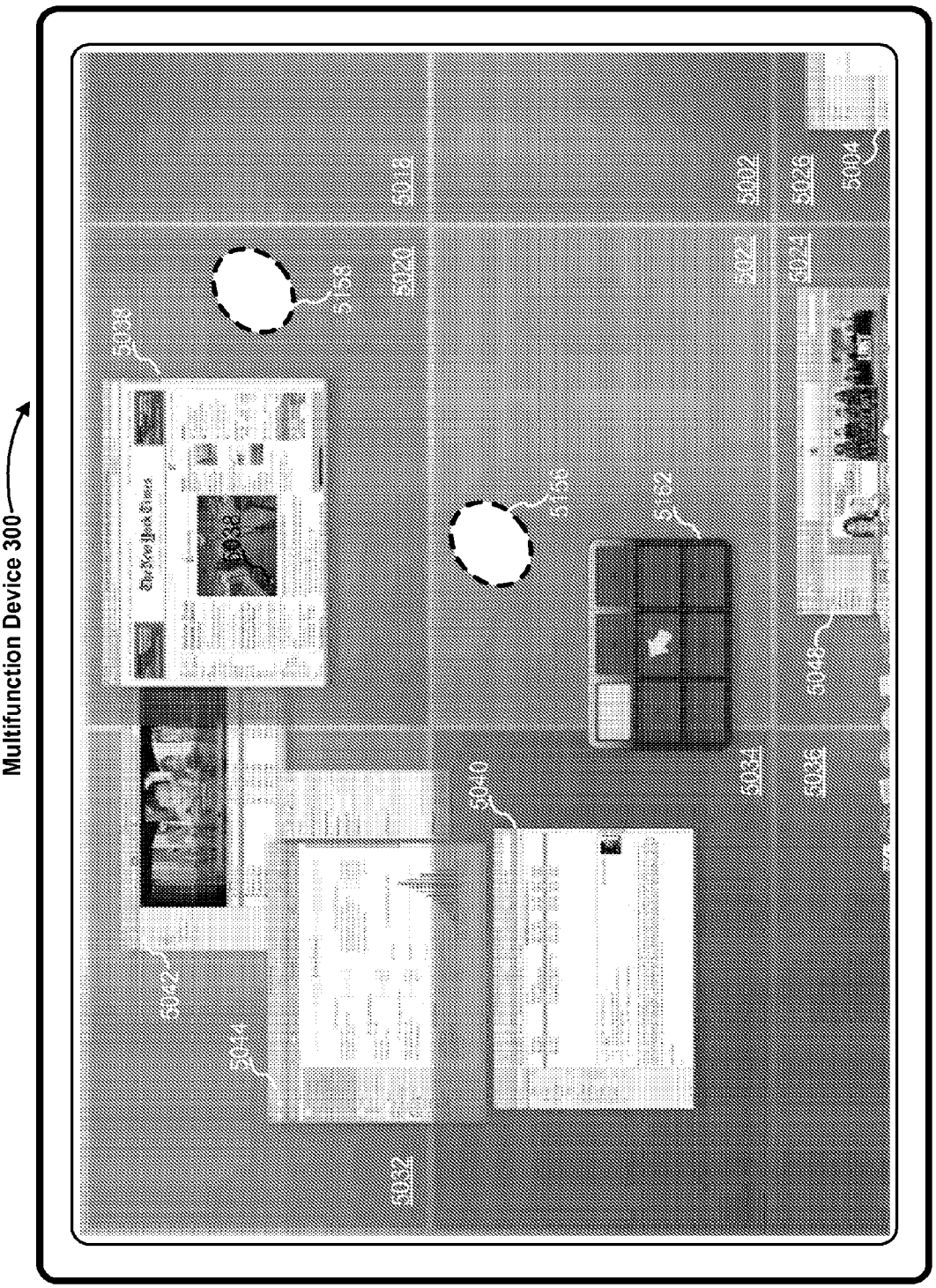
Figure 5E:
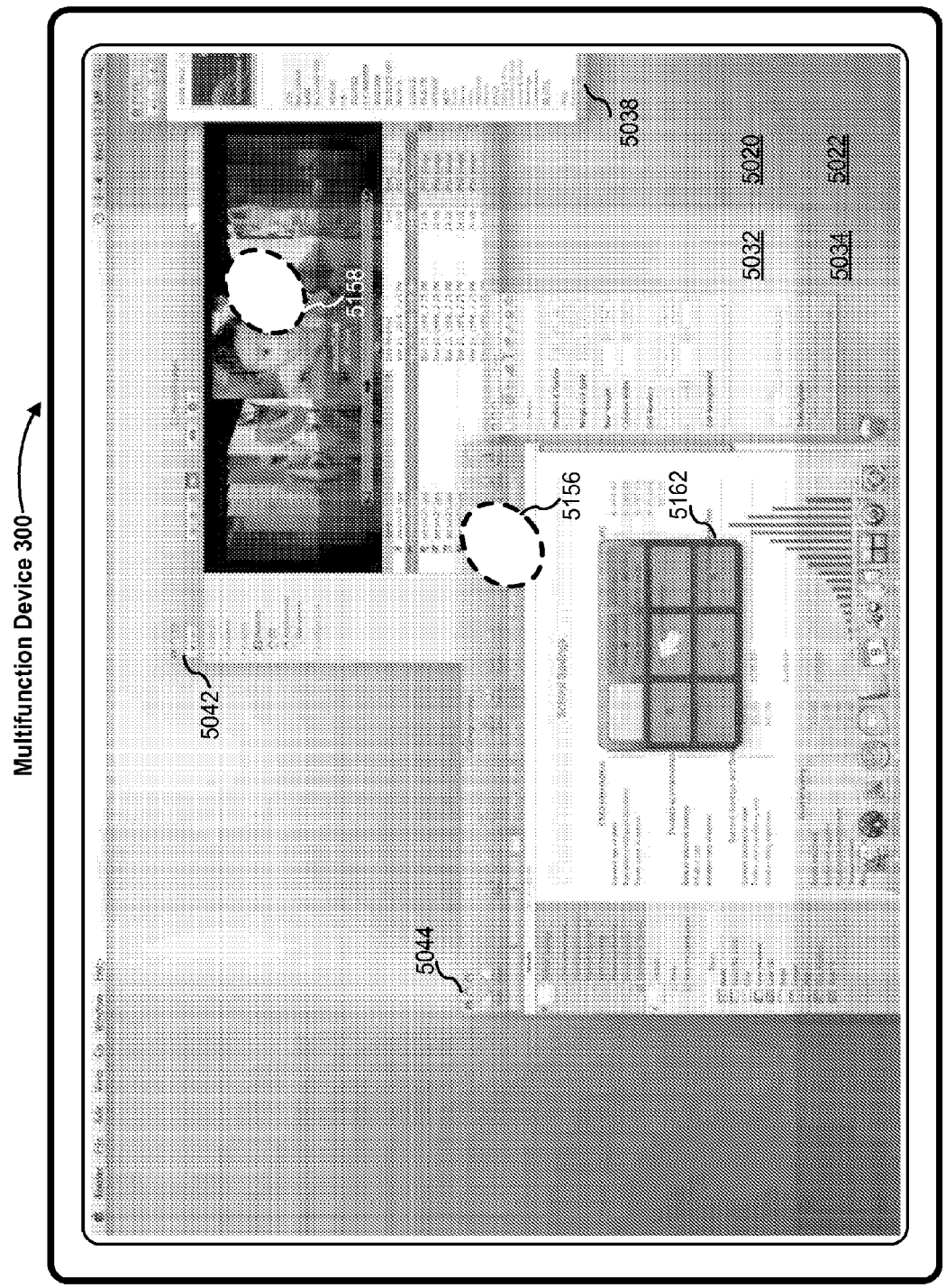
Figure 5G:
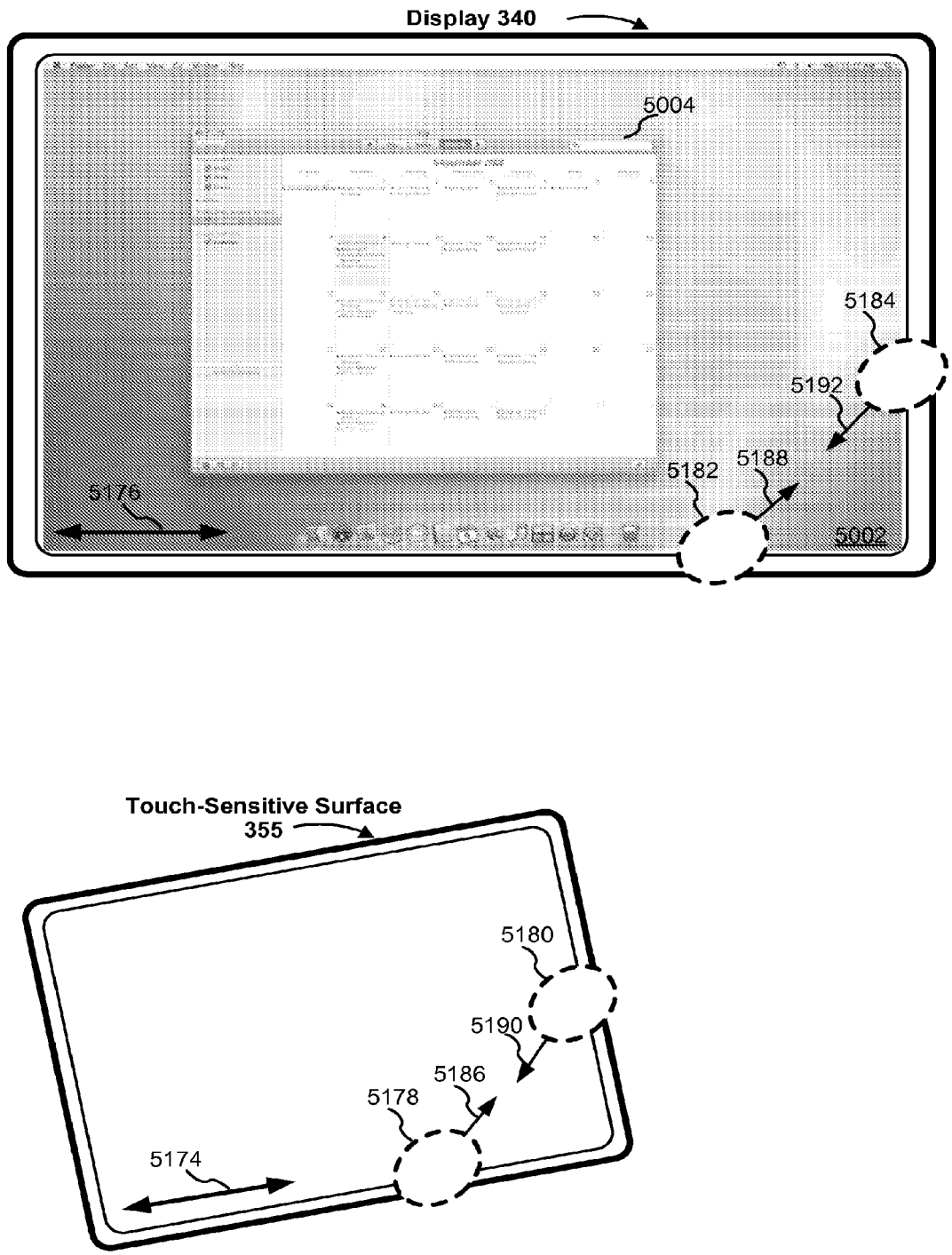
Figure 6A:
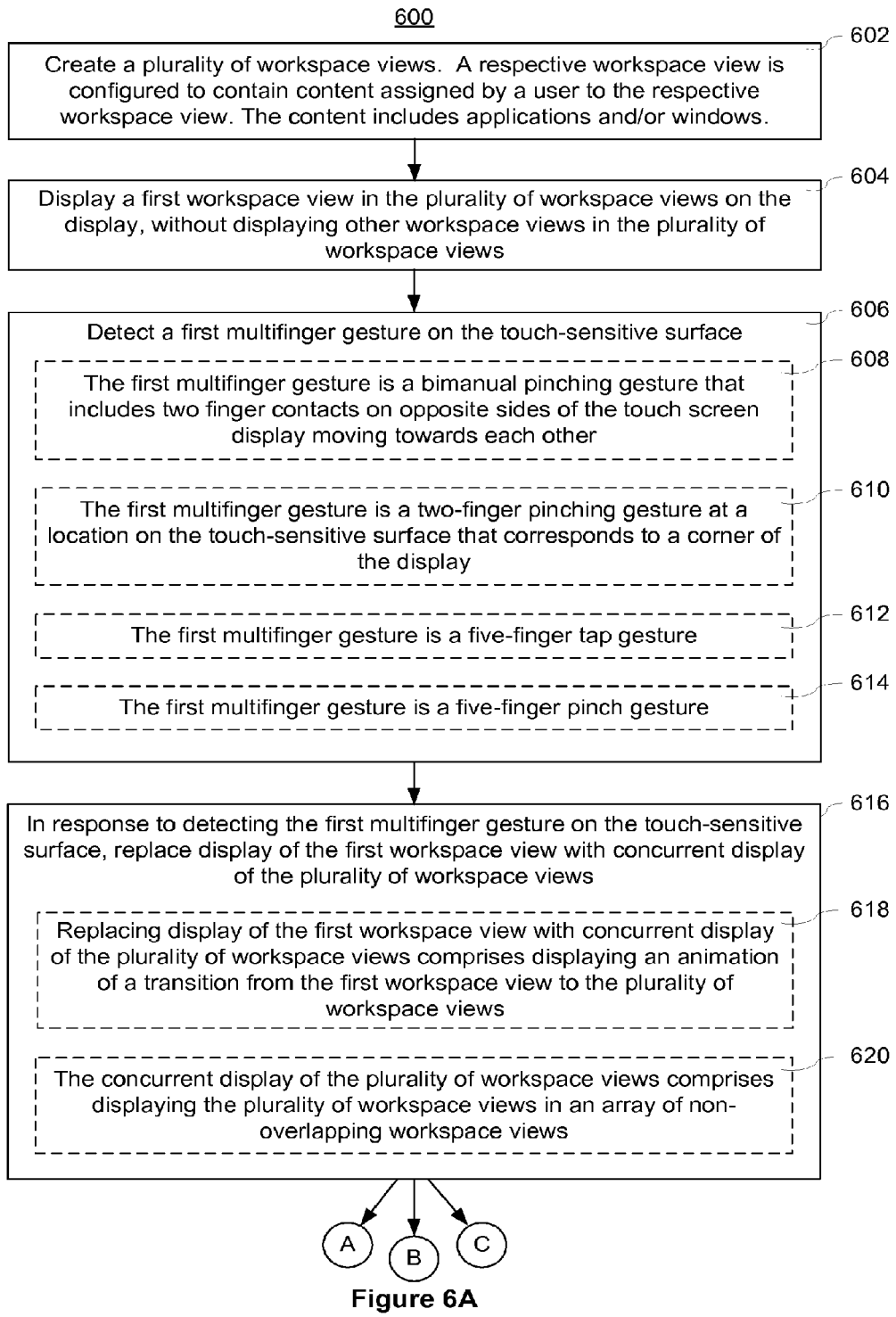
FIGS. 6A-6E are flow diagrams illustrating a method of manipulating workspace views in accordance with some embodiments.
Figure 6B:
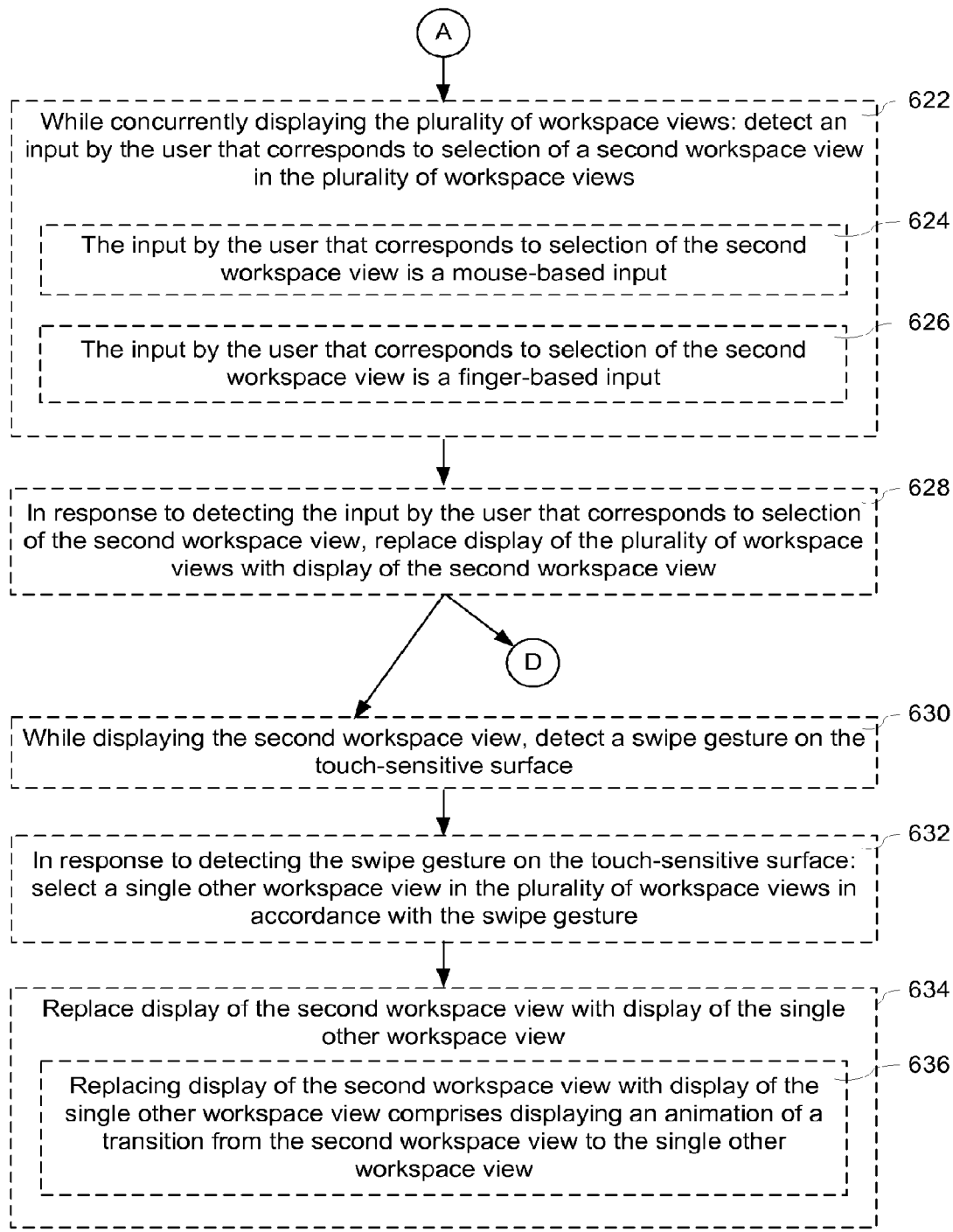
Figure 6C:
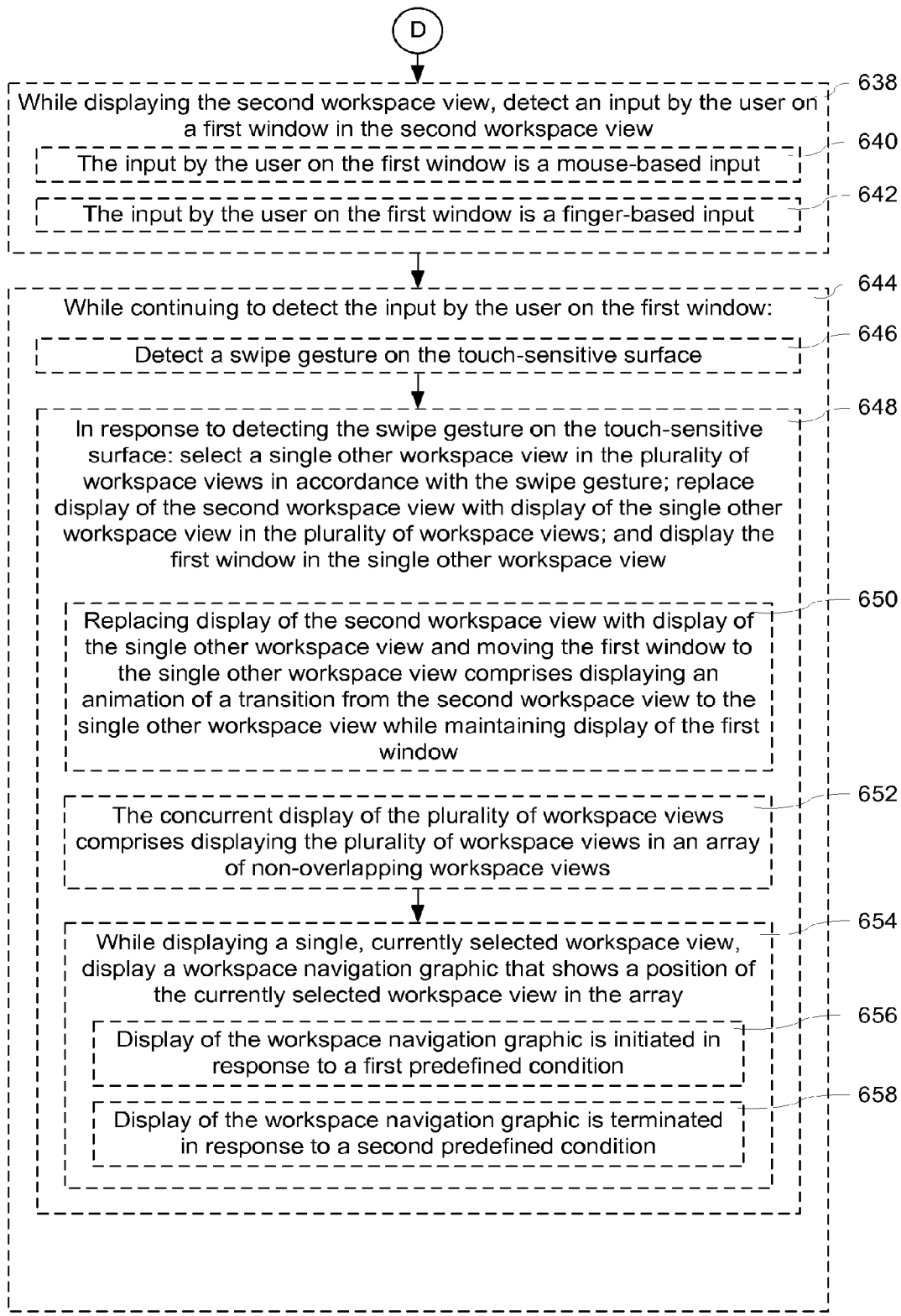
Figure 6D:
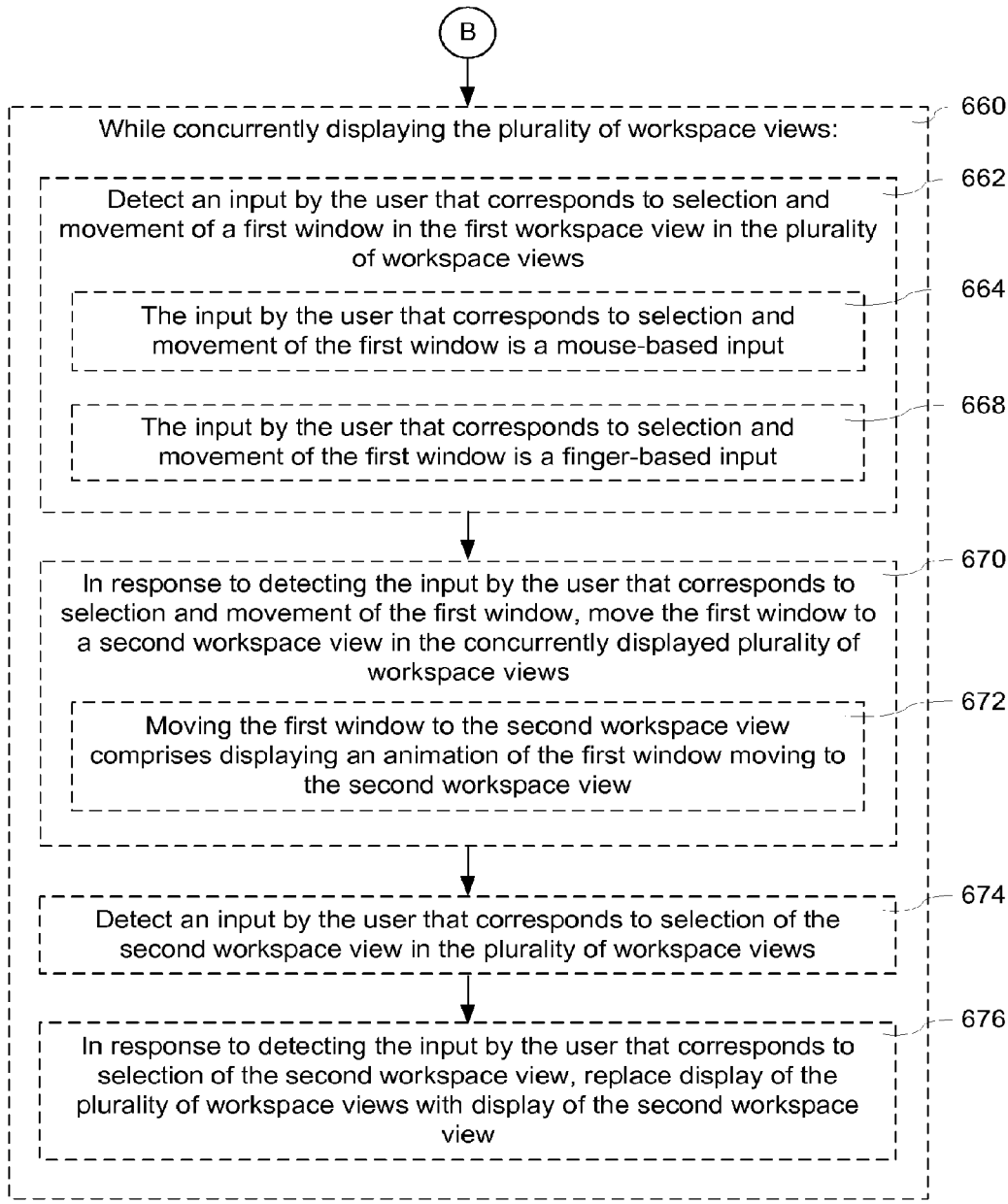
Figure 6E:
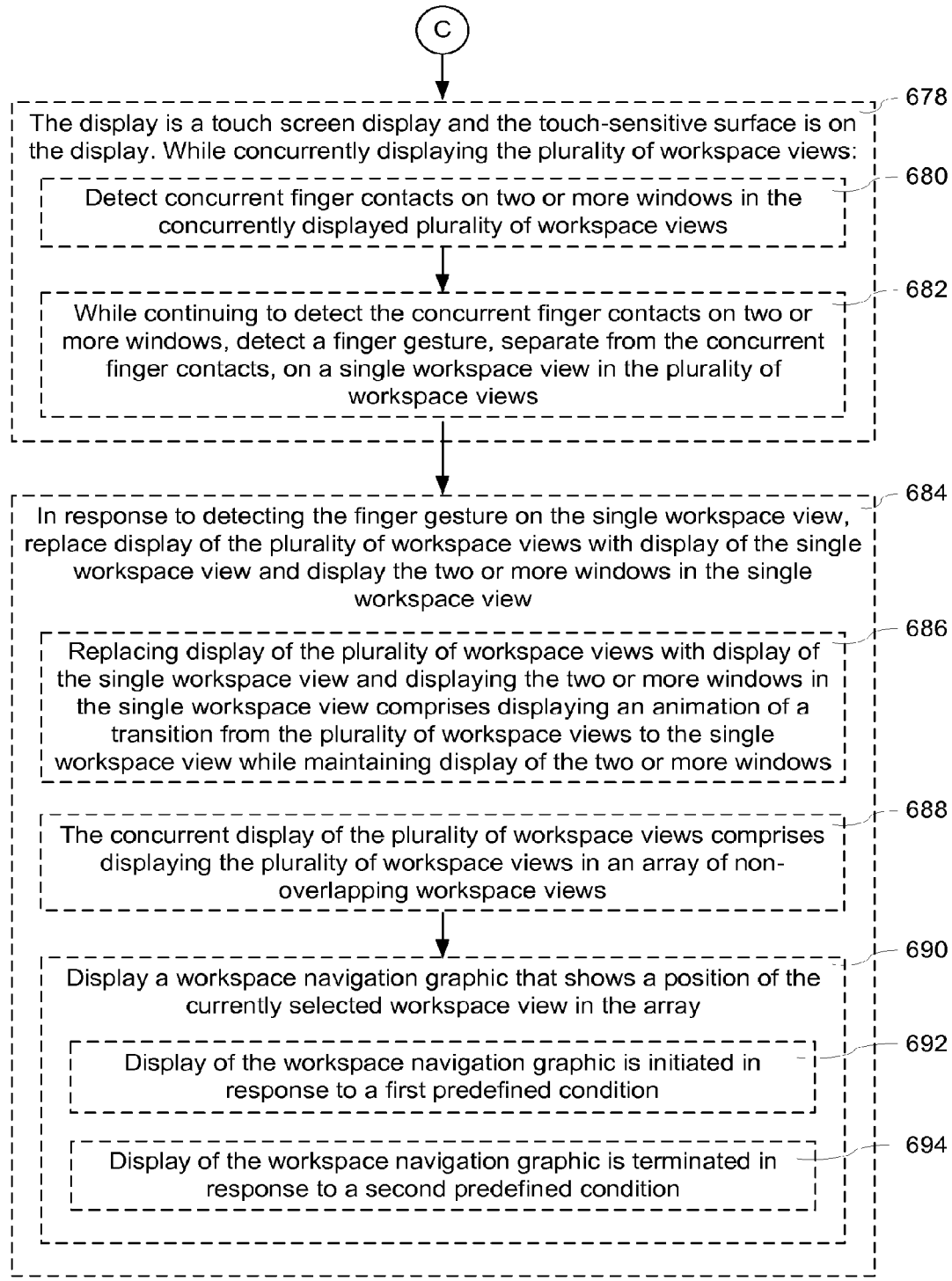

FIGS. 5Z-5AA illustrate moving windows between a plurality of workspace views while concurrently displaying the plurality of workspace views.

FIGS. 5Z-5BB illustrate moving a window 5004 from a first workspace view 5002 to a second workspace view 5026 while displaying a plurality of workspace views and then, in response to detecting user selection of the second workspace view, displaying just the second workplace view 5026.

FIGS. 5CC-5FF illustrate moving two or more windows (e.g., windows 5042 and 5044) from one or more workspaces (e.g., workspaces 5018 and 5022, respectively) to a single destination workspace (e.g., 5032) by detecting concurrent finger contacts on the two or more windows (e.g., 5158 and 5156, respectively) and then detecting a separate finger gesture on the destination workspace (e.g., 5160).

FIG. 5GG illustrates the device detecting a two-finger pinching gesture at a location on a touch-sensitive surface that corresponds to a corner of the display, where the touch-sensitive surface is distinct from the display.

FIGS. 6A-6E are flow diagrams illustrating a method 600 of manipulating workspace views in accordance with some embodiments. The method is performed at a multifunction device (e.g., device 300, FIG. 3, or portable multifunction device 100, FIG. 1) with a display and a touch-sensitive surface. In some embodiments, the display is a touch screen display (e.g., 340 in FIG. 5A) and the touch-sensitive surface is on the display. In some embodiments, the display is separate from the touch-sensitive surface, as described in greater detail below with reference to FIG. 5GG.

As described below, the method 600 provides an intuitive way to manipulate workspace views. The method reduces the cognitive burden on a user when manipulating workspace views, thereby creating a more efficient human-Machine interface. For battery-operated computing devices, enabling a user to manipulate workspace views faster and more efficiently conserves power and increases the time between battery charges.

The device creates (602) a plurality of workspace views (e.g., in response to a user setting workspace options in a settings menu, such as selecting a number of rows and a number of columns for an array or grid of workspace views, such as a three-by-three array of nine workspace views). A respective workspace view (e.g., 5002 in FIG. 5A) in the plurality of workspace views is configured to contain content (e.g., window 5004 for a calendar application in FIG. 5A) assigned by a user to the respective workspace view. The content includes applications and/or application windows.

The device displays (604) a first workspace view (e.g., workspace view 5002 in FIG. 5A) in the plurality of workspace views on the display without displaying other workspace views in the plurality of workspace views.

The device detects (606) a first multifinger gesture on the touch-sensitive surface. In some embodiments, the first multifinger gesture is (608) a bimanual pinching gesture that includes two finger contacts (e.g., 5006-1 and 5008-1 in FIG. 5A) on opposite sides of the touch screen display moving (e.g., 5010 and 5012 in FIG. 5A) towards each other (e.g., as shown in FIGS. 5A-5C). In some embodiments a bimanual gesture is a gesture performed with one finger contact from a finger on the user's right hand (e.g., 5006-1 in FIG. 5A) and one finger contact from a finger on the user's left hand (e.g., 5008-1 in FIG. 5A).

For example, a left finger contact 5008-1 starts at or near an edge of the left side of the touch screen display (e.g., within a predefined area on the left side of the touch screen display) and moves to the right on the touch-sensitive surface (e.g., movement 5010 to contact location 5008-2 in FIG. 5B, and movement 5014 to contact location 5008-3 in FIG. 5C), while concurrently a right finger contact (e.g., 5006-1 in FIG. 5A) starts at or near an edge of the right side of the touch screen display (e.g., within a predefined area on the right side of the touch screen display) and moves to the left on the touch-sensitive surface (e.g., movement 5012 to contact location 5006-2 in FIG. SB, and movement 5016 to contact location 5006-3 in FIG. 5C). The two finger contacts thus move towards each other, as well as towards a center or a vertical centerline of the touch screen display.

In some embodiments, replacing display of the first workspace view with concurrent display of the plurality of workspace views comprises displaying an animation of a transition from the single workspace view to the plurality of workspace views. An exemplary animation is illustrated in FIGS. 5A-5E. In FIG. 5A the single workspace view 5002 is displayed without any other workplace views. In FIG. 5B, after the bimanual pinching gesture begins, the single workspace view 5002 begins to shrink, including shrinking any applications and windows (e.g., 5004 in FIG. 5B) in the workspace view 5002, and the edges of adjacent workspace views (e.g., 5018, 5020, and 5022 in FIG. 5B) are displayed. As the bimanual pinching gesture continues, as shown in FIG. 5C, the single workspace view 5002 shrinks further and remains in a location such that the contacts remain in contact with the single workspace view 5002. Additionally, substantial portions of adjacent workspace views (e.g., workspace views 5018, 5020, 5022, 5024 and 5026) are displayed along with applications and/or windows (e.g., 5038, 5040 and 5042) in those workspace views. In regions where there are no adjacent workspace views, a temporary blank space 5028 is displayed.

In this example, when the device detects a release of the contacts in the multifinger gesture, the device moves 5030 the workspace views towards an edge of the display so as to fill in the temporary blank space 5028. As shown in FIG. 5D, over a predefined period of time (e.g., 0.2 seconds) after the contact is released, the device continues to shrink the single workspace view 5002, thereby displaying more of the workspace views (e.g., 5018, 5020, 5022, 5024 5026, 5032, 5034, and 5036) as well as applications and/or windows (e.g., 5004, 5038, 5040, 5042, 5044, 5046, 5048), and the device continues to move 5031 the plurality of workspace views to fill in the remaining portion of the temporary blank space 5028. The final stage of this animation is illustrated in FIG. 5E, where a three-by-three array of nine workspace views (e.g., 5002, 5018, 5020, 5022, 5024 5026, 5032, 5034, and 5036) is displayed, including displaying a plurality of applications and/or windows (e.g., 5004, 5038, 5040, 5042, 5044, 5046, 5048) that are associated with the displayed workspace views. In this example, the multifinger gesture shrinks the single workspace view 5002 towards the center of the screen, while the single workspace view is on the right side of the array, and as a result, the temporary blank space 5028 appears on right side of the touch screen display.

In some embodiments, the first multifinger gesture is (610) a two-finger pinching gesture at a location on the touch-sensitive surface that corresponds to a corner of the display. In some embodiments, the two-finger pinching gesture in the corner of a touch screen display includes two contacts (e.g., 5050-1 and 5052-1 in FIG. 5F) moving (e.g., 5054 and 5056, respectively) towards each other from adjacent sides of the display. In some embodiments the two-finger contacts (e.g., 5050-1 and 5052-1 in FIG. 5F) in the gesture move towards a diagonal on the display (e.g., when the contacts are on the bottom and the right side of the display, they both move towards a diagonal running from the upper left corner to the lower right corner of the touch screen display).

For example, when the pinching gesture is on the lower right corner of a touch screen display, a first finger contact 5050-1 starts at or near an edge of the bottom of the side of the touch screen display (e.g., within a predefined area on the bottom side of the touch screen display) and moves to up and to the right on the touch screen display (e.g., movement 5054 to contact location 5050-2 in FIG. 5O, and movement 5058 to contact location 5050-3 in FIG. 511), while concurrently a second finger contact (e.g., 5052-1 in FIG. 5F) starts at or near an edge of the right side of the touch screen display (e.g., within a predefined area on the right side of the touch screen display) and moves down and to the left on the touch-sensitive surface (e.g., movement 5056 to contact location 5052-2 in FIG. 5G, and movement 5060 to contact location 5052-3 in FIG. 5H).

In some embodiments, replacing display of the first workspace view with concurrent display of the plurality of workspace views comprises displaying an animation of a transition from the single current workspace view to the plurality of workspace views. An example of one such animation for a corner pinching gesture, is illustrated in FIGS. 5F-5I and 5E. In FIG. 5F, the single workspace view 5002 is displayed without any other workplace views. In FIG. 5G, after the corner pinching gesture begins, the single workspace view 5002 begins to shrink, including shrinking any applications and windows (e.g., 5004 in FIG. 5G) in the workspace view 5002, and the edges of adjacent workspace views (e.g., 5018, 5020, and 5022 in FIG. 5G) are displayed. As the corner pinching gesture continues, as shown in FIG. 5H, the single workspace view 5002 shrinks further and remains in a location such that the contacts remain in contact with the single workspace view 5002. Additionally, substantial portions of adjacent workspace views (e.g., 5018, 5020, 5022, 5024, 5026, 5032, 5034 and 5036) are displayed along with applications and/or windows (e.g., 5038, 5040, 5042, 5044, 5046 and 5048) in those workspace views. In regions where there are no adjacent workspace views, a temporary blank space 5062 is displayed.

In this example, when the device detects a release of the contacts in the multifinger gesture, the device simultaneously moves (e.g., movements 5064 and 5066, FIG. 5H) the plurality of workspace views towards two edges of the display so as to fill in the temporary blank space 5062. As shown in FIG. 5I, over a predefined period of time (e.g., 0.2 seconds) after the contact is released, the device continues to shrink the single workspace view 5002, thereby displaying more of the workspace views (e.g., 5018, 5020, 5022, 5024 5026, 5032, 5034, and 5036) as well as applications and/or windows (e.g., 5004, 5038, 5040, 5042, 5044, 5046, 5048) and continues to move (e.g., movements 5068 and 5070) the plurality of workspace views simultaneously towards two edges of the display to fill in the remaining portion of the temporary blank space 5062. The final stage of this animation is illustrated in FIG. 5E, where a three-by-three array of nine workspace views (e.g., 5002, 5018, 5020, 5022, 5024 5026, 5032, 5034, and 5036) is displayed, including displaying a plurality of applications and/or windows (e.g., 5004, 5038, 5040, 5042, 5044, 5046, 5048) that are associated with the displayed workspace views. In this example, the two-finger pinching gesture shrinks the single workspace view 5002 towards the bottom right corner of the screen, and as a result, the temporary blank space 5062 appears both on the top and right side of the touch screen display.

In some embodiments, the first multifinger gesture is (612) a five-finger tap gesture. In other words, all five fingers on one hand concurrently tap the touch-sensitive surface. In some embodiments, all five fingers concurrently tap the touch-sensitive surface and lift off of all five finger contacts is detected within a predefined time period (e.g., 0.2 seconds). For example, in FIG. 5J, while displaying a single workspace view 5002 including a single application window 5004, the device detects five distinct finger contacts (e.g., 5072, 5074, 5076, 5078 and 5080) on the touch screen display, and detects lift off of all five finger contacts within a predefined time period. In response to detecting the five-finger tap gesture, the device replaces display of the single current workspace view with the plurality of workspace views. In some embodiments, replacing display of the single current workspace view with concurrent display of the plurality of workspace views comprises displaying an animation of a transition from the single current workspace view to the plurality of workspace views. An exemplary animation is described in greater detail below with reference to FIGS. 5K-5O.

In some embodiments, the first multifinger gesture is (614) a five-finger pinch gesture. In other words, five finger contacts from one hand move towards each other (or a common point) on the touch-sensitive surface. In some embodiments, the five-finger pinch gesture includes five contacts (e.g., 5082-1, 5084-1, 5086-1, 5088-1 and 5090-1 in FIG. 5K) moving (e.g., 5092, 5094, 5096, 5098 and 5100 in FIG. 5K) towards each other (e.g., towards a common region of the display).

For example, a first finger contact 5082 starts at a first location (e.g., 5082-1 in FIG. 5K) on the touch screen display and moves towards a region on the display (e.g., movement 5092 to contact location 5082-2 in FIG. 5L, and movement 5102 to contact location 5082-3 in FIG. 5M). Concurrently, a second finger contact 5084 starts at a first location (e.g., 5084-1 in FIG. 5K) on the touch screen display and moves towards the same region on the display (e.g., movement 5094 to contact location 5084-2 in FIG. 5L, and movement 5104 to contact location 5084-3 in FIG. 5M). Concurrently, a third finger contact 5086 starts at a first location (e.g., 5086-1 in FIG. 5K) on the touch screen display and moves towards the same region on the display (e.g., movement 5096 to contact location 5086-2 in FIG. 5L, and movement 5106 to contact location 5086-3 in FIG. 5M). Concurrently, a fourth finger contact 5088 starts at a first location (e.g., 5088-1 in FIG. 5K) on the touch screen display and moves towards the same region on the display (e.g., movement 5098 to contact location 5088-2 in FIG. 5L, and movement 5108 to contact location 5088-3 in FIG. 5M). Concurrently, a fifth finger contact 5090 starts at a first location (e.g., 5090-1 in FIG. 5K) on the touch screen display and moves towards the same region on the display (e.g., movement 5100 to contact location 5090-2 in FIG. 5L, and movement 5110 to contact location 5090-3 in FIG. 5M). While in the present example, all five fingers have been illustrated as moving, it should be understood that in some embodiments, one or more of the fingers does not move, and rather the other fingers move towards the stationary finger(s).

In some embodiments, replacing display of the first single workspace view with concurrent display of the plurality of workspace views comprises displaying an animation of a transition from the single workspace view to the plurality of workspace views. An example of one such animation for a five-finger pinch gesture, is illustrated in FIGS. 5K-5O. In FIG. 5K the single workspace view 5002 is displayed without any other workplace views. In FIG. 5L, after the five-finger pinch gesture begins, the single workspace view 5002 begins to shrink, including shrinking any applications and windows (e.g., 5004 in FIG. 5L) in the workspace view 5002, and the edges of adjacent workspace views (e.g., 5018, 5020, and 5022 in FIG. 5B) are displayed. As the five-finger pinch gesture continues, as shown in FIG. 5M, the single workspace view 5002 shrinks further and remains in a location such that the contacts remain in contact with the single workspace view 5002. Additionally, substantial portions of adjacent workspace, views (e.g., 5018, 5020, 5022, 5024 and 5026) are displayed along with applications and/or windows (e.g., 5038, 5040 and 5042) in those workspace views. In regions where there are no adjacent workspace views, a temporary blank space 5112 is displayed.

In this example, when the device detects a release of the contacts in the multifinger gesture, the device moves 5114 the workspace views towards an edge of the display so as to fill in the temporary blank space 5112. As shown in FIG. 5N, over a predefined period of time (e.g., 0.2 seconds) after the contact is released, the device continues to shrink the single workspace view 5002, thereby displaying more of the workspace views (e.g., 5018, 5020, 5022, 5024 5026, 5032, 5034, and 5036) as well as applications and/or windows (e.g., 5004, 5038, 5040, 5042, 5044, 5046, 5048) and continues to move 5116 the plurality of workspace views to fill in the remaining portion of the temporary blank space 5112. The result of this animation is illustrated in FIG. 5O, where a three-by-three array of nine workspace views (e.g., 5002, 5018, 5020, 5022, 5024 5026, 5032, 5034, and 5036) is displayed, including displaying a plurality of applications and/or windows (e.g., 5004, 5038, 5040, 5042, 5044, 5046, 5048) that are associated with the displayed workspace views. In this example, the multifinger gesture shrinks the single workspace view 5002 towards the center of the screen, while the single workspace view is on the right side of the array. As a result, the temporary blank space 5112 appears on right side of the touch screen display.

In response to detecting the first multifinger gesture (e.g., one of the gestures described above with reference to FIGS. 5A-5O) on the touch-sensitive surface, the device replaces (616) display of the first workspace view with concurrent display of the plurality of workspace views. In some embodiments, replacing display of the first workspace view with concurrent display of the plurality of workspace views comprises displaying (618) an animation of a transition from the first workspace view to the plurality of workspace views, as described above in greater detail with reference to FIGS. 5A-5O. In some embodiments, concurrent display of the plurality of workspace views comprises displaying (620) the plurality of workspace views in an array (e.g., with m columns and n rows, where m and n are integers greater than 1) of non-overlapping (separate) workspace views. For example, in FIG. 5O an array of workspace views is displayed including nine workspace views (e.g., 5002, 5018, 5020, 5022, 5024, 5026, 5032, 5034 and 5036) arranged in array with three rows and three columns.

In some embodiments, while concurrently displaying the plurality of workspace views, the device detects (622) an input by the user that corresponds to selection of a second workspace view in the plurality of workspace views. For example, in FIG. 5O, the device detects a finger tap gesture (e.g., gesture 5118) on the center workspace view 5022, which corresponds to a selection of the center workspace view. In some embodiments, the input by the user that corresponds to (624) selection of the second workspace view is a mouse-based input (e.g., a mouse click while the cursor is on the second workspace view). In some embodiments, the input by the user that corresponds (626) to selection of the second workspace view is a finger-based input (e.g., a finger tap gesture 5118 on the touch-sensitive surface at a location on the touch-sensitive surface that corresponds to the second workspace view).

In some embodiments, in response to detecting the input by the user that corresponds to selection of the second workspace view, the device replaces (628) display of the plurality of workspace views with display of the second workspace view (without displaying workspace views other than the second workspace view). In some embodiments, replacing display of the plurality of workspace views with display of the second workspace view comprises displaying an animation of a transition from the plurality of workspace views to the second workspace view. For example, FIGS. 5O-5R illustrate an exemplary animation of this transition.

FIG. 5O illustrates an initial stage of the animation, where a three-by-three array of nine workspace views (e.g., 5002, 5018, 5020, 5022, 5024 5026, 5032, 5034, and 5036) is displayed, along with a plurality of applications and/or windows (e.g., 5004, 5038, 5040, 5042, 5044, 5046, 5048) that are associated with the displayed workspace views. In FIG. 5P, after input by the user that corresponds to selection of the second workspace view is detected, the second workspace view 5022 begins to expand, including expanding any applications and windows (e.g., 5040 and 5042 in FIG. 5P) in the workspace view 5022. Additionally, in some embodiments the other workspace views (e.g., 5018, 5020, 5024 5026, 5032, 5034, and 5036) and any associated applications and/or windows (e.g., 5004, 5038, 5046 and 5048 in FIG. 5P) are also expanded and simultaneously moved off of the display to make room for the second workspace view 5022. As the animation continues, as shown in FIG. 5Q, the second workspace view 5022 expands further so that only the edges of the adjacent workspace views (e.g., 5018, 5020, 5024, 5026, 5032, 5034, and 5036) are displayed. The result of this animation is illustrated in FIG. 5R where the second workspace view 5022 is displayed along with any applications and/or windows associated with the second workspace view (e.g., 5040 and 5042), without displaying any other workplace views.

In some embodiments, while displaying the second workspace view (e.g., 5022 in FIG. 5R, which includes a plurality of applications and/or application windows 5040 and 5042), the device detects (630) a swipe gesture on the touch-sensitive surface (e.g., contact 5120 and subsequent movement 5122 of the contact). In some embodiments, in response to detecting the swipe gesture on the touch-sensitive surface, the device selects (634) a single other workspace view (e.g., 5034 in FIGS. 5R-5U) in the plurality of workspace views in accordance with the swipe gesture (i.e., a single workspace view other than the second workspace view in the plurality of workspace views).

In some embodiments, in response to detecting the swipe gesture on the touch-sensitive surface, the device replaces (634) display of the second workspace view 5022 with display of the single other workspace view. For example, for a touch screen display, in response to detecting a left-to-right finger swipe that starts at or near (e.g., within a predefined area on the left side of the touch screen display) the left side of the touch screen display (e.g., contact 5120 and subsequent movement 5122 of the contact in FIG. 5R), the device replaces display of the second workspace view 5022 with display of a third workspace view (e.g., 5034 in FIG. 5U). Similarly, for a touch screen display, in response to detecting a right-to-left finger swipe that starts at or near (e.g., within a predefined area on the right side of the touch screen display) the right side of the touch screen display, the device replaces display of the second workspace 5022 view with display of the first workspace view 5002, because the first workspace view 5002 is adjacent to the right side of the second workspace view 5022, while the third workspace view 5034 is adjacent to the left side of the second workspace view 5022 (see, for example, the array of workspace views in FIG. 5O). Similar responses may also occur for a track pad. For example, in response to detecting a left-to-right finger swipe that starts at or near the left side of the track pad (e.g., within a predefined area on the left side of the track pad), the device replaces display of the second workspace view with display of the first workspace view.

If concurrent display of the plurality of workspace views comprises displaying the plurality of workspace views in an array of non-overlapping (separate) workspace views (e.g., as shown in FIG. 5O), the single other workspace view may correspond to a workspace view adjacent to the second workspace view 5022 in the array, such as immediately above, below, to the right, or to the left of the second workspace view 5022 in the array, in accordance with the direction of the swipe gesture. For example, a downward swipe gesture on the second workspace view 5022 may result in the display of the workspace view immediately above the second workspace view in the array (e.g., 5020 in FIG. 5O). The swipe gesture may comprise a predefined number of fingers, such as one, two, or three fingers.

In some embodiments, replacing display of the second workspace view with display of the single other workspace view comprises displaying (636) an animation of a transition from the second workspace view to the single other workspace view, as shown in FIGS. 5R-5U. For example, in FIG. 5R the second workspace view 5022 is displayed with two applications and/or windows (e.g., 5040 and 5042). The device detects a contact 5120 with the touch-sensitive surface near the left edge of the touch-sensitive surface and movement 5122 of the contact along the touch-sensitive surface towards the right edge of the touch-sensitive surface (i.e., a left-to-right swipe gesture). In response to detecting the left-to-right swipe gesture, the device slides the second workspace view 5022 to the right, revealing an edge of a single other workspace view 5034 in FIG. 5S. As the animation continues, the second workspace view 5022 and associated applications and/or windows (e.g., 5040 and 5042) continues to shift to the right while a portion of the single other workspace view (e.g., 5034 in FIG. 5T) is shifted onto the display so that applications and/or windows (e.g., 5046 in FIG. 5T) associated with the single other workspace view 5034 are displayed on the touch screen display. The animation for the left-to-right swipe gesture makes it appear as though the second workspace view and the single other workspace view are connected to each other. When the swipe gesture "drags" the second workspace view to the right, the single other workspace view is dragged into view.

In some embodiments, the device displays a workspace navigation graphic, which shows a position of the currently selected workspace view in the array. For example, in FIG. 5T, the workspace navigation graphic 5124 shows an arrow pointing from the location of the second workspace view to the location of the single other workspace view in the array of workspace views. In FIG. 5U, the final stage of the animation is displayed, where only the single other workspace view 5034 is displayed, along with any applications and/or windows (e.g., 5046 in FIG. 5U) associated with the single other workspace view. In some embodiments, the workspace navigation graphic (e.g., 5124 in FIG. 5U) continues to be displayed for a predefined time after the single other workspace is displayed.

In some embodiments, while displaying the second workspace view (e.g., view 5022 in FIG. 5V) without displaying workspace views other than the second workspace view, the device detects (638) an input (e.g., a selection using a cursor 5126) by the user on a first window 5040 in the second workspace view 5022. In some embodiments, the input by the user on the first window is (640) a mouse-based input (e.g., a mouse click while the cursor 5126 is on the first window 5040). In some embodiments, the input by the user on the first window is (642) a finger-based input (e.g., a finger contact on the touch-sensitive surface at a location on the touch-sensitive surface that corresponds to the first window 5040).

Operations 646-658 are performed while the device continues (644) to detect the input by the user on the first window. In other words, while a window (e.g., 5040 in FIG. 5V) is selected, these operations change the workspace view (e.g., from workspace view 5022 in FIG. 5V to workspace view 5034 in FIG. 5Y), thereby moving the selected window to a new workspace view.

In some embodiments, the device detects (646) a swipe gesture on the touch-sensitive surface (e.g., contact 5128 on the touch-sensitive surface and movement 5130 of the contact 5128 along the touch-sensitive surface).

In response to detecting the swipe gesture on the touch-sensitive surface, the device: selects (648) a single other workspace view in the plurality of workspace views in accordance with the swipe gesture (i.e., a single workspace view other than the second workspace view in the plurality of workspace views); replaces display of the second workspace view with display of the single other workspace view in the plurality of workspace views (without displaying workspace views other than the single other workspace view); and displays the first window (e.g., 5040 in FIG. 5Y) in the single other workspace view (e.g., 5034 in FIG. 5Y).

In some embodiments, replacing display of the second workspace view 5022 with display of the single other workspace view and moving the first window 5040 to the single other workspace view comprises (650) displaying an animation of a transition from the second workspace view to the single other workspace view while maintaining display of the first window 5040, as illustrated in FIGS. 5V-5Y. In FIG. 5V, the second workspace view 5022 is displayed with two windows (e.g., 5040 and 5042). The device detects an input (e.g., a selection using a cursor 5126) by the user on a first window 5040 in the second workspace view 5022. While continuing to detect the input on the first window 5040, the device also detects a user input contact 5128 with the touch-sensitive surface near the left edge of the touch-sensitive surface and movement 5130 of the contact along the touch-sensitive surface towards the right edge of the touch-sensitive surface (i.e., a left-to-right swipe gesture). In response to detecting the left-to-right swipe gesture, the device slides the second workspace view 5022 to the right, revealing an edge of a single other workspace view 5034 in FIG. 5W, while maintaining the window 5040 in a fixed position relative to the cursor 5126.

As the animation continues, as shown in FIG. 5X, the second workspace view 5022 and unselected applications and/or windows (e.g., 5042) associated with the second workspace view continue to shift to the right, while a portion of the single other workspace view (e.g., 5034 in FIG. 5X) shifts onto the display so that applications and/or windows (e.g., 5046) associated with the single other workspace view 5034 are displayed on the touch screen display. Concurrent with the shifting of the workspace views, the device maintains the window 5040 in a fixed position relative to the cursor 5126. The animation for the left-to-right swipe gesture makes it appear as though the second workspace view and the single other workspace view are connected to each other. When the swipe gesture "drags" the second workspace view to the right, the single other workspace view is dragged into view, while the selected window 5040 continues to remain in a fixed location relative to the cursor 5126. Thus, the selected window is moved from one context (e.g., the second workspace view) to another context (e.g., the single other workspace view) by shifting the context while maintaining the window at a location on the display in accordance with the detected input on the first window. It should be understood that after the single other workspace view has been displayed, the moved application and/or window (e.g., 5040 in FIG. 5Y) may be released (e.g., by the release of a mouse button that is interpreted as a mouse up command), and the cursor (e.g., 5126 in FIG. 5Y) or contact can be moved independently of the position of the window (e.g., 5040 in FIG. 5Y) in the single other workspace view (e.g., 5034 in FIG. 5Y).

In some embodiments, the concurrent display of the plurality of workspace views comprises (652) displaying the plurality of workspace views in an array of non-overlapping workspace views. In some embodiments, while displaying a single, currently selected workspace view (e.g., displaying just the second workspace view, without concurrently displaying the plurality of workspace views), the device displays (654) a workspace navigation graphic that shows a position of the currently selected workspace view in the array. For example, in FIGS. 5W-5X, a workspace navigation graphic 5132, which shows a position of the currently selected workspace view in the array, is displayed. In FIG. 5W, a first workspace navigation graphic 5132 shows that the current workspace view is the center workspace view. Subsequently, as shown in FIG. 5X, while the second workspace view is being replaced with the single other workspace view, the first workspace navigation graphic 5132 is replaced with a second workspace navigation graphic 5134 that includes an arrow pointing from the location of the second workspace view to the location of the single other workspace view in the array of workspace views. In some embodiments, display of the workspace navigation graphic is initiated (656) in response to a first predefined condition. (e.g., detecting the swipe gesture on the touch-sensitive surface) and display of the workspace navigation graphic is terminated (658) in response to a second predefined condition (e.g., the passing of a predefined period after the device detects an end of the input by the user on the first window, or after the single other workspace view has been continuously displayed for a predefined period of time). In FIG. 5Y, the result of the animation is shown, where only the single other workspace view 5034 is displayed, along with any applications and/or windows (e.g., 5046) associated with the single other workspace view and the selected window 5040.

Although replacing display of the second workspace view with the single other workspace view has been described above with reference to a left-to-right swipe gesture from a single finger on a touch screen display, it should be understood that this is merely an illustrative example, and other ways of replacing display of one workspace view with another are contemplated. For example, for a touch screen display, in response to detecting a right-to-left finger swipe that starts at or near (e.g., within a predefined area on the right side of the touch screen display) the right side of the touch screen display, the device may replace display of the second workspace view with display of a third workspace view while maintaining display of the first window at a location corresponding to a cursor or finger contact, thereby moving the first window from the second workspace view to the third workspace view. Similar responses may also occur for a track pad. For example, in response to detecting a left-to-right finger swipe that starts at or near (e.g., within a predefined area on the left side of the track pad) the left side of the track pad, the device may replace display of the second workspace view with display of the first workspace view while maintaining display of the first window at a location corresponding to a cursor or finger contact, etc. If concurrent display of the plurality of workspace views comprises displaying the plurality of workspace views in an array of non-overlapping (separate) workspace views, the single other workspace view may correspond to a workspace view adjacent to the second workspace view in the array, such as immediately above, below, to the right, or to the left of the second workspace view in the array, in accordance with the direction of the swipe gesture. The swipe gesture may comprise a predefined number of fingers, such as one, two, or three fingers.

Operations 662-676 are performed while the device concurrently displays (660) the plurality of workspace views (e.g., 5002, 5018, 5020, 5022, 5024, 5026, 5032, 5034 and 5036 in FIG. 5Z) and applications and/or windows therein (e.g., 5004, 5038, 5040, 5042, 5044, 5046 and 5048 in FIG. 5Z).

In some embodiments, the device detects (662) an input by the user that corresponds to selection and movement of a first window in the first workspace view in the plurality of workspace views. In some embodiments, the input by the user that corresponds to selection and movement of the first window is (664) a mouse-based input (e.g., a mouse click while the cursor is on the first window followed by a mouse drag to the second workspace view). In some embodiments, the input by the user that corresponds to selection and movement of the first window is (668) a finger-based input (e.g., a finger contact 5136 on the touch-sensitive surface at a location on the touch-sensitive surface that corresponds to the first window 5004 followed by movement 5138 of the finger contact to a location on the touch-sensitive surface that corresponds to the second workspace view 5026, FIG. 5Z). In some embodiments, in response to detecting the input by the user that corresponds to selection and movement of the first window, the device moves (670) the first window to a second workspace view in the concurrently displayed plurality of workspace views.

For example, in FIG. 5Z, when the device detects a contact (e.g., 5136, 5140, 5144, 5148) with an application and/or window (e.g., 5004, 5042, 5040, 5044, respectively) in a workspace view (e.g., 5002, 5022, 5022, 5032, respectively) and movement (e.g., 5138, 5142, 5146, 5150, respectively) of the contact to a different workspace view (e.g., 5026, 5018, 5034, 5032, respectively), the device moves the respective application and/or window (e.g., 5004, 5042, 5040, 5044, respectively as shown in FIG. 5AA) to the different workspace view (e.g., 5026, 5018, 5034, 5032, respectively as shown in FIG. 5AA). As a result of the movements in FIG. 5Z, the applications and/or windows have been rearranged as shown in FIG. 5AA. It should be understood that one window or a plurality of windows may be moved in this manner. In particular, when a plurality of windows are moved in this manner, the windows may be moved simultaneously (e.g., with multiple contacts each concurrently associated with one respective window of the plurality of windows) or in series (e.g., a single contact with a single window, followed by a different single contact with a different single window).

In some embodiments, moving the first window to the second workspace view comprises (672) displaying an animation of the first window moving to the second workspace view. In some embodiments this animation includes moving a visual representation of the first window from the first workspace view to the second workspace view as the contact or cursor moves from the first workspace view to the second workspace view.

In some embodiments, the device detects (674) an input (e.g., 5154 in FIG. 5AA) by the user that corresponds to selection of a second workspace view (e.g., 5026 in FIG. 5AA) in the plurality of workspace views. In response to detecting the input by the user that corresponds to selection of the second workspace view, the device replaces (676) display of the plurality of workspace views with display of the second workspace view (without displaying workspace views other than the second workspace view). For example, in FIG. 5AA, the device detects an input (e.g., tap gesture 5154) indicative of selection of workspace view 5026. In response to detecting this input, the device replaces display of the array of workspace views (e.g., 5004, 5018, 5020, 5022, 5024, 5026 5032, 5034 and 5036 in FIG. 5AA) with the display of the single workspace view (e.g., 5026 in FIG. 5BB) that was selected by the input.

Operations 680 and 682 are performed while the device concurrently displays (678) the plurality of workspace views (e.g., 5002, 5018, 5020, 5022, 5024, 5026, 5032, 5034 and 5036 in FIG. 5CC) and applications and/or windows (e.g., 5004, 5038, 5040, 5042, 5044, 5046 and 5048 in FIG. 5CC) therein.

In some embodiments, the device detects (680) concurrent finger contacts (e.g., 5156 and 5158 in FIG. 5CC) on two or more windows (e.g., 5044 and 5042, respectively in FIG. 5CC) in the concurrently displayed plurality of workspace views (e.g., 5002, 5018, 5020, 5022, 5024, 5026, 5032, 5034 and 5036). In some embodiments, the concurrent finger contacts (e.g., 5156 and 5158) are made by fingers on a first hand of a user.

In some embodiments, while continuing to detect the concurrent finger contacts (e.g., 5156 and 5158) on two or more windows (e.g., 5044 and 5042, respectively), the device detects (682) a finger gesture (e.g., tap gesture 5160 in FIG. 5CC), separate from the concurrent finger contacts (e.g., 5156 and 5158, respectively), on a single workspace view (e.g., 5032 in FIG. 5CC) in the plurality of workspace views. In some embodiments, the finger gesture (e.g., tap gesture 5160 in FIG. 5CC) on the single workspace view is made bra finger on a second hand of the user different from the first hand (e.g., in FIG. 5CC, the contacts with the windows are made by fingers of the right hand while the gesture on the single workspace view 5032 is made with a finger on the left hand).

In response to detecting the finger gesture (e.g., tap gesture 5160 in FIG. 5CC) on the single workspace view (e.g., 5032 in FIG. 5CC), the device replaces (684) display of the plurality of workspace views with display of the single workspace view and the device displays the two or more windows (e.g., 5044 and 5042) in the single workspace view, as shown in FIG. 5FF.

In some embodiments, replacing display of the plurality of workspace views (e.g., 5002, 5018, 5020, 5022, 5024, 5026, 5032, 5034 and 5036) with display of the single workspace view (e.g., 5032 in FIG. 5FF) and displaying the two or more windows (e.g., 5042 and 5044 in FIG. 5FF) in the single workspace view (e.g., 5032 in FIG. 5FF) comprises (686) displaying an animation of a transition from the plurality of workspace views to the single workspace view while maintaining display of the two or more windows, as shown in FIGS. 5CC-5FF.

For example, in FIG. 5CC, the animation starts with the display of a plurality of workspace views (e.g., 5002, 5018, 5020, 5022, 5024, 5026, 5032, 5034 and 5036) and applications and/or windows (e.g., 5004, 5038, 5040, 5042, 5044, 5046 and 5048 in FIG. 5CC). As shown in FIG. 5DD, after detecting concurrent finger contacts (e.g., 5156 and 5158) on two or more windows (e.g., 5044 and 5042, respectively), and a gesture on a single workspace view (e.g., 5032), the device begins to expand the single workspace view 5032, and move the two or more windows (e.g., 5044 and 5042) towards the single workspace view 5032. Concurrently, the other workspace views (e.g., 5002, 5018, 5020, 5022, 5024, 5026, 5034 and 5036) and the applications and/or windows associated with the other workspace views (e.g., 5004, 5038, 5040, 5048) are also expanded and moved off of the display as necessary as the single workspace view 5032 enlarges to fill the display. In this example, the movement of the two or more windows (e.g., 5044 and 5042) towards the single workspace view 5032 results in the two or more windows (e.g., 5044 and 5042) being displayed in a region of the display that is remote from the respective concurrent finger contacts associated with each of the windows (e.g., 5156 and 5158, respectively).

As the animation continues in FIG. 5EE, the single workspace view (e.g., 5032) and the selected windows (e.g., 5044 and 5042) continue to expand, while the other workspace views (e.g., 5020, 5022, 5034) in the array of workspace views continue to move off of the display so that only an edge of these other workspace views are visible on the display. Similarly, the other applications and/or windows (e.g., 5038) continue to expand and to move off of the display along with the workspace views (e.g., 5020) with which they are associated. As the single workspace view continues to expand, the two or more windows (e.g., 5044 and 5042) move and expand so that each window is proximate to (e.g., directly below) the respective concurrent finger contact (e.g., 5156 and 5158, respectively) associated with each of the windows. Consequently, while the animation is in progress, the two or more windows (e.g., 5044 and 5042) move around the screen to illustrate movements that are visually congruent with the rest of the animation. But when the animation is finished, as shown in FIG. 5FF, the two or more windows (e.g., 5044 and 5042) are located on the display in the single workspace view (e.g., 5032) in proximity to the respective concurrent finger contacts (e.g., 5156 and 5158, respectively). In this way, after the animation is complete, the user can continue to move the applications and/or windows (e.g., 5042 and 5044) in the single workspace view 5032 in a single smooth gesture, without breaking contact with the touch screen display. In other words, in accordance with some embodiments, at the beginning of the animation, the device detects finger contacts with a plurality of windows, during the animation, the device moves the plurality of windows such that at the end of the animation each finger contact is in contact with the window with which it was originally associated, even if the windows move away from their respective finger contacts during the animation.

In some embodiments, the concurrent display of the plurality of workspace views comprises (688) displaying the plurality of workspace views in an array of non-overlapping workspace views. In some embodiments, the device displays (690) a workspace navigation graphic that shows a position of the currently selected workspace view in the array. For example, in FIGS. 5DD-5FF, a workspace navigation graphic 5162, which shows a position of the currently selected workspace view in the array, is displayed. The workspace navigation graphic 5162 includes an arrow pointing from the location of a workspace view that includes at least one of the selected windows (e.g., the center of the three-by-three array of workspace views shown in FIG. 5CC, which includes one of the windows 5044) to the location of the selected single workspace view (e.g., 5032 in FIG. 5CC) in the array of workspace views. In some embodiments, display of the workspace navigation graphic is initiated in response to a first predefined condition (e.g., detecting the selection of the single workspace view 5032 in the array of workspace views in FIG. 5CC) and display of the workspace navigation graphic is terminated in response to a second predefined condition (e.g., the passing of a predefined period after the device detects an end of the input by the user on the first window, or after the single workspace view has been continuously displayed for a predefined period of time).

In other words, in FIGS. 5CC-5FF, the user selects two applications and/or windows (e.g., a media player application window 5042 and a finance application window 5044)

and concurrently selects a workspace view such as the workspace view (e.g., 5032 in FIG. 5CC) in the upper left corner of a three-by-three array of workspace views. In response, the device displays all of the selected applications and/or windows (e.g., displays the media player 5042 and the finance applications 5044) in the selected workspace view (e.g., 5032 in FIG. 5FF).

Additionally, although the preceding examples have been given with reference to a touch screen display, in some embodiments the display and the touch-sensitive surface are separate, as shown in FIG. 5GG. For example, in FIG. 5GG, the display 340 and the touch-sensitive surface (e.g., track pad 355) are separate. In some embodiments the touch-sensitive surface 355 has a primary axis 5174 that corresponds to a primary axis 5176 on the display 340. In accordance with these embodiments, the device detects a plurality of contacts (e.g., 5178 and 5180 in FIG. 5GG) with the touch-sensitive surface at locations that correspond to respective locations on the display (e.g., 5178 corresponds to 5182 and 5180 corresponds to 5184 in FIG. 5GG).

As one example of a gesture being performed on a touch sensitive surface that is distinct from a display, the two-finger pinch gesture described previously with reference to FIG. 5F is described below with reference to FIG. 5GG. In this example, a first finger contact 5178 (which corresponds to location 5182 on the display) starts at or near an edge of the bottom of the side of the touch-sensitive surface (e.g., within a predefined area on the bottom side of the touch-sensitive surface) and moves 5186 to up and to the right on the touch-sensitive surface 355 (which corresponds to movement 5188 on the display), while concurrently a second finger contact 5180 (which corresponds to location 5184 on the display 340) starts at or near an edge of the right side of the touch screen display (e.g., within a predefined area on the right side of the touch screen display) and moves 5190 down and to the left on the touch-sensitive surface 355 (which corresponds to movement 5192 on the display 340). The two finger contacts thus move towards each other (e.g., towards a diagonal running from the upper left corner to the lower right corner of the touch-sensitive surface). In some embodiments, in response to detecting this multifinger gesture on the touch-sensitive surface, the device replaces display of the first workspace view 5002 with concurrent display of the plurality of workspace views, as described in greater detail above with reference to FIGS. 5F-5I.

The steps in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention, The foregoing description, for purpose of explanation, has been described with reference to specific embodiments. However, the illustrative discussions above are not intended to be exhaustive or to limit the invention to the precise forms disclosed. Many modifications and variations are Possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
at a multifunction device with a touch-sensitive display:
displaying, on the touch-sensitive display, a first view that includes a first application without displaying other views in a plurality of other views that include other applications;
while displaying the first view that includes the first application detecting a first gesture on the touch-sensitive display that includes movement of a contact that starts near an edge of the touch-sensitive display and moves away from the edge of the touch-sensitive display toward an opposite edge of the touch-sensitive display;
in response to detecting the first gesture on the touch-sensitive display and while the contact continues to be detected on the touch-sensitive display:
reducing a size of the first view that includes the first application; and
moving the first view that includes the first application away from a first edge of the touch-sensitive display in accordance with movement of the contact on the touch-sensitive display;
after moving the first view that includes a first window away from the first edge of the touch-sensitive display, detecting an end of the gesture on the touch-sensitive display that includes detecting liftoff of the contact from the touch-sensitive display;
in response to detecting the end of the gesture on the touch-sensitive display, moving the first view that includes the first application toward the first edge of the touch-sensitive display while the size of the first view that includes the first application continues to be displayed at a reduced size;
while the first view that includes the first application is displayed at the reduced size, concurrently displaying, with the first view that includes the first application, a second view of the plurality of other views that were not displayed prior to detecting the first gesture, wherein the second view includes a second application other than the first application;
while concurrently displaying the first view and the second view and while the first view is at the reduced size, detecting a second gesture that corresponds to selection of the second view that includes detecting a tap gesture at a location of the second view in on the touch-sensitive display; and
in response to detecting the second gesture:
ceasing to display the first view that includes the first application; and
enlarging a size of the of the second view that includes the second application.

2. The method of claim 1, wherein the concurrent display of the first view and the second view comprises displaying the first view and the second view in an array of non-overlapping regions on the touch-sensitive display.

3. The method of claim 1, wherein detecting the first gesture on the touch-sensitive display comprises detecting movement of two or more fingers on the touch-sensitive display.

4. The method of claim 1, wherein the second gesture is a single finger gesture.

5. The method of claim 1, wherein the movement of the contact on the touch-sensitive display is a swipe gesture on the touch-sensitive display.

6. The method of claim 1, wherein the movement of the contact on the touch-sensitive display comprises a pinch-in gesture of multiple fingers on the touch-sensitive display.

7. The method of claim 1, further comprising:
while concurrently displaying the first view and the second view on the touch-sensitive display, displaying a predefined area with a plurality of application icons corresponding to the respective application windows contained in the first view and the second view.

8. The method of claim 1, wherein detecting the first gesture on the touch-sensitive display comprises detecting an initial contact on the touch-sensitive display, movement and subsequent lift off of the contact within a predefined time period.

9. A non-transitory computer readable medium having instructions stored thereon, the instructions, when executed by one or more processors of an electronic device with a display and a touch-sensitive display, cause the device to perform operations comprising:
displaying, on the touch-sensitive display, a first view that includes a first application without displaying other views in a plurality of other views that include other applications;
while displaying the first view that includes the first application detecting a first gesture on the touch-sensitive display that includes movement of a contact that starts near an edge of the touch-sensitive display and moves away from the edge of the touch-sensitive display toward an opposite edge of the touch-sensitive display;
in response to detecting the first gesture on the touch-sensitive display and while the contact continues to be detected on the touch-sensitive display:
reducing a size of the first view that includes the first application; and
moving the first view that includes the first application away from a first edge of the touch-sensitive display in accordance with movement of the contact on the touch-sensitive display;
after moving the first view that includes a first window away from the first edge of the touch-sensitive display, detecting an end of the gesture on the touch-sensitive display that includes detecting liftoff of the contact from the touch-sensitive display;
in response to detecting the end of the gesture on the touch-sensitive display, moving the first view that includes the first application toward the first edge of the touch-sensitive display while the size of the first view that includes the first application continues to be displayed at a reduced size;
while the first view that includes the first application is displayed at the reduced size, concurrently displaying, with the first view that includes the first application, a second view of the plurality of other views that were not displayed prior to detecting the first gesture, wherein the second view includes a second application other than the first application;
while concurrently displaying the first view and the second view and while the first view is at the reduced size, detecting a second gesture that corresponds to selection of the second view that includes detecting a tap gesture at a location of the second view in on the touch-sensitive display; and
in response to detecting the second gesture:
ceasing to display the first view that includes the first application; and
enlarging a size of the of the second view that includes the second application.

10. The medium of claim 9, wherein the concurrent display of the first view and the second view comprises displaying the first view and the second view in an array of non-overlapping regions on the touch-sensitive display.

11. The medium of claim 9, wherein detecting the first gesture on the touch-sensitive display comprises detecting movement of two or more fingers on the touch-sensitive display.

12. The medium of claim 9, wherein the second gesture is a single finger gesture.

13. The medium of claim 9, wherein the movement of the contact on the touch-sensitive display is a swipe gesture on the touch-sensitive display.

14. The medium of claim 9, wherein the movement of the contact on the touch-sensitive display comprises a pinch-in gesture of multiple fingers on the touch-sensitive display.

15. The medium of claim 9, wherein the operations further comprise:
while concurrently displaying the first view and the second view on the touch-sensitive display, displaying a predefined area with a plurality of application icons corresponding to the respective application windows contained in the first view and the second view.

16. The medium of claim 9, wherein detecting the first gesture on the touch-sensitive display comprises detecting an initial contact on the touch-sensitive display, movement and subsequent lift off of the contact within a predefined time period.

17. An electronic device, comprising:
a touch-sensitive display;
one or more processors;
memory having instructions stored thereon, the instructions, when executed by one or more processors, cause the device to perform operations comprising:
displaying, on the touch-sensitive display, a first view that includes a first application without displaying other views in a plurality of other views that include other applications;
while displaying the first view that includes the first application, detecting a first gesture on the touch-sensitive display that includes movement of a contact that starts near an edge of the touch-sensitive display and moves away from the edge of the touch-sensitive display toward an opposite edge of the touch-sensitive display;
in response to detecting the first gesture on the touch-sensitive display and while the contact continues to be detected on the touch-sensitive display:
reducing a size of the first view that includes the first application; and
moving the first view that includes the first application away from a first edge of the touch-sensitive display in accordance with movement of the contact on the touch-sensitive display;
after moving the first view that includes a first window away from the first edge of the touch-sensitive display, detecting an end of the gesture on the touch-sensitive display that includes detecting liftoff of the contact from the touch-sensitive display;
in response to detecting the end of the gesture on the touch-sensitive display, moving the first view that includes the first application toward the first edge of the touch-sensitive display while the size of the first view that includes the first application continues to be displayed at a reduced size;

while the first view that includes the first application is displayed at the reduced size, concurrently displaying, with the first view that includes the first application, a second view of the plurality of other views that were not displayed prior to detecting the first gesture, wherein the second view includes a second application other than the first application;

while concurrently displaying the first view and the second view and while the first view is at the reduced size, detecting a second gesture that corresponds to selection of the second view that includes detecting a tap gesture at a location of the second view in on the touch-sensitive display; and in response to detecting the second gesture:
  ceasing to display the first view that includes the first application; and
  enlarging a size of the of the second view that includes the second application.

18. The device of claim 17, wherein detecting the first gesture on the touch-sensitive display comprises detecting movement of two or more fingers on the touch-sensitive display.

19. The medium of claim 17, wherein the concurrent display of the first view and the second view comprises displaying the first view and the second view in an array of non-overlapping regions on the touch-sensitive display.

20. The medium of claim 17, wherein the second gesture is a single finger gesture.

21. The medium of claim 17, wherein the movement of the contact on the touch-sensitive display is a swipe gesture on the touch-sensitive display.

22. The medium of claim 17, wherein the movement of the contact on the touch-sensitive display comprises a pinch-in gesture of multiple fingers on the touch-sensitive display.

23. The medium of claim 17, wherein detecting the first gesture on the touch-sensitive display comprises detecting an initial contact on the touch-sensitive display, movement and subsequent lift off of the contact within a predefined time period.

24. The medium of claim 17, wherein the operations further comprise:
  while concurrently displaying the first view and the second view on the touch-sensitive display, displaying a predefined area with a plurality of application icons corresponding to the respective application windows contained in the first view and the second view.

* * * * *

UNITED STATES PATENT AND TRADEMARK OFFICE
CERTIFICATE OF CORRECTION

PATENT NO.          : 10,254,927 B2                             Page 1 of 1
APPLICATION NO.     : 14/455303
DATED               : April 9, 2019
INVENTOR(S)         : Julian Missig et al.

It is certified that error appears in the above-identified patent and that said Letters Patent is hereby corrected as shown below:

In the Claims

In Column 32, Line 9, Claim 1, delete "application" and insert -- application, --, therefor.
In Column 32, Line 28, Claim 1, delete "liftoff" and insert -- lift off --, therefor.
In Column 32, Line 36, Claim 1, delete "size:" and insert -- size; --, therefor.
In Column 32, Line 53, Claim 1, delete "of the of the" and insert -- of the --, therefor.
In Column 33, Line 26, Claim 9, delete "application" and insert -- application, --, therefor.
In Column 33, Line 44, Claim 9, delete "liftoff" and insert -- lift off --, therefor.
In Column 34, Line 1, Claim 9, delete "of the of the" and insert -- of the --, therefor.
In Column 35, Line 17, Claim 17, delete "of the of the" and insert -- of the --, therefor.
In Column 35, Line 23, Claim 19, delete "medium" and insert -- device --, therefor.
In Column 36, Line 3, Claim 20, delete "medium" and insert -- device --, therefor.
In Column 36, Line 5, Claim 21, delete "medium" and insert -- device --, therefor.
In Column 36, Line 8, Claim 22, delete "medium" and insert -- device --, therefor.
In Column 36, Line 11, Claim 23, delete "medium" and insert -- device --, therefor.
In Column 36, Line 16, Claim 24, delete "medium" and insert -- device --, therefor.

Signed and Sealed this
Seventeenth Day of September, 2019

Andrei Iancu
*Director of the United States Patent and Trademark Office*